(12) United States Patent
Seeberger et al.

(10) Patent No.: US 12,485,401 B2
(45) Date of Patent: Dec. 2, 2025

(54) SYNTHESIZER FOR OLIGO- AND POLYSACCHARIDES ON SOLID PHASE

(71) Applicants: Max-Planck-Gesellschaft zur Förderung der Wissenschaften e.V., Munich (DE); GlycoUniverse GmbH & Co KGaA, Potsdam (DE)

(72) Inventors: Peter H. Seeberger, Kleinmachnow (DE); Jose Danglad Flores, Berlin (DE); Kim Le Mai Hoang, Grob Kreutz (DE); Alonso Pardo Vargas, Copenhagen (DK); Eric Sletten, Berlin (DE); Mario Salwiczek, Berlin (DE)

(73) Assignees: Max-Planck-Gesellschaft zur F6rderung der Wissenschaften e.V., Munich (DE); Glyco Universe GmbH & Co KGaA, PotsdaM (DE)

( * ) Notice: Subject to any disclaimer, the term of this patent is extended or adjusted under 35 U.S.C. 154(b) by 841 days.

(21) Appl. No.: 17/773,890

(22) PCT Filed: Nov. 4, 2020

(86) PCT No.: PCT/EP2020/080964
§ 371 (c)(1),
(2) Date: May 3, 2022

(87) PCT Pub. No.: WO2021/089623
PCT Pub. Date: May 14, 2021

(65) Prior Publication Data
US 2023/0026870 A1    Jan. 26, 2023

(30) Foreign Application Priority Data

Nov. 4, 2019   (EP) .................................. 19207015
Dec. 13, 2019  (EP) .................................. 19216206

(51) Int. Cl.
*B01J 19/00*    (2006.01)

(52) U.S. Cl.
CPC .. *B01J 19/0046* (2013.01); *B01J 2219/00286* (2013.01); *B01J 2219/00389* (2013.01);
(Continued)

(58) Field of Classification Search
CPC .... B01J 19/00; B01J 19/0046; B01J 2219/00; B01J 2219/00274; B01J 2219/00277;
(Continued)

(56) References Cited

U.S. PATENT DOCUMENTS 7,829,032 B2    11/2010  Van Dam et al.
2009/0221792 A1  9/2009  Collins
(Continued)

FOREIGN PATENT DOCUMENTS

EP    3210667 A1 *  8/2017  .......... B01J 19/0046

OTHER PUBLICATIONS

International Search Report and Written Opinion for International Patent Application No. PCT/EP2020/080964 dated Feb. 1, 2021, 12 pages.
(Continued)

*Primary Examiner* — Natasha E Young
(74) *Attorney, Agent, or Firm* — Turocy & Watson, LLP

(57) ABSTRACT

The present invention relates to device for automated synthesis of oligo- and polysaccharides on a solid support.

15 Claims, 20 Drawing Sheets

(52) U.S. Cl.
CPC ........... *B01J 2219/00495* (2013.01); *B01J 2219/00497* (2013.01); *B01J 2219/005* (2013.01); *B01J 2219/00722* (2013.01); *B01J 2219/00731* (2013.01)

(58) Field of Classification Search
CPC .... B01J 2219/00279; B01J 2219/00281; B01J 2219/00286; B01J 2219/00351; B01J 2219/00389; B01J 2219/00495; B01J 2219/00497; B01J 2219/005; B01J 2219/00718; B01J 2219/0072; B01J 2219/00722; B01J 2219/00731; Y02P 20/00; Y02P 20/50; Y02P 20/55
See application file for complete search history.

(56) References Cited

U.S. PATENT DOCUMENTS

| | | | |
|---|---|---|---|
| 2010/0159604 A1 | 6/2010 | Pohl | |
| 2011/0313148 A1* | 12/2011 | Christ | B01J 19/0046 422/105 |
| 2012/0076692 A1* | 3/2012 | Miraghaie | B01J 19/0093 422/159 |

OTHER PUBLICATIONS

Hiroki Shimizu, et al., A new glycosylation method part 3: study of microwave effects at low temperatures to control reaction pathways and reduce byproducts, Tetrahedron 64 (2008) 10091-10096, journal homepage: www.el sevie r.com/locate/tet.

* cited by examiner

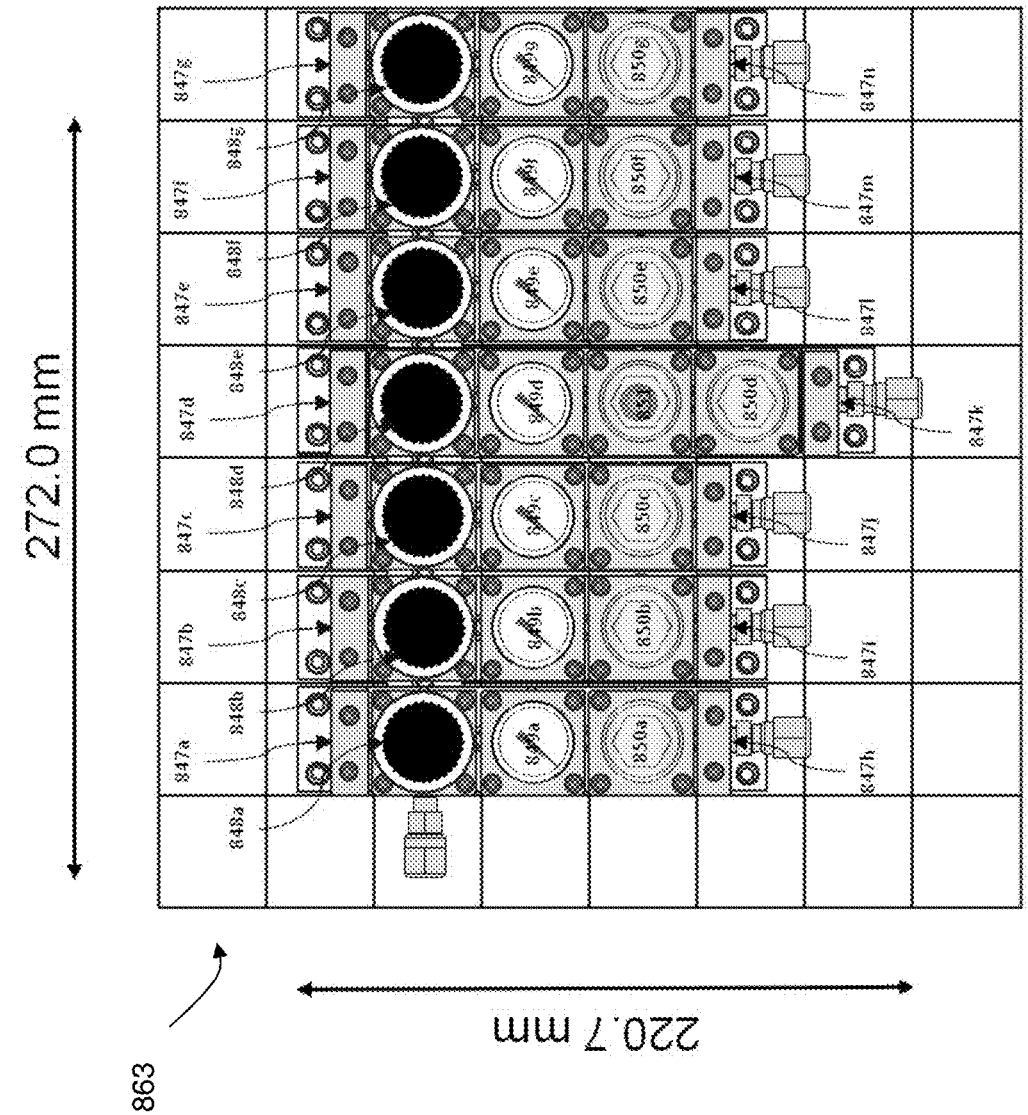

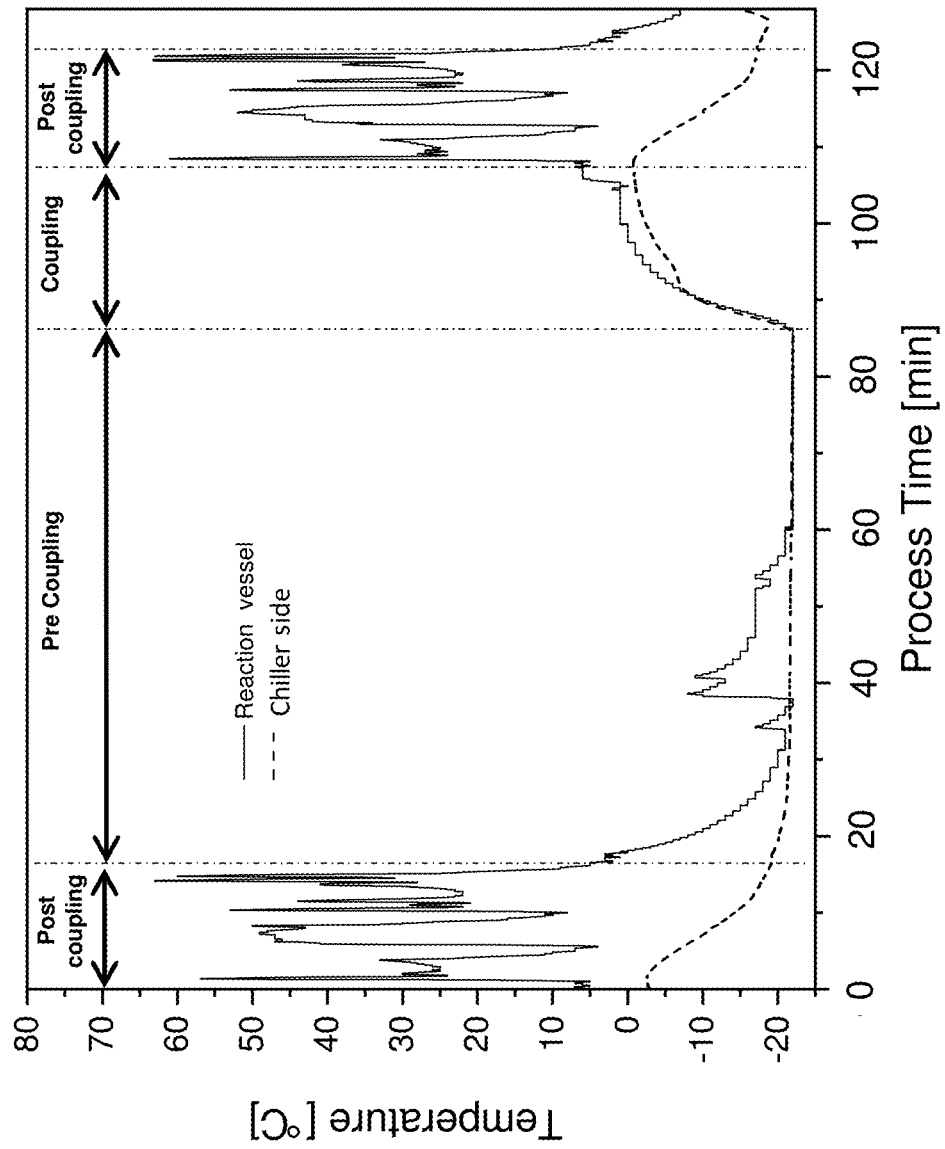

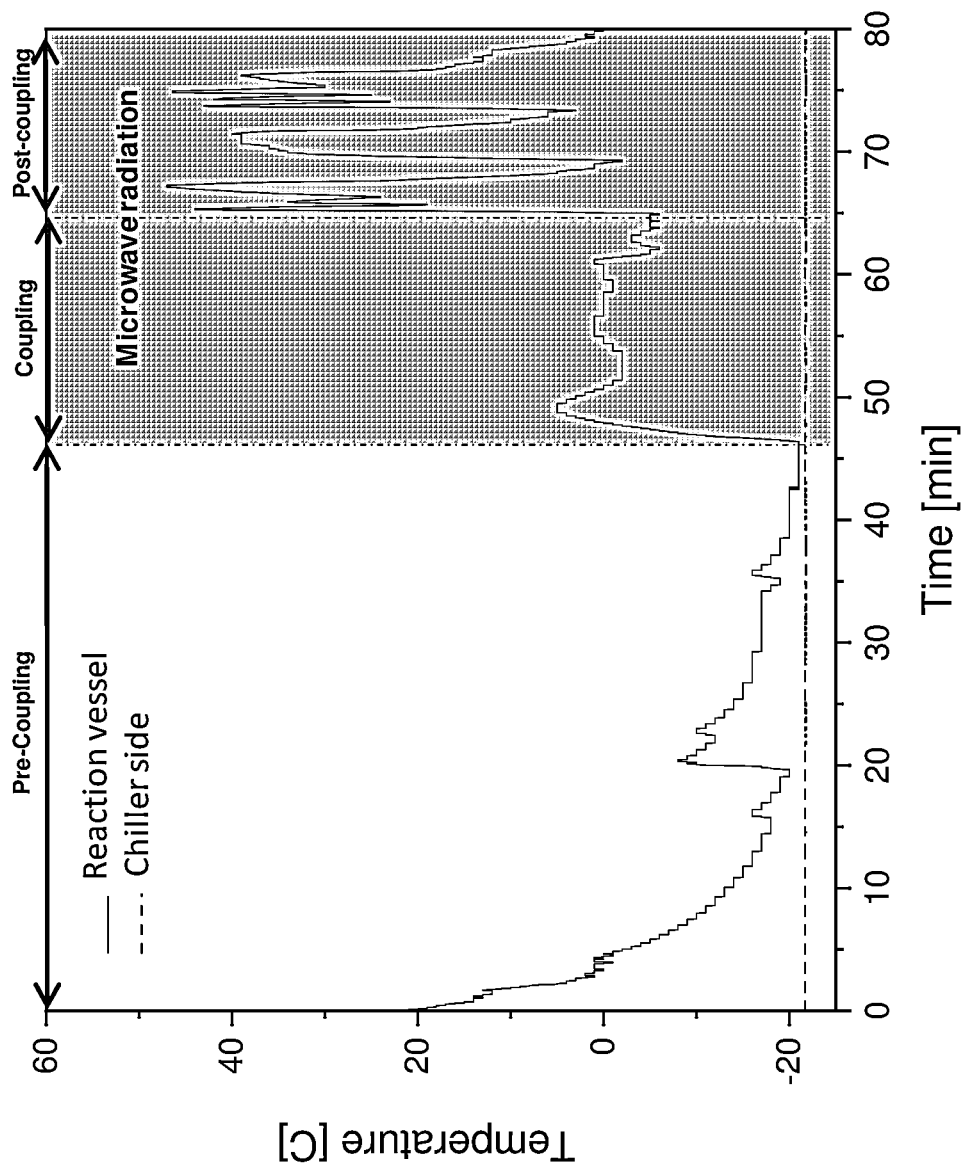

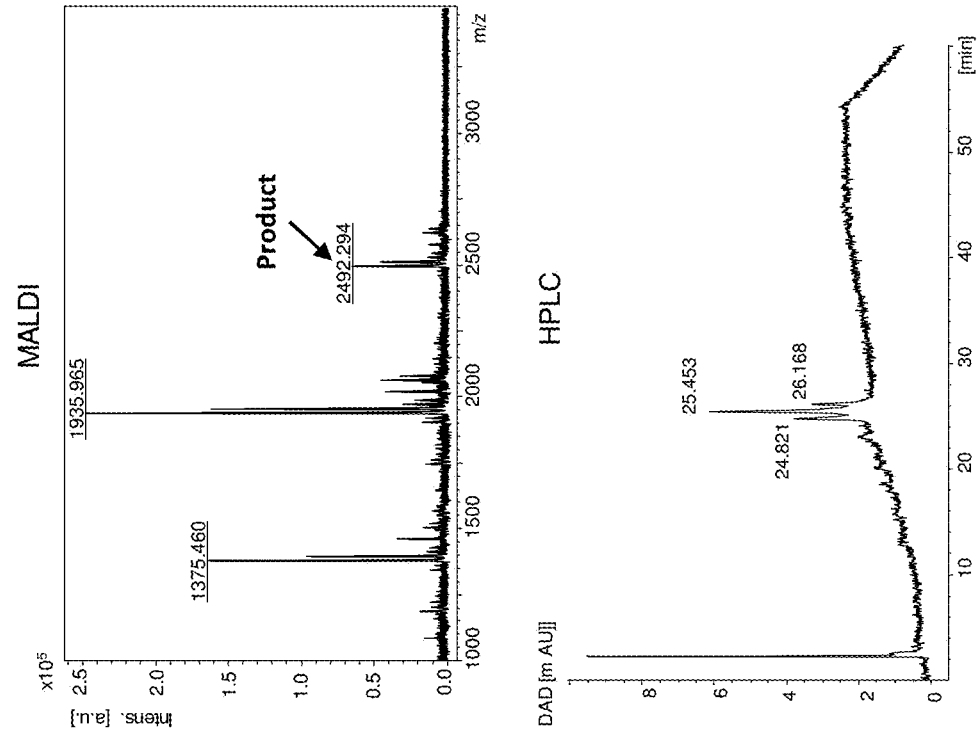
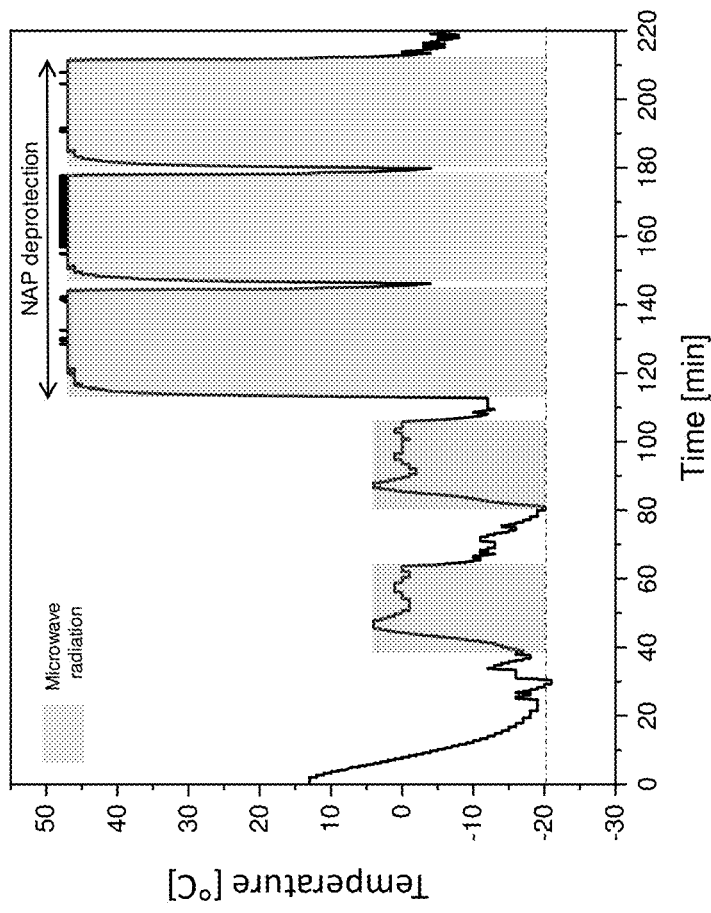
Figure 10B
Figure 10A

SYNTHESIZER FOR OLIGO- AND POLYSACCHARIDES ON SOLID PHASE

CROSS-REFERENCE TO RELATED APPLICATIONS

This application is a Section 371 National Stage application of PCT International application No. PCT/EP/2020/080964, published as WO 2021/089623, filed Nov. 4, 2020, which claims benefit of priority to European Application Nos. EP 19207015.9, filed on Nov. 4, 2019, and EP 19216206.3, filed on Dec. 13, 2019, all of which are incorporated by reference in their entireties.

FIELD OF THE INVENTION

The present invention relates to a device for automated synthesis of oligo- and polysaccharides on solid support.

BACKGROUND OF THE INVENTION

Certain biopolymers, including polypeptides and polynucleotides are routinely synthesized by solid-phase methods in which individual subunits are added stepwise to a growing chain tethered to a solid support. Those approaches can be carried out using commercially available synthesizers in an automated or semi-automated manner. However, those general synthesizers do not allow the efficient synthesis of oligosaccharides on a solid support and typically result in poor yields and selectivity, due to the lack of control of reaction temperature.

Polysaccharides are the most abundant biomolecules on Earth and are essential for many vital biological functions. Energy, structural support, cell proliferation and differentiation, host-pathogen recognition and cancer invasion are among the numerous areas that oligosaccharides and glycoconjugates participate and regulate. Because biochemical techniques to purify pure oligosaccharides from natural sources are difficult and inefficient, chemical and enzymatic approaches, or combinations thereof, are often the only reliable methods to access pure oligosaccharides. Efforts to reduce the time and resources spent on traditional chemical syntheses have focused mainly on automated glycan assembly (AGA) on solid supports.

The advantages of solid-support synthesis have been appreciated since the development of peptide synthesis by Merrifield and oligonucleotide synthesis on polymer supports developed by Caruthers. Automated synthesis machines carry out the reaction sequences and the reactions are carried out in high yields by using excess reagents, which are simply removed by washing steps. Separation from the solid carrier and purification as post-automation steps are typically standardized. The keys to successful automated synthesis are reliable building blocks and resins, high-yield couplings and reliable instrumentation.

Since the introduction of AGA by Seeberger in 2001, many aspects of the synthesis process have been systematically improved. Synthetic glycans of increasing length and complexity up to a chain length of 50 units were assembled with the help of AGA. The quality control of the stereo- and regiochemical composition of synthetic products was greatly accelerated by the use of ion mobility mass spectrometry (IM-MS). The overall AGA process was greatly improved and led to the development of the first commercial Glyconeer 2.1® automated oligosaccharide synthesizer.

Depending on the molecular weight of the sugar, 10-50 mg of completely protected oligosaccharide is obtained from the resin in this batch size. After deprotection and purification of the final product, often only 2-15 mg of the desired oligosaccharide product remains. These amounts are often sufficient for biochemical investigations and have been successfully used to produce glycan arrays. However, significantly more material is required for studies in other scientific areas. Carbohydrates in the form of cellulose and chitin are the two dominant biopolymers that require 100 mg or more of synthetic compounds to investigate their material properties.

Common carbohydrate synthesizers utilize a gas distribution system to transfer reagents and solvents from the storing vessels to a reaction vessel in which the synthesis takes place. The transfer of the reagents is therefore controlled by the pressure of inert gas applied in the synthesizer. The gas distribution system usually comprises a valve or valve assembly to form fluid connections with the storing vessels. While the reagents are stored in different vessels, cross-contamination may occur due to the fluid connections with the gas distribution system, which establishes a common gas phase (atmosphere) between the reagents. Thus, the reagents, particularly volatile reagents, may diffuse through the synthesizer and react with other reagents within the fluid connections, i.e. lines or gas tubing.

Typically, acidic activating agents and basic deprotection reagents are used in carbohydrate synthesizers. When these incompatible reagents get into contact, they neutralize (quench) each other, thereby deactivating the reagents or reagent solutions. In addition, cross-contamination may also cause salt formation ubiquitously in the synthesizer, and therefore leads to blocking of tubing and valves. These components may corrode over time and need to be replaced regularly by a costly repair.

The glycan synthesizer of WO 2010/011828 A1 is equipped with loops for separate transfer of reagents via fluidic rotary valves with different reactivity. The reagents are isolated in the loop and not drawn into a pump in order to prevent cross-contamination. Each component of the synthesizer is connected to the same inert gas manifold, which creates a common gas atmosphere within the synthesizer and makes it vulnerable for diffusive transport of volatile reagents through the synthesizer. At the same time, such distribution system is costly demanding an arrangement of valves, long tubing and pumps. The delivery of reagents is slowed down in order to avoid damages to the pump elements due to the (pump) cavitation effect. Hence, mechanical elements (of, e.g. the pumps) are incompatible to a high flow rate of high vapor pressure solutions, particularly of methylene chloride based solutions, as methylene chloride is the main solvent during glycosylation reactions.

It is therefore the objective of the present invention to provide an improved efficient and long-lasting synthesizer for oligo- and polysaccharides on a solid support.

The objective of the present invention is solved by the teachings of the independent claims. Further advantageous features, aspects and details of the invention are evident from the dependent claims, the description, the figures, and the examples of the present application.

BRIEF DESCRIPTION OF THE INVENTION

The present invention is related to an automated synthesiser for oligo- and polysaccharides on a solid support, wherein the gas phase of each reagent or each group of reagents of same or similar reactivity is separated within the lines and gas tubing that connect the components of the synthesizer. Separate lines or gas tubing between the components and vessels having different ports for different reagents to be supplied cannot prevent cross-contamination completely. During transfer of different reagents from the respective storage vessels to the reaction vessel different pressures are applied, which may cause the reagents to move forward (downstream) to the reaction vessel, but also backward (upstream) to the pump or inert gas line. The inert gas line is connected to various components (e.g. storing vessels and reaction vessel) of the synthesizer so that the reagents may diffuse ubiquitously throughout the synthesizer.

Cross-contamination of reagents or reagent solution may not only lead to deactivation of these reagents and therefore to lower reaction performance in terms of lower yields or longer reaction times, but also to the fact that sensitive components of the synthesizer, such as membranes, fittings, seals and valves are exposed to corrosive chemicals over a prolonged time. Moreover, acidic activating reagents and basic deprotection reagents may form salts when combined. Over time these salts may build up ubiquitously in the synthesizer and block tubing and valves. This can lead to costly repairs, as these components need to be replaced more often to maintain their functionality and tightness The inventors have found that a permanent separation of the gas atmosphere of each reagent or each group of reagents of same or similar reactivity is required to stop undesired diffusion of volatile corrosive reagents in the synthesizer. A permanent separation of the atmosphere of the reagents is achieved when the backflow (upstream) of reagents is prevented, such that the different reagents cannot diffuse through the synthesiser via fluid communications (lines and gas tubing or the inert gas line). Furthermore, by separating the gas lines leading from the main manifold, the gas conditions of each line, such as pressure and flow rate can be adjusted for specific incompatible services, which may not be realized with a single gas line, such as mixing in the reaction vessel (for example, during the glycosylation) by bubbling as well as providing a gas blanket or driving deprotection reagents (simultaneously).

Thus, the present invention relates to a synthesizer (100) for automated multistep synthesis on a solid support comprising:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802) establishing a fluid communication between each of the one or more reagent containers (630, 631, 632 . . . ), the reaction vessel (400), and the gas container (801), wherein at least two fluid communications are permanently separate of each other.

Thus, the synthesizer (100) for automated multistep synthesis on a solid support comprises an inert gas delivery system (800), which prevents mixing of atmospheres of different reagents, which are stored in the respective reagent containers (630, 631, 632 . . . ) and transferred during synthesis to the reaction vessel (400) by the reagent delivery system (600).

The synthesizer (100) as disclosed herein is especially suitable for glycan synthesis. Consequently, the term "synthesizer" as used herein can be replaced by the term "synthesizer for oligo- and polysaccharides".

In other words, the present invention relates to a synthesizer (100) for automated multistep synthesis on a solid support comprising:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802) establishing a fluid communication between each of the one or more reagent containers (630, 631, 632 . . . ), the reaction vessel (400), and the gas container (801), wherein at least two fluid communications are separate of each other and the atmosphere of the reagents is permanently separated.

Reworded, the present invention relates to a synthesizer (100) for automated multistep synthesis on a solid support comprising:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802) establishing a fluid communication between each of the one or more reagent containers (630, 631, 632 . . . ), the reaction vessel (400), and the gas container (801), wherein at least two fluid communications are separate of each other and the gas phase of the reagents is permanently separated.

Reworded, the present invention relates to a synthesizer (100) for automated multistep synthesis on a solid support comprising:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802) establishing a fluid communication between each of the one or more reagent containers (630, 631, 632 . . . ), the reaction vessel (400), and the gas container (801), wherein at least two fluid communications are at any time separate of each other.

Also, the present invention relates to a synthesizer (100) for automated multistep synthesis on a solid support comprising:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other, (d) an inert gas delivery system (800) comprising a gas container (801) and a gas valve manifold (802) establishing a fluid communication between each of the one or more reagent containers (630, 631, 632 . . . ), the reaction vessel (400), and the gas container (801), wherein at least two fluid communications are separate of each other and the gas phase of the reagents is permanently separated.

As mentioned above a permanent separation of the atmosphere of the reagents is achieved when the backflow (upstream) of reagents is prevented, such that the different reagents cannot diffuse through the synthesiser via fluid communications (lines and gas tubing or the inert gas line). Thus, in one embodiment of the inventive synthesizer, the inert gas delivery system (800) allows for the flow of reagents, solvents and inert gas only in one direction. Therefore, the present invention relates to a synthesizer (100) for automated multistep synthesis on a solid support comprising:

(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802) establishing a one-direction fluid communication between each of the one or more reagent containers (630, 631, 632 . . . ), the reaction vessel (400), and the gas container (801), wherein at least two one-direction fluid communications are separate of each other.

Thus, in one embodiment of the inventive synthesizer (100), the inert gas delivery system (800) allows the flow of reagents, solvents and inert gas only in the downstream direction, i.e. from the respective reagent containers (630, 631, 632 . . . ), solvent containers and gas container (801) to the reaction vessel.

Therefore, the present invention relates to a synthesizer (100) for automated multistep synthesis on a solid support comprising:

(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802) establishing a one-direction fluid communication between each of the one or more reagent containers (630, 631, 632 . . . ), the reaction vessel (400), and the gas container (801), wherein at least two one-direction fluid communications are separate of each other, and wherein each one-direction fluid communication is established in downstream direction.

In a particular embodiment, the atmospheres of the reagents are permanently separated in the inventive synthesizer by means for passing the flow of a reagent in one direction. Thus, the present invention relates to a synthesizer (100) comprising a gas valve manifold equipped with means for passing the flow of a reagent in one direction. Thus, the present invention relates to a synthesizer (100) for automated multistep synthesis on a solid support comprising:

(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802) establishing a fluid communication between each of the one or more reagent containers (630, 631, 632 . . . ), the reaction vessel (400), and the gas container (801), wherein at least two fluid communications are separate of each other and the gas valve manifold (802) is equipped with means for passing the flow of a reagent in one direction.

The means for passing the flow of a reagent in one direction are preferably configured to only allow the flow of a reagent downstream, i.e. from the respective reagent containers (630, 631, 632 . . . ), solvent containers and gas container (801) to the reaction vessel. Thus, the present invention relates to a synthesizer (100) for automated multistep synthesis on a solid support comprising:

(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802) establishing a fluid communication between each of the one or more reagent containers (630, 631, 632 . . . ), the reaction vessel (400), and the gas container (801), wherein at least two fluid communications are separate of each other and the gas valve manifold (802) is equipped with means for passing the flow of a reagent in downstream direction.

In other words, the present invention relates to a synthesizer (100) for automated multistep synthesis on a solid support comprising:

(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802) establishing a fluid communication between each of the one or more reagent containers (630, 631, 632 . . . ), the reaction vessel (400), and the gas container (801), wherein at least two fluid communications are separate of each other and the gas valve manifold (802) is equipped with means for preventing flow of reagents into the gas valve manifold (802).

Particularly, the present invention relates to a synthesizer (100) for automated multistep synthesis on a solid support comprising:
- (a) a reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

The means for passing the flow of a reagent in one direction or the means for preventing flow of reagents into the manifold line is preferably an actuator or a valve.

In a further embodiment, the gas valve manifold of the inventive synthesizer (100) comprises a manifold line connected to at least three output lines, wherein each output line is equipped with a check valve for preventing backflow of reagents from the reagent containers (630, 631, 632 . . . ) into the manifold line.

In a further embodiment of the inventive synthesizer (100) each output line of the gas valve manifold further comprises a pressure regulator valve (848) for regulating the pressure of each output line individually, and a pressure sensor.

In a further alternative embodiment, the gas valve manifold of the inventive synthesizer (100) the gas valve manifold is constructed of two layers:
- (i) a first layer (861) holding the manifold line (840); and
- (ii) a second layer (862) comprising the at least three output lines (852) and the means for preventing flow of reagents into the manifold line, wherein the at least three output lines (852) are connected to the manifold line (840).

The second layer (862) may further comprise optionally means for adjusting the output pressure or gas flow rate of each output line, such as pressure regulator valves (848), pressure sensors, pressure indicators and/or check valves.

In a further embodiment, the gas valve manifold of the inventive synthesizer (100) the gas valve manifold is constructed of three layers:
- (i) a first layer (861) holding the manifold line (840);
- (ii) a second layer (862) comprising the at least three output lines (852), wherein the at least three output lines (852) are connected to the manifold line (840); and
- (iii) a third layer (863) comprising the means for preventing flow of reagents into the manifold line.

The third layer (863) may further comprise optionally means for adjusting the output pressure or gas flow rate of each output line, such as pressure regulator valves (848), pressure sensors, pressure indicators and/or check valves.

BRIEF DESCRIPTION OF THE DRAWINGS

FIG. 3C shows the technical drawing of the manifold third (side element) layer (863).

FIG. 7A shows charts comparing temperature readings inside the glass reaction vessel (400) and the chiller side, taken during a synthesis cycle via phosphate-glycosylation, with the post coupling reactions assisted by microwave irradiation.

FIG. 8A shows charts comparing temperature readings inside the glass reaction vessel (400) and the chiller side, taken during a synthesis cycle via phosphate-glycosylation, with temperature adjustment during the coupling and post coupling reactions via microwave irradiation.

FIG. 10A shows temperature charts of the first cycle during the synthesis of 5-amino-pentyl α-(1→2)-D-tetra-mannopyranoside (example 6). The solid line follows the temperature inside the reaction. The dash line shows the temperature at the cooling jacket side. The grey areas highlight the microwave irradiation periods allowing the adjustment of the temperature inside the reaction vessel (400). The NAP deprotection period is indicated.

FIG. 10B shows analytical results by MALDI (the mass of the product is mark plus sodium ion) and HPLC of experiments from synthesis EXAMPLE 6.

DESCRIPTION OF THE INVENTION

Figure 1:
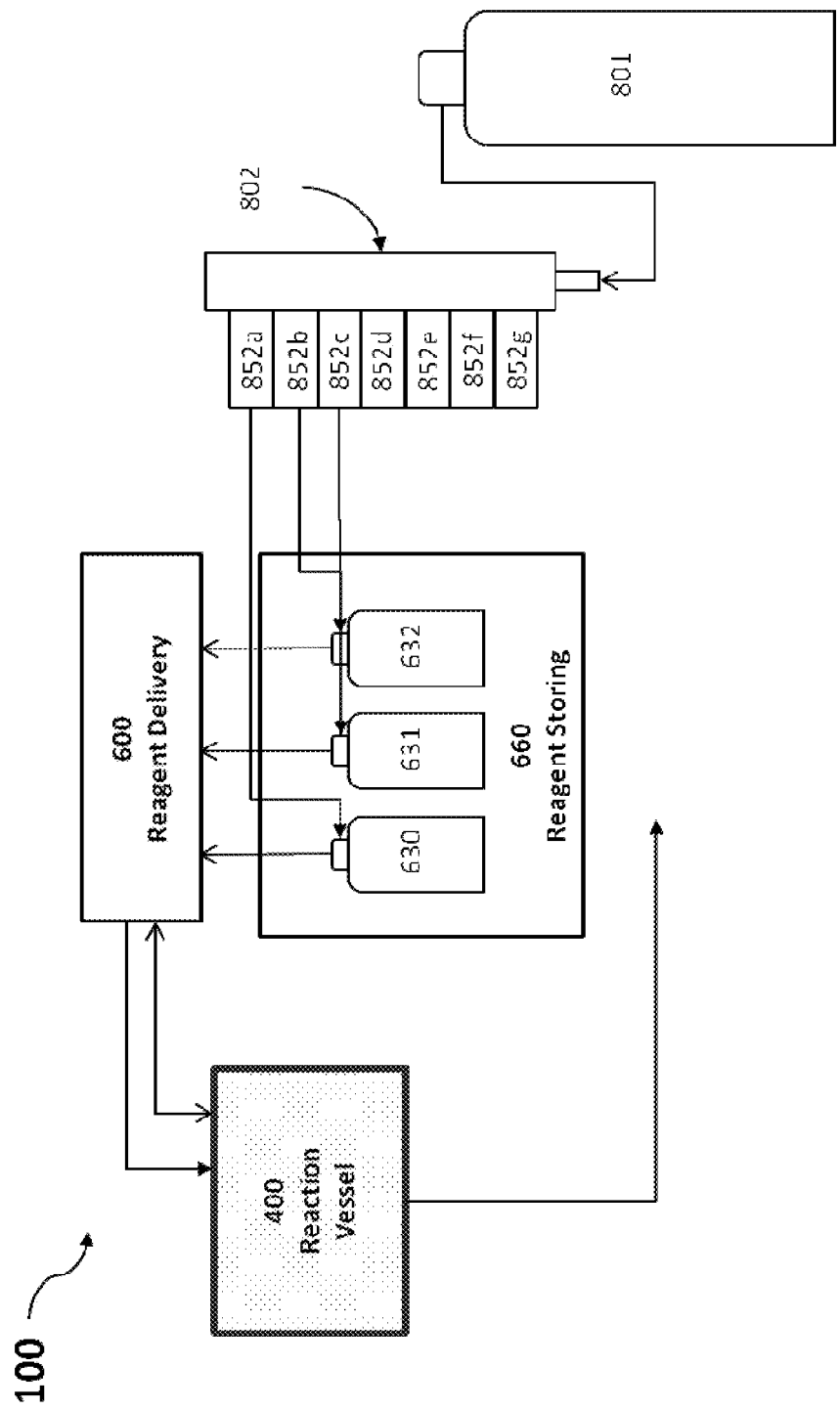
FIG. 1 shows a block diagram illustrating the inventive automated synthesizer (100) with an inert gas delivery system (800) comprising a gas valve manifold and output lines.

Solid phase synthesis of oligo- or polysaccharides has been proven as suitable synthesis strategy for synthesizing oligo- and polysaccharides, in particular in connection with automation of the synthesis process. For solid phase synthesis of oligo- or polysaccharides the repetitive nature of glycosylation and deprotection can easily be framed into a coupling cycle. There is a long-felt need for an efficient method for synthesizing oligo- or polysaccharides, in particular an efficient automated method for synthesizing oligo- or polysaccharides.

As used herein, the term "glycosylation reaction" or "coupling reaction" relates in the most general sense to a formation of an acetal connecting two sugar units. The anomeric substituent of a glycosyl donor acts as a leaving group thereby generating an electrophilic intermediate. Reaction of this species with a nucleophile, typically a hydroxyl group or amine group of a glycosyl acceptor, leads to the formation of a glycosidic linkage. Thus, the term "glycosylation reaction" or "coupling reaction" refers to reactions between a glycosyl donor and a glycosyl acceptor, wherein the reducing end of the donor reacts with a free hydroxy or amine group of the acceptor. Thus, O-glycosylation or N-glycosylation methods are preferably employed in the coupling reaction of the method according to the invention. More preferably, O-glycosylation methods are employed in the coupling reaction of the method according to the invention. These glycosylation methods are known from the state of the art. Generally, they require a leaving group at the reducing end of the donor, which is activated in the presence of a catalyst. The glycosylation reactions take place upon treatment of a donor and an acceptor with a "glycosylation reagent" which acts as an activator or an activating agent. Glycosylation reagent, as used herein, refer to chemical compounds known to the skilled person, which include, but are not restricted to: AgOTf, BF3·OEt2, trimethylsilyl trifluoromethanesulfonate (TMSOTf), trifluoromethanesulfonic acid (TfOH), trifluoromethanesulfonic anhydride (Tf$_2$O, triflic anhydride), lanthanoid(III) triflates, NIS/AgOTf, NIS/TfOH or dimethyl(methylthio)sulfonium trifluoromethanesulfonate (DMTST). Consequently, enzymes are no glycosylation reagents within the context of the present invention.

The term "coupling cycle" or "synthesis cycle" or "glycosylation cycle" as used herein relates to an iterative or repetitive sequence of coupling reactions and deprotection steps in the synthesis of oligo- or polysaccharides. In this synthesis strategy, the carbohydrate chain is elongated in a stepwise manner and thus gradually extended through each synthesis cycle until the desired oligo- or polysaccharide is obtained.

The term "solid support" as used herein refers to an insoluble, functionalized, polymeric material to which saccharides or other reagents may be attached or immobilized, directly or via a linker bearing an anchoring group, allowing saccharides to be readily separated (by washing, filtration, centrifugation, etc.) from excess reagents, soluble reaction by-products, or solvents. The solid support has preferably the form of beads or Controlled Pore Glass.

The term "downstream" as used herein refers to the direction of flow of reagents, solvents and/or inert gas through the reagent delivery system (600) to the reaction vessel (400).

The term "upstream" as used herein refers to the opposite downstream direction, i.e. to the direction of flow of reagents, solvents and/or inert gas through the reagent delivery system (600) from the reaction vessel (400) to the respective containers.

The term "backflow" as used herein refers to a reversal of flow direction, i.e. reagents, solvents and/or inert gas flows upstream.

The term "backpressure" as used herein refers to the pressure on the downstream side of a check valve.

Surprisingly, the inventors have found that in a synthesizer for oligo- and polysaccharides comprising an inert gas delivery system with a gas valve manifold having means for passing the flow of a reagent in one direction and preferably having means for preventing backflow of a reagent, cross-contamination of reagents, precipitation of reagents, as well as diffusion of reagents do not occur. During transfer of different reagents from the respective storing vessels to the reaction vessel (400) different pressures are applied, which may cause the reagents to move forward (downstream) to the reaction vessel, but also backward (upstream) to the pump or inert gas line. The inert gas delivery system (800) of the inventive synthesizer comprises means for passing the flow of a reagent in one direction, which prohibits backflow of reagents to the pump or inert gas line.

Consequently, sensitive components of the synthesizer, such as membranes, fittings, seals and valves are less exposed to corrosive chemicals, thereby rendering the synthesizer more durable and less susceptible to repairs.

Thus, the synthesizer according to the present invention is particularly suitable for automated multi-step synthesis on solid support, wherein multiple incompatible reagents are used that should not get into contact with each other within the synthesizer, except in the reaction vessel (400). Thus, the inventive synthesizer enables separation of incompatible reagents such as acids and bases, which may produce salts when combined. Over time these salts may build up ubiquitously in the synthesizer and block tubing and valves that may corrode sensitive components of the synthesizer, which may lead to costly repairs. It is therefore necessary that the solutions to remove the protecting groups (for example protecting groups, such as Fmoc, Lev, ClAc, and NAP, and acetyl capping solutions) are delivered via separate fluid communications to the reaction vessel.

A separate fluid communication is achieved by using an inert gas delivery system (800) for driving the reagents to the reaction vessel comprising a gas container (801) and a gas valve manifold, wherein the gas valve manifold establishes fluid communication between the gas container (801) and each reaction container in such a way that mixing of vapor phases of volatile incompatible substances, such as piperidine, pyridine and acidic reagents or organic solvents, which often contain acidic impurities such as chloroform or methylene chloride does not occur.

Consequently, the synthesizer (100) as disclosed herein is especially useful for the solid phase synthesis of oligo- and polysaccharides using incompatible reagents, i.e. using reagents and reagent solutions incompatible with each other.

In the inventive synthesizer (100) the fluid communication between the gas container (801), each of the one or more reagent containers (630, 631, 632 . . . ) and the reaction vessel (400) is established by the gas valve manifold (802). To this extent, the gas valve manifold (802) comprises a manifold line (840) and at least three output lines (852). The gas container (801) is connected to the manifold line, wherein the one or more reagent containers (630, 631, 632 . . . ) and the reaction vessel (400) are connected to a separate output line (852) of the gas valve manifold (802).

Such an inert gas delivery system (800) is capable of providing dedicated and separated inert atmospheres to different types of solvents and reagents; providing positive pressure to drive the delivery of reagents and/or solvents under certain flow rates; providing bubbling as mixing mechanism at the reaction vessel (400); and draining the content of the reaction vessel or an specific line in direction to the waste container (704).

Therefore, the present invention relates to a synthesizer (100) for automated multistep synthesis on a solid support comprising:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840),
wherein the gas container (801) is connected to the manifold line, the one or more reagent containers (630, 631, 632 . . . ) and the reaction vessel (400) are connected to a separate output line (852) of the gas valve manifold (802), thereby establishing at least three permanently separate fluid communications between the gas container (801) and each of the one or more reagent containers (630, 631, 632 . . . ) and the reaction vessel (400).

In a preferred embodiment, the synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840),
wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for passing the flow of a reagent in one direction.

In a preferred embodiment, the synthesizer (100) for automated multistep synthesis on a solid support comprises:
(a) a reaction vessel (400),
(b) a reagent storing component (660) comprising one or more reagent containers (630, 631, 632 . . . ), (c) a reagent delivery system (600) configured to establish a fluid communication between each of the one or more reagent containers (630, 631, 632 . . . ) and the reaction vessel (400), wherein at least two fluid communications are separate of each other, (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a means for preventing flow of reagents into the manifold line.

Preferably, the means for passing the flow of a reagent in one direction or the means for preventing flow of reagents into the manifold line is an actuator or a valve. Thus, in a preferred embodiment, the synthesizer (100) for automated multistep synthesis on a solid support comprises:

(a) a reaction vessel (400), (b) a reagent storing component (660) comprising one or more reagent containers (630, 631, 632 . . . ), (c) a reagent delivery system (600) configured to establish a fluid communication between each of the one or more reagent containers (630, 631, 632 . . . ) and the reaction vessel (400), wherein at least two fluid communications are separate of each other, (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a means for preventing flow of reagents into the manifold line, wherein said means for preventing flow of reagents into the manifold line is an actuator or a valve.

Preferably, said means is an actuator selected from hydraulic actuator, pneumatic actuator, electric actuator, mechanical actuator or magnetic actuator.

Preferably, the means for passing the flow of a reagent in one direction or the means for preventing flow of reagents into the manifold line is a check valve.

Thus, in a preferred embodiment, the synthesizer (100) for automated multistep synthesis on a solid support comprises:

(a) a reaction vessel (400), (b) a reagent storing component (660) comprising one or more reagent containers (630, 631, 632 . . . ), (c) a reagent delivery system (600) configured to establish a fluid communication between each of the one or more reagent containers (630, 631, 632 . . . ) and the reaction vessel (400), wherein at least two fluid communications are separate of each other, (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a check valve (833-839).

Thus, in all embodiments of the synthesizer (100) which is preferably a glycan synthesizer (100), the means for preventing flow of reagents into the manifold line is a check valve. Consequently, it is most preferred if each output line (852) of the at least three output lines (852) is equipped with a check valve.

Preferably, the check valve is selected from ball check valve, spring check valve, diaphragm check valve, swing check valve or tilting disc check valve, clapper valve, stop-check valve, lift-check valve, in-line check valve, duckbill valve, pneumatic non-return valve, double check valve, or double ball check valve.

Most preferably, the check valve is a spring check valve.

Thus, in a preferred embodiment, the synthesizer (100) for automated multistep synthesis on a solid support comprises:

(a) a reaction vessel (400), (b) a reagent storing component (660) comprising one or more reagent containers (630, 631, 632 . . . ), (c) a reagent delivery system (600) configured to establish a fluid communication between each of the one or more reagent containers (630, 631, 632 . . . ) and the reaction vessel (400), wherein at least two fluid communications are separate of each other, (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a check valve, wherein the check valve selected from spring check valve, ball check valve, diaphragm check valve, swing check valve or tilting disc check valve, clapper valve, stop-check valve, lift-check valve, in-line check valve, duckbill valve, pneumatic non-return valve, double check valve, or double ball check valve.

In a preferred embodiment, the synthesizer (100) for automated multistep synthesis on a solid support comprises:

(a) a reaction vessel (400), (b) a reagent storing component (660) comprising one or more reagent containers (630, 631, 632 . . . ), (c) a reagent delivery system (600) configured to establish a fluid communication between each of the one or more reagent containers (630, 631, 632 . . . ) and the reaction vessel (400), wherein at least two fluid communications are separate of each other, (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a spring check valve.

Preferably, the check valve is configured to close, when a backpressure of larger than 0.003 MPa (⅓ psi, 0.03 bar) is applied. Preferably, the check valve is configured to close, when a backpressure of larger than 0.04 MPa (6 psi, 0.4 bar) is applied. Preferably, the check valve is open at a backpressure in range of 0 MPa to 0.04 MPa, more preferably in the range of 0 MPa to 0.02 MPa, and most preferably in the range of 0 MPa to 0.003 MPa.

Thus, in a preferred embodiment, the synthesizer (100) for automated multistep synthesis on a solid support comprises:
- (a) a reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a check valve, wherein the check valve is configured to close, when a backpressure of larger than 0.003 MPa is applied.

Thus, in a preferred embodiment, the synthesizer (100) for automated multistep synthesis on a solid support comprises:
- (a) a reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a check valve, wherein the check valve is configured to close, when a backpressure of larger than 0.04 MPa is applied.

Preferably, the check valve is configured to open, when a cracking pressure, i.e. the minimum differential upstream pressure between inlet and outlet at which the valve will operate, between 0 MPa and 0.003 MPa (⅓ psi, 0.03 bar) is applied.

Preferably, the check valve is configured to open, when a cracking pressure between 0 MPa and 0.02 MPa (3 psi, 0.20 bar) is applied. Thus, in a preferred embodiment, the synthesizer (100) for automated multistep synthesis on a solid support comprises:
- (a) a reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a check valve, wherein the check valve is configured to open, when a cracking pressure between 0 MPa and 0.02 MPa is applied.

Thus, in a preferred embodiment, the synthesizer (100) for automated multistep synthesis on a solid support comprises:
- (a) a reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a check valve, wherein the check valve is configured to open, when a cracking pressure between 0 MPa and 0 MPa and 0.003 MPa is applied.

Preferably, the check valve has a flow coefficient $C_v$ between 0.02 and 0.2, more preferably between 0.03 and 0.17, more preferably between 0.03 and 0.15, and most preferably between 0.04 and 0.12. More preferably, the check valve has a flow coefficient $C_v$ of 0.09.

Thus, in a preferred embodiment, the synthesizer (100) for automated multistep synthesis on a solid support comprises:
- (a) a reaction vessel (400),
- (b) a reagent storing component (660) comprising one or more reagent containers (630, 631, 632 . . . ), (c) a reagent delivery system (600) configured to establish a fluid communication between each of the one or more reagent containers (630, 631, 632 . . . ) and the reaction vessel (400), wherein at least two fluid communications are separate of each other, (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a check valve, wherein the check valve is has a flow coefficient $C_v$ between 0.04 and 0.12.

In a further embodiment of the inventive synthesizer (100), each output line (852) of the gas valve manifold (802) further comprises a pressure regulator valve (848) for regulating the pressure of each output line (852) individually. The pressure regulator valves (848) at each output line enable to adjust the pressure and/or flow rate in each line individually, so that the transfer of reagents can be selectively controlled. Thus, in a preferred embodiment, the synthesizer (100) for automated multistep synthesis on a solid support comprises:

(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a means for preventing flow of reagents into the manifold line and a pressure regulator valve (848) for regulating the pressure of each output line (852) individually.

Preferably, said means for preventing flow of reagents into the manifold line is a check valve (833-839).

In a further embodiment of the inventive synthesizer (100), each output line (852) of the gas valve manifold (802) comprises a check valve (833-839), a pressure regulator valve (848) for regulating the pressure of each output line (852) individually, and a pressure sensor (823-829). The pressure regulator valves (848) at each output line enable to adjust the pressure and/or flow rate in each line individually, so that the transfer of reagents can be selectively controlled. Thus, in a preferred embodiment, the synthesizer (100) for automated multistep synthesis on a solid support comprises:

(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a means for preventing flow of reagents into the manifold line, a pressure regulator valve (848) for regulating the pressure of each output line (852) individually, and a pressure sensor (823-829).

Preferably, said means for preventing flow of reagents into the manifold line is a check valve (833-839).

Figure 2:
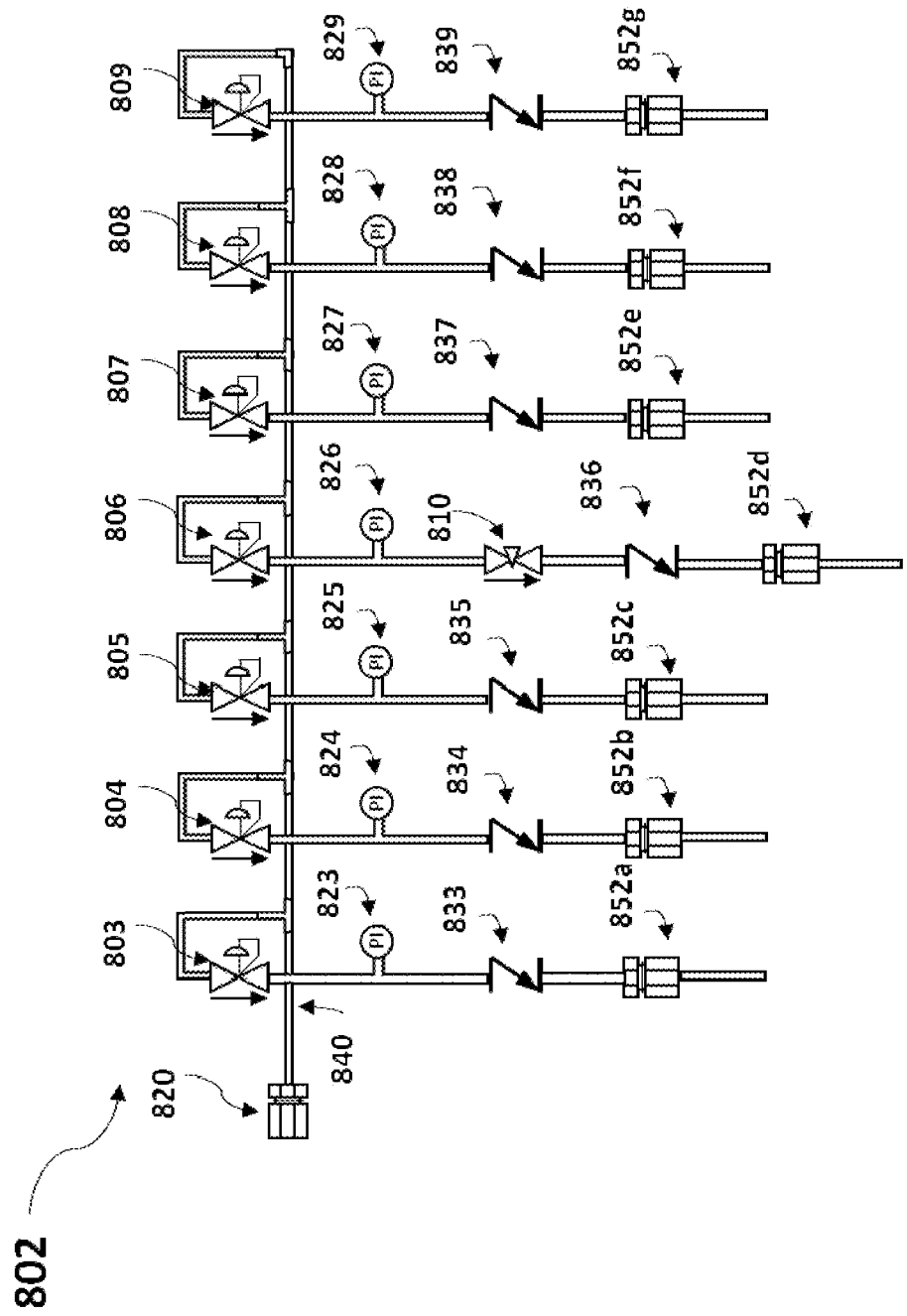
FIG. 2 shows a schematic drawing of an embodiment of the gas valve manifold of the inventive synthesizer (100) comprising a pressure regulator valve, a pressure sensor and a check valve at each output line.

FIG. 2 shows in detail an embodiment of the gas manifold of the inert gas system. Each line counts at least with: a pressure regulator valve (848), a pressure sensor (823-829), and a check valve (833-839). In addition, a flow control valve (810) allows regulating the flow rate of inert gas serving as bubbling gas for mixing the reagent. The inlet and outlets tubing of manifold are provided with tubing connectors (e.g. 820) to prevent leakage. The manifold output lines (852a-852g) distribute separate gas line to the different components, sections or services required in the synthesizer (100), with individually adjusted pressure, and one or more gas flow rates adjusted lines when is needed. In the absence of pressure difference (standby mode); the check valves (833-839) will close thereby isolating the atmospheres from the different blocks, services (bubbling, reactor discharging gas), reagents (building block/donor, activators, deprotection, capping) and solvents. Such arrangement prevents the undesirable contamination by volatile and incompatible species used during the glycosylation.

In a further embodiment of the inventive synthesizer (100), each output line (852) of the gas valve manifold (802) comprises a check valve (833-839), a pressure regulator valve (848) for regulating the pressure of each output line (852) individually, a pressure sensor (823-829) and a pressure indicator (849). The pressure indicators allow the observation and control of the pressure adjusted by the pressure regulators for each output line. Therefore, the pressure indicator is preferably deposited downstream to the pressure regulator valve (848) on the output line. Thus, in a preferred embodiment, the synthesizer (100) for automated multistep synthesis on a solid support comprises:

(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a means for preventing flow of reagents into the manifold line, a pressure regulator valve (848) for regulating the pressure of each output line (852) individually, a pressure sensor (823-829) and a pressure indicator (849).

Preferably, said means for preventing flow of reagents into the manifold line is a check valve (833-839).

Preferably, the pressure regulator valves (803-809) of the gas valve manifold of the inventive synthesizer (100) are pressure reducing regulator valves, back-pressure regulator back-pressure valves, pressure sustaining valves or pressure sustaining regulator valves. Preferably, the pressure regulator valves are pressure reducing valves. Suitable pressure control ranges lie within, but are not restricted to, 0 MPa and 1 MPa, more preferably between 0 MPa and 0.9 MPa, more preferably between 0 MPa and 0.8 MPa, more preferably between 0 MPa and 0.7 MPa, more preferably between 0 MPa and 0.6 MPa, more preferably between 0 MPa and 0.5 MPa, more preferably between 0 MPa and 0.4 MPa, more preferably between 0 MPa and 0.3 MPa, more preferably between 0 MPa and 0.2 MPa, more preferably between 0 MPa and 0.1 MPa, more preferably between 0 MPa and 0.05 MPa, more preferably between 0 MPa and 0.02 MPa, and most preferably between 0 MPa and 0.07 MPa.

Preferably, the pressure regulator valves work at a maximum inlet pressure of 1 MPa, more preferably of 0.9 MPa, more preferably of 0.8 MPa, more preferably of 0.7 MPa, more preferably of 0.6 MPa, more preferably of 0.5 MPa, more preferably of 0.4 MPa, more preferably of 0.3 MPa, and most preferably of 0.7 MPa.

Preferably, the pressure regulator valves may comprise a handle mechanism, such as thumbwheel or they could be electronically controlled by a processor (200), thereby no handle mechanism is required.

Thus, in a preferred embodiment, the synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840),
wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a means for preventing flow of reagents into the manifold line and a pressure regulator valve (848) for regulating the pressure of each output line (852) individually, wherein the pressure regulator valves are pressure reducing regulator valves, back-pressure regulator back-pressure valves, pressure sustaining valves, pressure sustaining regulator valves or orifice valves. Preferably, the means for preventing flow of reagents into the manifold line is a check valve.

The pressure regulator valves (848) adjust the pressure of each individual output line. Preferably, the pressure regulator valves (848) are configured to adjust the pressure in the output line between 0 kPa and 1000 kPa, more preferably between 0 kPa and 900 kPa, more preferably between 0 kPa and 800 kPa, more preferably between 0 kPa and 700 kPa, more preferably between 0 kPa and 600 kPa, more preferably between 0 kPa and 500 kPa, more preferably between 0 kPa and 400 kPa, more preferably between 0 kPa and 300 kPa, more preferably between 0 kPa and 200 kPa, more preferably between 0 kPa and 170 kPa, more preferably between 0 kPa and 100 kPa, and most preferably between 0 kPa and 70 kPa. Preferably, the pressure regulator valves (848) are configured to adjust the pressure in the output line between 0 kPa and 170 kPa or between 0 kPa and 70 kPa.

Thus, in a preferred embodiment, the synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840),
wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a means for preventing flow of reagents into the manifold line and a pressure regulator valve (848) for regulating the pressure of each output line (852) individually, wherein the pressure regulator valves are configured to adjust the pressure in the output line in the range from 0 kPa and 170 kPa or in the range from 0 kPa and 70 kPa.

Preferably, the means for preventing flow of reagents into the manifold line is a check valve.

Preferably, the pressure regulator valves have a flow coefficient $C_v$ between 0.02 and 0.2, more preferably between 0.03 and 0.17, more preferably between 0.03 and 0.15, and most preferably between 0.04 and 0.12. More preferably, the pressure regulator valves have a flow coefficient $C_v$ of 0.06. The flow coefficient describes the relationship between the pressure drop across an orifice valve or other assembly and the corresponding flow rate. Thus, in a preferred embodiment, the synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840),
wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a means for preventing flow of reagents into the manifold line and a pressure regulator valve (848) for regulating the pressure of each output line (852) individually, wherein the pressure regulator valves have a flow coefficient $C_v$ between 0.04 and 0.12.

Preferably, the means for preventing flow of reagents into the manifold line is a check valve.

In a preferred embodiment, the means for preventing flow of reagents into the manifold line is deposited downstream to the pressure regulator valve, such that the inert gas flow passes the pressure regulator valve first and then the means for preventing flow of reagents into the manifold line. Thus, in a preferred embodiment, the synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840),
wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein each of the at least three output lines (852) is equipped with a means for preventing flow of reagents into the manifold line, a pressure regulator valve (848) for regulating the pressure of each output line (852) individually, a pressure sensor (823-829) and a pressure indicator (849), wherein the components are located in the following order downstream on each output line (852): pressure regulator valve for regulating the pressure of each output line individually, pressure sensor (823-829), pressure indicator (849), and means for preventing flow of reagents into the manifold line.

Preferably, the means for preventing flow of reagents into the manifold line is a check valve.

In one example, the gas valve manifold comprises three separate output lines, wherein one output line is connected to the reagent containers (630, 631, 632 . . . ), which contain acidic activation agents (glycosylation reagents), one output line is connected to the reagent containers (630, 631, 632 . . . ), which contain basic deprotection reagents and the third output line is connected to the reaction vessel for flushing or discharging the reaction vessel. Through these output lines inert gas is distributed to the reagent containers (630, 631, 632 . . . ) and the reaction vessel (400), which enables among others the provision of dedicated and separated inert atmospheres to different types of solvents and reagents; the provision of positive pressure to drive the delivery of reagents and/or solvents under certain flow rate; the provision of bubbling as mixing mechanism at the reaction vessel; and draining the content of the reaction vessel or an specific line in direction to the waste container (704).

Thus, in a preferred embodiment, the synthesizer (100) for automated multistep synthesis on a solid support comprises:
(a) a reaction vessel (400),
(b) a reagent storing component (660) comprising one or more reagent containers (630, 631, 632 . . . ) wherein the one or more reagent containers (630, 631, 632 . . . ) comprises reagent containers (630, 631, 632 . . . ) for glycosylation reagents, reagent containers (630, 631, 632 . . . ) for deprotection reagents,
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840),
wherein the gas container (801) is in fluid communication with the manifold line,
wherein each of the at least three output lines (852) is equipped with a check valve (833-839), and
wherein the reagent containers (630, 631, 632 . . . ) for glycosylation reagents are in fluid communication with a first output line (852*a*), the reagent containers (630, 631, 632 . . . ) for deprotection reagents are in fluid communication with a second output line (852*b*), and the reaction vessel (400) is in fluid communication with a third output line (852*c*) of the gas valve manifold (802).

In a preferred embodiment, the synthesizer (100) for automated multistep synthesis on a solid support comprises:
(a) a reaction vessel (400),
(b) a reagent storing component (660) comprising one or more reagent containers (630, 631, 632 . . . ), wherein the one or more reagent containers (630, 631, 632 . . . ) comprises reagent containers for glycosylation reagents, reagent containers for deprotection reagents and reagent containers for building blocks,
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least four output lines (852) connected to the manifold line (840),
wherein the gas container (801) is in fluid communication with to the manifold line,
wherein each of the at least four output lines (852) is equipped with a check valve (833-839), and
wherein the reagent containers (630, 631, 632 . . . ) for glycosylation reagents are in fluid communication with a first output line (852*a*), the reagent containers (630, 631, 632 . . . ) for deprotection reagents are in fluid communication with a second output line (852*b*), the reagent containers (630, 631, 632 . . . ) for building blocks are in fluid communication with a third output line (852*c*) and the reaction vessel (400) is in fluid communication with a fourth output line (852*d*) of the gas valve manifold (802).

Thus, in a preferred embodiment, the synthesizer (100) for automated multistep synthesis on a solid support comprises:
  (a) a reaction vessel (400),
  (b) a reagent storing component (660) comprising one or more reagent containers (630, 631, 632 . . . ),
  (c) a reagent delivery system (600) configured to establish a fluid communication between each of the one or more reagent containers (630, 631, 632 . . . ) and the reaction vessel (400), wherein at least two fluid communications are separate of each other,
  (d) an inert gas delivery system (800) comprising a gas container (801) and a gas valve manifold (802), wherein the gas valve manifold (802) comprises a manifold line (840) and at least three output lines (852) connected to the manifold line (840),
  wherein the gas container (801) is in fluid communication with the manifold line, the one or more reagent containers (630, 631, 632 . . . ) are in at least two separate fluid communications with the output lines (852*a*, 852*b*) and the reaction vessel (400) is in fluid communication with output line (852*c*) of the gas valve manifold (802), and wherein each of the at least three output lines (852) is equipped with a check valve (833-839), and wherein the output line (852*c*) is equipped with a flow control valve (810).

The flow control valve (810) allows regulating the flow rate of inert gas delivered to the reaction vessel (400), which enables discharging the reactor and purging gas through the reactor for mixing the reagents (bubbling). In another embodiment, the flow control valve (810) is electronically controlled by a processor (200) adjusting the valve opening via software.

Thus, in a preferred embodiment, the synthesizer (100) for automated multistep synthesis on a solid support comprises:
  (a) a reaction vessel (400),
  (b) a reagent storing component (660) comprising one or more reagent containers (630, 631, 632 . . . ),
  (c) a reagent delivery system (600) configured to establish a fluid communication between each of the one or more reagent containers (630, 631, 632 . . . ) and the reaction vessel (400), wherein at least two fluid communications are separate of each other,
  (d) an inert gas delivery system (800) comprising a gas container (801) and a gas valve manifold (802), wherein the gas valve manifold (802) comprises a manifold line (840) and at least three output lines (852) connected to the manifold line (840),
  wherein the gas container (801) is in fluid communication with the manifold line, the one or more reagent containers (630, 631, 632 . . . ) are in at least two fluid communication with the output lines (852*a*, 852*b*) and the reaction vessel (400) is in fluid communication with output line (852*c*) of the gas valve manifold (802), wherein each of the at least three output lines (852) is equipped with a check valve (833-839), a pressure regulator valve (848) for regulating the pressure of each output line (852) individually, and a pressure sensor (823-829), and wherein the output line (852*c*) is equipped with a flow control valve (810).

Preferably, the gas valve manifold of the inventive synthesizer (100) comprises at least three output lines, more preferably at least four output lines, more preferably at least 6 output lines and most preferably, at least 7 output lines. Preferably, the gas valve manifold of the inventive synthesizer comprises 5 output lines. Preferably, the gas valve manifold of the inventive synthesizer comprises 7 output lines. Thus, in a preferred embodiment, the synthesizer (100) for automated multistep synthesis on a solid support comprises:
  (a) a reaction vessel (400),
  (b) a reagent storing component (660) comprising one or more reagent containers (630, 631, 632 . . . ),
  (c) a reagent delivery system (600) configured to establish a fluid communication between each of the one or more reagent containers (630, 631, 632 . . . ) and the reaction vessel (400), wherein at least two fluid communications are separate of each other,
  (d) an inert gas delivery system (800) comprising a gas container (801) and a gas valve manifold (802), wherein the gas valve manifold (802) comprises a manifold line (840) and at least five output lines (852) connected to the manifold line (840),
  wherein the gas container (801) is in fluid communication with the manifold line, the one or more reagent containers (630, 631, 632 . . . ) are in at least two separate fluid communications with the output lines (852*a*, 852*b*) and the reaction vessel (400) is in fluid communication with output line (852*c*) of the gas valve manifold (802), and
  wherein the at least three output lines (852) are equipped with a means for preventing flow of reagents into the manifold line.

Preferably, the means for preventing flow of reagents into the manifold line is a check valve.

Preferably, the synthesizer (100) for automated multistep synthesis on a solid support comprises:
  (a) a reaction vessel (400),
  (b) a reagent storing component (660) comprising one or more reagent containers (630, 631, 632 . . . ),
  (c) a reagent delivery system (600) configured to establish a fluid communication between each of the one or more reagent containers (630, 631, 632 . . . ) and the reaction vessel (400), wherein at least two fluid communications are separate of each other,
  (d) an inert gas delivery system (800) comprising a gas container (801) and a gas valve manifold (802), wherein the gas valve manifold (802) comprises a manifold line (840) and at least seven output lines (852) connected to the manifold line (840),
  wherein the gas container (801) is in fluid communication with the manifold line, the one or more reagent containers (630, 631, 632 . . . ) are in at least two separate fluid communications with the at least seven output lines (852) and the reaction vessel (400) is in fluid communication with an output line (852) of the gas valve manifold (802) and wherein each of the at least seven output lines (852) is equipped with a means for preventing flow of reagents into the manifold line.

Preferably, the means for preventing flow of reagents into the manifold line is a check valve.

2-Layer Gas Valve Manifold

In a preferred embodiment of the inventive synthesizer (100), the gas valve manifold (802) is constructed of two overlapping layers: a mounting layer for holding the manifold line and for accommodating mounting feet for mounting other components of the gas valve manifold; and a substrate layer comprising the output lines as well as pressure regulator valves (803-809), pressure sensors (823-829), and check valves (833-839) for each output line, and optionally a flow control valve (810) or optionally a two ports metering valve with knurled handle (851).

The inventors have found that the 2-layer manifold represents the most basic construction of a gas valve manifold of a gas delivery system (800), which provides sufficient stability and robustness, while simultaneously being extendable and maintainable. A construction of a gas valve manifold in a single layer was not successful due to lack of stability, lack of mounting possibilities as well as lack of extending or maintaining possibilities. Thus, a two layer construction is the most simple and economical design. Herein, a first layer provides structural support and holds the manifold line (840) by subjection elements (such as cable binders, clamps, fixing bands, etc) to a casing or frame. A second layer comprises the main components of the gas valve manifold (802), including the output line, pressure regulators, pressure sensors, check valves, etc.

A 2-layer construction allows very compact and economical design with a small number of parts of the gas valve manifold, while the operator still has convenient access to the pressure regulators, sensors and flow control valves (810) during operation of the synthesizer. In addition, this setup can be extended to a certain extend (modularity) when further output lines are required, for example in more complex syntheses.

Therefore, the present invention is also related to a synthesizer (100) for automated multistep synthesis on a solid support comprising:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) is constructed of two layers:
(i) a first layer (861) holding a manifold line (840);
(ii) a second layer comprising at least three output lines (852) and a means for preventing flow of reagents into the manifold line, wherein the at least three output lines (852) are connected to the manifold line (840), wherein each of the at least three output lines (852) is equipped with said means for preventing flow of reagents into the manifold line;
wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

The connection between the manifold line (840) and the at least three output lines (852) is preferably established by tubing connections (820, 820a-820h) positioned in the second layer.

In a preferred embodiment, the inventive synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) is constructed of two layers:
(i) a first layer (861) holding a manifold line (840);
(ii) a second layer comprising at least three output lines (852) each equipped with a pressure regulator valve for regulating the pressure of each output line individually and a means for preventing flow of reagents into the manifold line, wherein the at least three output lines (852) are connected to the manifold line (840);
wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

In a preferred embodiment, the inventive synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) is constructed of two layers:
(i) a first layer (861) holding a manifold line (840);
(ii) a second layer comprising at least three output lines (852) each equipped with (i) a pressure regulator valve for regulating the pressure of each output line individually and (ii) a pressure sensor (823-829), and a means for preventing flow of reagents into the manifold line, wherein the at least three output lines (852) are connected to the manifold line (840);
wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

In a preferred embodiment, the inventive synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other, (d) an inert gas delivery system (800) comprising a gas container (801) and a gas valve manifold (802), wherein the gas valve manifold (802) is constructed of two layers:
  (i) a first layer (861) holding a manifold line (840);
  (ii) a second layer comprising at least three output lines (852) each equipped with (i) a pressure regulator valve for regulating the pressure of each output line individually, (ii) a pressure sensor (823-829) and a pressure indicator (849), and a means for preventing flow of reagents into the manifold line, wherein the at least three output lines (852) are connected to the manifold line (840);
wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

In a preferred embodiment, the inventive synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) is constructed of two layers:
  (i) a first layer (861) holding a manifold line (840);
  (ii) a second layer comprising at least three output lines (852) each equipped with (i) a pressure regulator valve for regulating the pressure of each output line individually and (ii) a pressure sensor (823-829), and a means for preventing flow of reagents into the manifold line, wherein the at least three output lines (852) are connected to the manifold line (840); and wherein one of the at least three output lines (852) is further equipped with a flow control valve (810);
wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

In a preferred embodiment, the inventive synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other, (d) an inert gas delivery system (800) comprising a gas container (801) and a gas valve manifold (802), wherein the gas valve manifold (802) is constructed of two layers:
  (i) a first layer (861) holding a manifold line (840);
  (ii) a second layer comprising at least three output lines (852) equipped with a pressure regulator valve for regulating the pressure of each output line individually, and a means for preventing flow of reagents into the manifold line, wherein the at least three output lines (852) are connected to the manifold line (840); and wherein the means for preventing flow of reagents into the manifold line is deposited downstream to the pressure regulator valve on the output line;
wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

In a preferred embodiment, the inventive synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) is constructed of two layers:
  (i) a first layer (861) holding a manifold line (840);
  (ii) a second layer comprising at least three output lines (852) each equipped with (i) a pressure regulator valve for regulating the pressure of each output line individually, (ii) a pressure sensor (823-829) and a pressure indicator (849), and a means for preventing flow of reagents into the manifold line, wherein the at least three output lines (852) are connected to the manifold line (840); and wherein the components are located in the following order downstream on each output line (852): pressure regulator valve for regulating the pressure of each output line individually, pressure sensor (823-829), pressure indicator (849), and means for preventing flow of reagents into the manifold line;
wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

Figure 3A:
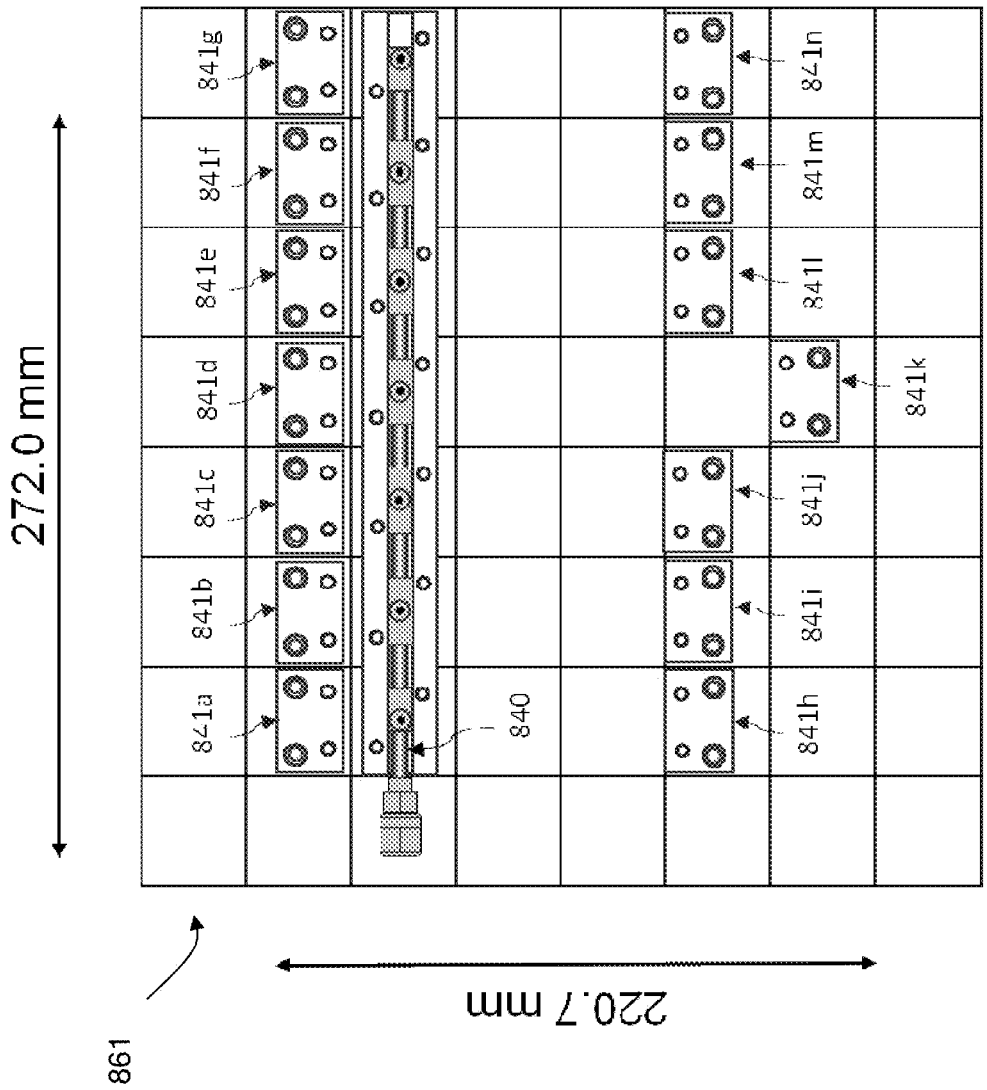
FIG. 3A shows the technical drawing of the manifold first (mounting) layer (861).
Figure 3B:
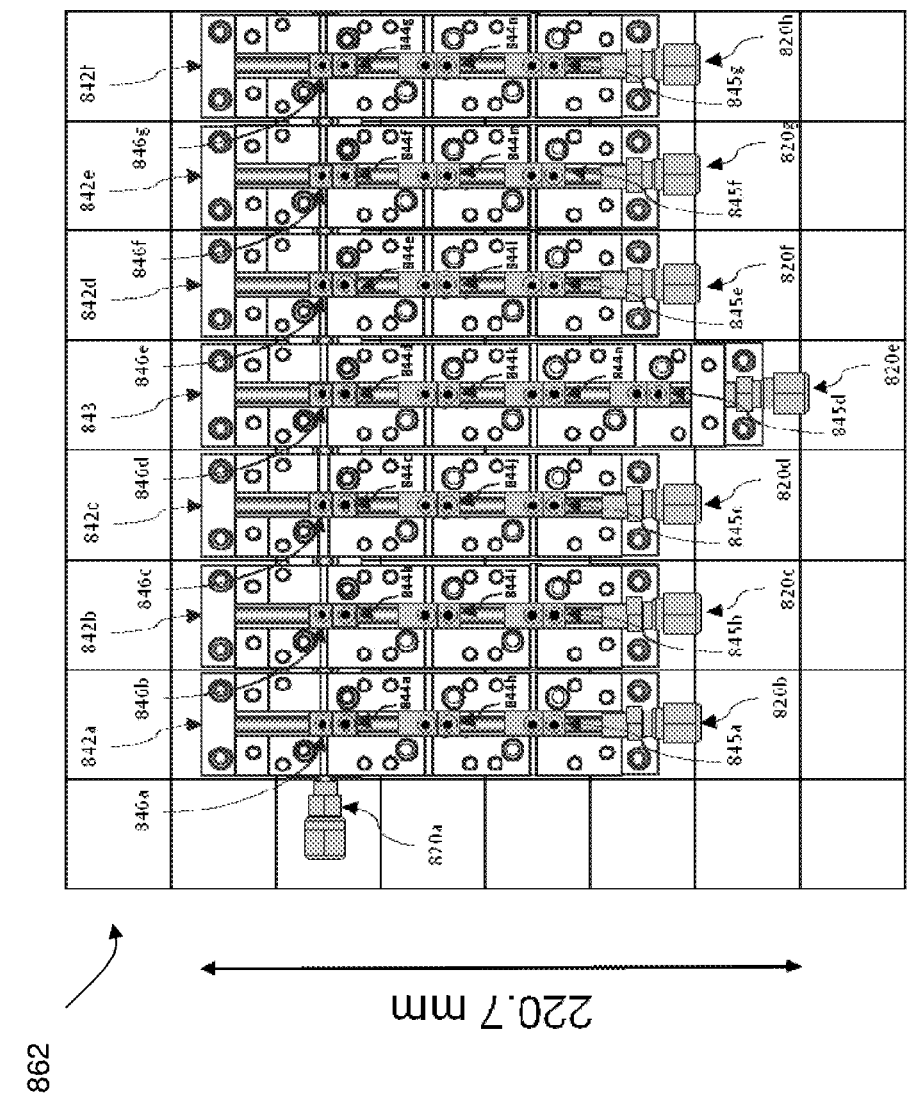
FIG. 3B shows the technical drawing of the manifold second (substrate) layer (862).
Figure 4:
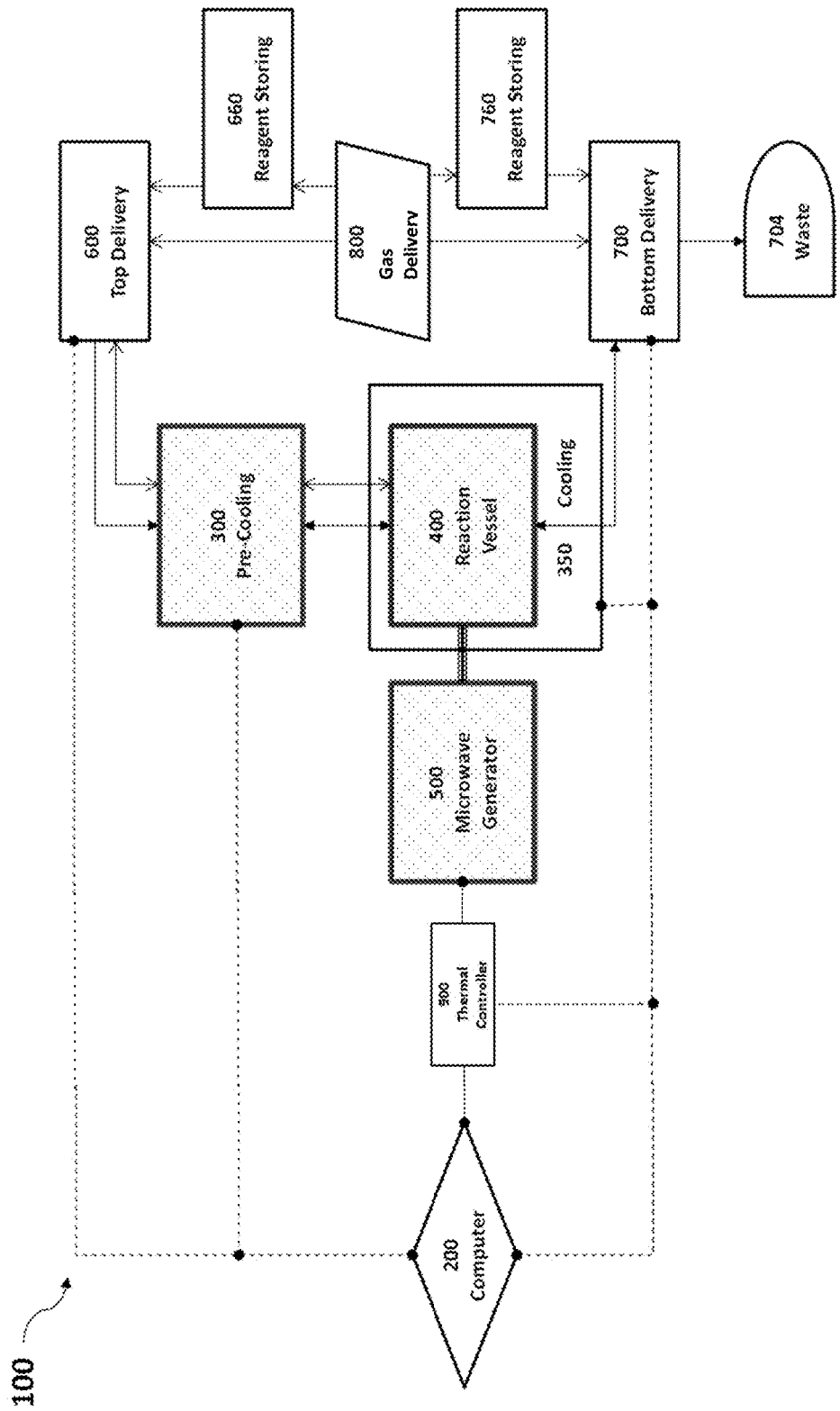
FIG. 4 is a block diagram illustrating an embodiment of the automated synthesizer (100) further comprising a cooling device, a pre-cooling device (300), a microwave generator (500) and a thermal controller (900).

FIG. 3B shows the basic technical description of the second layer of an exemplary gas manifold (802). In one single layer a series of tubing sections (844) provided with connectors, such as ferrules, one-way connectors, T connectors, reductions, fast release connectors, alternated female and male connectors, etc., allow to split one main manifold line (840) in the required number of output lines (852). In the same construction layer, a series of tubing sections (844)

provided with connectors, such as ferrules, one-way connectors, T connectors, reductions, fast release connectors, alternated female and male connectors, etc., connect the following elements in the output lines (852): Pressure regulator valve, pressure sensor, pressure indicator (849) and check valve. The pressure indicators (849) showing the line adjusted pressure. The two ports check valves (833-839) keep the manifold line gas atmospheres separate. The flow control valve (810) allows tuning the flow rate without pressure differential (for example, for mixing purposes, the flow rate of argon and pressure should be tuned at the bubbling gas line serving the bottom of the reaction vessel (400)). The pressure regulators (803-809), pressure indicators (849) and the metering valves (810) may be in electronically connected with the computer (200) in order to control or visualize via software the gas line conditions, such as pressure and/or flow.

3-Layer Gas Valve Manifold

In a preferred embodiment of the inventive synthesizer (100), the gas valve manifold (802) is constructed of three overlapping layers: a mounting layer for holding the manifold line and for accommodating mounting feet for mounting other components of the gas valve manifold; a substrate layer for connecting the multiple output lines with the manifold line; and a top layer which comprises pressure regulator valves (803-809), pressure sensors (823-829), and check valves (833-839) for each output line, and optionally a flow control valve (810) or optionally a two ports metering valve with knurled handle (851).

The 3-layer construction allows very compact and robust design of the gas valve manifold, while the operator still has convenient access to the pressure regulators, sensors and flow control valves (810) during operation of the synthesizer. In addition, this setup can be easily extended (modular build-up) when further output lines are required for example in more complex syntheses The modular 3 layer construction additionally allows the replacement of single elements of the manifold (valves or tubing) without replacing a complete output line or its connecting elements 845-846. Due to this specific design the dimensions and location of the sealing surfaces are controlled in such a way that changes of just one element of the system can be done without modification of the entire system.

Therefore, the present invention is also related to a synthesizer (100) for automated multistep synthesis on a solid support comprising:
- (a) a reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) is constructed of three layers:
  - (i) a first layer (861) holding a manifold line (840);
  - (ii) a second layer comprising at least three output lines (852), wherein the at least three output lines (852) are connected to the manifold line (840); and
  - (iii) a third layer comprising means for preventing flow of reagents into the manifold line, wherein each of the at least three output lines (852) is equipped with said means for preventing flow of reagents into the manifold line;

wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

In a preferred embodiment, the inventive synthesizer (100) for automated multistep synthesis on a solid support comprises:
- (a) a reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) is constructed of three layers:
  - (i) a first layer (861) holding a manifold line (840);
  - (ii) a second layer comprising at least three output lines (852), wherein the at least three output lines (852) are connected to the manifold line (840); and
  - (iii) a third layer comprising means for preventing flow of reagents into the manifold line and a pressure regulator valve for regulating the pressure of each output line individually, wherein each of the at least three output lines (852) is equipped with said means for preventing flow of reagents into the manifold line and a the pressure regulator valve for regulating the pressure of each output line individually;

wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

In a preferred embodiment, the inventive synthesizer (100) for automated multistep synthesis on a solid support comprises:
- (a) a reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) is constructed of three layers:
  - (i) a first layer (861) holding a manifold line (840);
  - (ii) a second layer comprising at least three output lines (852), wherein the at least three output lines (852) are connected to the manifold line (840); and
  - (iii) a third layer comprising means for preventing flow of reagents into the manifold line, a pressure regulator valve (848) for regulating the pressure of each output line individually, and a pressure sensor (823-829), wherein each of the at least three output lines (852) is equipped with said means for preventing flow of reagents into the manifold line, a pressure regulator valve for regulating the pressure of each output line individually, and a pressure sensor;

wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

In a preferred embodiment, the inventive synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) is constructed of three layers:
  (i) a first layer (861) holding a manifold line (840);
  (ii) a second layer comprising at least three output lines (852), wherein the at least three output lines (852) are connected to the manifold line (840); and
  (iii) a third layer comprising means for preventing flow of reagents into the manifold line, a pressure regulator valve (848) for regulating the pressure of each output line individually, a pressure sensor (823-829) and a pressure indicator (849), wherein each of the at least three output lines (852) is equipped with said means for preventing flow of reagents into the manifold line, a pressure regulator valve for regulating the pressure of each output line individually, a pressure sensor and a pressure indicator;

wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

In a preferred embodiment, the inventive synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) is constructed of three layers:
  (i) a first layer (861) holding a manifold line (840);
  (ii) a second layer comprising at least three output lines (852), wherein the at least three output lines (852) are connected to the manifold line (840); and
  (iii) a third layer comprising means for preventing flow of reagents into the manifold line, a pressure regulator valve (848) for regulating the pressure of each output line individually, a pressure sensor (823-829), and a flow control valve (810), wherein each of the at least three output lines (852) is equipped with said means for preventing flow of reagents into the manifold line, a pressure regulator valve for regulating the pressure of each output line individually, and a pressure sensor and wherein one of the at least three output lines (852) is further equipped with a flow control valve (810);

wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

In a preferred embodiment, the inventive synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) is constructed of three layers:
  (i) a first layer (861) holding a manifold line (840);
  (ii) a second layer comprising at least three output lines (852), wherein the at least three output lines (852) are connected to the manifold line (840); and
  (iii) a third layer comprising means for preventing flow of reagents into the manifold line and a pressure regulator valve (848) for regulating the pressure of each output line individually, wherein each of the at least three output lines (852) is equipped with said means for preventing flow of reagents into the manifold line and a pressure regulator valve for regulating the pressure of each output line individually, and wherein the means for preventing flow of reagents into the manifold line is deposited downstream to the pressure regulator valve on the output line;

wherein the gas container (801) is in fluid communication with the manifold line (840), the one or more reagent containers (630, 631, 632 . . . ) and the reaction vessel (400) are in separate fluid communications with the output lines (852) of the gas valve manifold (802).

Preferably, the means for preventing flow of reagents into the manifold line is a check valve.

FIG. 3A to FIG. 3C show the technical drawings of an exemplary 3-layer gas valve manifold. The construction is divided in 3 construction overlapping layers. The one or more elements, valves, valve assemblies, one or more vents and/or one or more manifolds or similar technical means shown in FIG. 3A to FIG. 3C may be under control of a computing device (200) comprising at least one processor. The processor may be configured to control the delivery and distribution of the inert gas within the inventive synthesizer (100) and is configured to control gas pressure within the one or more lines and one or more components of the synthesizer of the present invention. The processor may be configured to show the pressure status of the lines, components, or sections of the device. The processor may be configured to act in response to the pressure measurement at one or more lines, components, or sections of the device. The response actions can be, but are not limited to: stopping, adjusting and/or controlling the operations of any component in communication with the processor and included in the operational program.

FIG. 3A shows the first layer as a mounting layer comprising the manifold line and mounting feet (841). In this example, the manifold line (840) splits the main gas line in 7 lines. The mounting feet (841a-841n) hold the elements to the construction support surface.

FIG. 3B shows the second layer as a substrate layer for connecting the elements to the manifold. The tubing female connectors (820a-820h) are the joining point for input output tubing streams. The substrate channels (842a-842f) connect the manifold channel 840 to 3 element positions and consist of substrates (844a-c, 844f-j, and 844l-n), substrate-to-manifold connectors (846a-c, 846e-g) and end substrate connectors (845a-c, 845e-g). The substrate channel 843 connects the manifold channel 840 to 4 element positions and consists of substrates (844d, 844k and 844o), substrate-to-manifold connector (846d) and end substrate connectors (845d). The substrates (844a-844o) connect the manifold lines with the side element. The end substrate connectors (845a-845g) with ¼ inch tube fitting are the output line of the manifold serving with inert gas the specific components of the device. The substrate-to-manifold connectors to the manifold (846a-846g) serve to connect the manifold with the substrates and thereby with the output lines.

FIG. 3C shows the third layer as a top layer where the side elements (such as valves, and pressure sensors) are placed manifold. The lockdown bars (847a-847n) hold the construction. The pressure regulators (848a-848g) adjust the pressure of each individual line (for example, the pressure regulator could be but not restricted to adjust the pressure between 10 psi (~70 kPa) to 0 psi, with a maximum inlet of 100 psi and a valve coefficient (flow coefficient) $C_v$ of 0.06). The pressure indicators (849a-849g) show the pressure adjusted at the specific line (for example, the pressure indicator could be but not restricted to a pressure gauge 40 mm, measuring in a range of 0 to 15 psi, with ¼ inch tubing fitting). The two ports check valves (850a-850g) keep separate the manifold line atmospheres. The two ports metering valve with knurled handle (851) allows to tune the flow rate without pressure differential (for example, for mixing purposes, the flow rate of argon and pressure should be tuned at the bubbling gas line serving the bottom of the reaction vessel (400)).

The synthesizer (100) of the present invention comprises an inert gas delivery system to provide anhydrous and inert gas to one or more components of the synthesizer of the present invention for mixing, atmosphere conditioning and driving fluid purposes. Preferably, the synthesizer is adapted for performing reactions under anhydrous and inert atmosphere. The gas delivery system comprises at least one gas container (801), such as an argon container, to provide inert gas to the one or more components of the inventive synthesizer. The gas delivery system may comprise one or more valves, valve assemblies, one or more vents and/or one or more manifolds or similar technical means, including a gas valve manifold to allow the distribution and delivery of inert gas to the one or more components of the synthesizer of the present invention. The one or more valves, valve assemblies, one or more vents and/or one or more manifolds, including a gas valve manifold or similar technical means allow control of the pressure and/or the gas flow rate within the one or more lines which connect the one or more components of the synthesizer. Preferably, the inert gas delivery system (800) comprises at least one pressure sensor to measure the adjusted pressure of the one or more valves, valve assemblies, one or more vents and/or one or more manifolds, including a gas valve manifold or similar technical means, and at least one pressure sensor indicating the adjusted pressure of specific lines serving specific operations and/or sections of the device (such as but not restricted to: providing dedicated and separated inert atmosphere to different types of solvents and reagents; providing positive pressure to drive the delivery of reagents and/or solvents under certain flow rate; providing bubbling as mixing mechanism at the reaction vessel (400); and draining the content of the reaction vessel or an specific line in direction to the waste container (704)). The one or more valves, valve assemblies, one or more vents and/or one or more manifolds, including a gas valve manifold or similar technical means may be under control of a computing device (200) comprising at least one processor. The processor may be configured to control the delivery and distribution of the inert gas within the inventive synthesizer and is configured to control gas pressure within the one or more lines and one or more components of the synthesizer of the present invention. The processor may be configured to show the pressure status of the lines, components, or sections of the device. The processor may be configured to act in response to the pressure measurement at one or more lines, components, or sections of the device. The response actions could be but not limited to: stopping, adjusting and/or controlling the operations of any component in communication with the processor and included in the operational program.

When positive pressure drives the delivery of liquids (e.g. reagent delivery system 600); the inert gas delivery system (800) enables delivering of liquids with very different physical properties (such as density, viscosity, vapor pressure). The flow rate of one or more types of liquids is adjusted and controlled selectively and individually by the separate pressure lines serving the liquid reservoirs 660.

Advantageously, the gas valve manifold establishes a separate fluid communication between each of the one or more reagent containers (630, 631, 632 . . . ) and the gas container (801), wherein at least two fluid communications are separate of each other. Particularly. the reagent delivery system (600) may be configured to establish a fluid communication between each of the one or more reagent containers (630, 631, 632 . . . ) and the reaction vessel (400), wherein at least two fluid communications are separate of each other. The usage of at least two separate fluid communications between the gas delivery system and the reagent storing component (660) as well as between the reagent storing component (660) and the reagent delivery system (600) allows for the separation of incompatible reagents such as acids and bases (for example, transport of highly diffusive reagents through the gas tubing, thereby quenching solutions of the opposite nature (different reactivity), if their the atmospheres are not separated), which may produce salts when combined. Over time these salts may build up ubiquitously in the synthesizer and block tubing and valves that may corrode sensitive components of the inventive synthesizer (for example, an Fmoc deprotection solution of piperidine in DMF reacts and forms insoluble precipitates and crystals in the presence of vapor or liquid traces of chlorinated solvents such as chloroform or methylene chloride, which are typical solvents for glycosylation reagents), which may lead to costly repairs. Due to the automated multi-step synthesis of glycans, wherein reagents incompatible with each other are used several times, contamination of common synthesizer is a critical issue and causes failures in the reaction cascades. For example, the acidic solution of TMSOTf in DCM (dichloromethane) should be separately delivered and also the hydrazine reagent for the Lev removal which could be deactivated as well as the precapping solution wherein the basic pyridine could be neutralized and last but not least the washing solvent the pH value of which could be changed in an undesired manner. It is therefore preferred that the solutions required for the multi-step synthesis such as the solutions to remove the temporary protecting groups (for example protecting groups such as Fmoc, Lev, ClAc, and Nap) and the acetyl capping solutions are delivered via separate fluid communications to the reaction vessel.

To establish at least two separate fluid communications between the reagent storing component (660) and the reaction vessel (400), the reaction vessel is preferably equipped with at least two inlets, wherein the at least two inlets are located at different compartments of the reaction vessel in order to avoid premature mixing of incompatible reagents. Thus, the reaction vessel is preferably equipped with at least one top inlet and at least one bottom inlet.

According to the present invention the synthesizer (100) comprises a reaction vessel (400). All reactions steps of the multi-step synthesis, including coupling reactions, appropriate deprotection, and optionally capping steps are preferably performed inside of the reaction vessel of the inventive synthesizer. The coupling cycles are repeated as often as necessary to achieve the desired length of the desired oligo-, polysaccharide or peptide.

The reaction vessel (400) may be made of any material known in the art which is chemically and physically compatible with the reagents used and reaction conditions applied in the automated multi-step synthesis of oligo-, polysaccharides and peptides on a solid support. Examples of reaction vessel materials include, but are not limited to, glass, quartz, PTFE (Teflon), polypropylene. In preferred embodiments the reaction vessel is made of a microwave transparent material. In preferred embodiments the reaction vessel is interchangeable. In preferred embodiments the reaction vessel is made of fluoropolymers such as PFA for improved chemical resistance and ease of swapping reactions vessels of different sizes. In preferred embodiments the reaction vessel is made of glass.

The inventors have surprisingly found that a reaction vessel (400) made of fluoropolymers such as polytetrafluoroethylene (PTFE), perfluoroalkoxy alkanes (PFA), fluorinated ethylene propylene (FEP), ethylene tetrafluoroethylene (ETFE) or a reaction vessel comprising a coating of polytetrafluoroethylene (PTFE), perfluoroalkoxy alkanes (PFA), fluorinated ethylene propylene (FEP), ethylene tetrafluoroethylene (ETFE) is particularly suitable for the synthesizer of the present invention.

The inventors of the present invention have found that the change in the manufacturing of the reaction vessels from silicate glass to fluoropolymer improves chemical resistance, as well as eases of swapping reaction vessels of different sizes. Thus, it is advantageous to switch from a glass reaction vessel to one made of fluoropolymers such as perfluoroalkoxy alkanes (PFA). Improved flow, minimal resin adherence, thermal resistance, and chemical resistance are among the many properties that PFA excels over glass. Typical silicate glass contains hydroxyl groups, which creates a hydrophilic surface. During the synthesis cycles, the resin often adheres to glass walls above the reaction solution causing deletion sequences and mixtures in the final product. To prevent adhesion problems, regular silanization of the glass reactor is necessary. On the other hand, PFA reactors have better hydrophobic properties and are non-adherent to the resin. This allows for reaction vessels made from PFA materials to tolerate a wider range of chemical reactions that are incompatible with silane coating on glass. An additional advantage is the physical durability of the PFA reactor compared to glass. Typically, AGA synthesizers are utilized for high throughput synthesis and are in constant use, so durable components are preferred.

In preferred embodiments of the present invention the reaction vessel (400) is made of perfluoroalkoxy alkanes (PFA). In further preferred embodiments of the present invention the reaction vessel comprises a coating of perfluoroalkoxy alkanes (PFA). Perfluoroalkoxy alkanes are copolymers of tetrafluoroethylene ($C_2F_4$) and perfluoroethers ($C_2F_3OR^f$, where $R^f$ is a perfluorinated group such as trifluoromethyl ($CF_3$). Preferably, the reaction vessels made of perfluoroalkoxy alkanes (PFA) are used in microwave-assisted synthesis, wherein reaction vessels made of glass are preferred for synthesizers without a microwave generator (500) as described below.

The reaction vessel (400) of the synthesizer according to the present invention can be equipped with a temperature sensor. The temperature sensor can be any type of temperature sensor commonly known in the art that is suitable for probing the temperature range from $T_1$ to $T_3$ (see below) and that is stable in presence of the reaction mixture, building blocks and reagents used in the multi-step synthesis. Suitable temperature sensors are for example, but not limited to, negative temperature coefficient (NTC) thermistor, resistance temperature detector, thermocouple, infrared sensor or fiber optic temperature probe. Preferably, the temperature sensor is a fiber optic temperature probe.

The reaction vessel of the present invention is adapted for holding a reaction mixture. Particularly, the reaction vessel of the present invention is adapted for accommodating the solid support. The reaction vessel therefore comprises an inner cavity or effective loading space for performing one or more synthesis steps of the synthesis cycles. The reaction vessel is adapted to enable performance of one or more synthesis steps or even all of the synthesis steps of the synthesis cycles in an isolated, anhydrous and inert atmosphere. These steps may include, but are not limited to, coupling steps, washing steps, deprotection steps, capping steps and decoupling from the solid phase resin. The solid support or solid phase resin may be initially loaded into the reaction vessel. With other words the solid support or solid phase resin may be loaded into the inner cavity or effective loading space of the reaction vessel. The loading of the reaction vessel with the solid phase resin may be performed as part of a pre-automation process but may also be part of the automation process. Thus, the loading with the solid support may be also performed in an automated manner. The solid support may be provided in form of insoluble resin bead(s) and is preferably a functionalized resin suitable for oligo- and polysaccharide synthesis on a solid support, such as a resin equipped with an appropriate linker or in particular a polystyrene-based resin functionalized with an appropriate linker. Several suitable functionalized solid phase resins for oligo- or polysaccharide synthesis on a solid support have been described in the prior art. Examples of functionalized solid phase resins suitable for use with the synthesizer of the present invention are described further below.

Thus, it is preferred that the reaction vessel (400) is adapted for receiving a solid support. Therefore, the reaction vessel preferably comprises an inner chamber or effective loading space for performing one or more synthesis steps of the synthesis of oligo-, polysaccharides or peptides on a solid support, preferably in an isolated, anhydrous and inert atmosphere. It is preferred that the inner cavity or effective loading space holds between 1 mL and 100 mL solvent, more preferably 5-20 mL solvent. It is preferred that the inner cavity or the effective loading space is sized to accommodate the solid support, reagents and solvent.

Therefore the present invention further relates to a synthesizer (100) for automated multistep synthesis on a solid support comprising:
- (a) a reaction vessel (400) adapted for receiving the solid support,
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

Preferably, said means for preventing flow of reagents into the manifold line is a check valve.

The reaction vessel (400) therefore comprises an inner cavity or effective loading space for performing one or more synthesis steps of the coupling cycles to obtain the desired oligo- or polysaccharide. The reaction vessel may be one of a batch reaction vessel or semi-batch reaction vessel or a flow reactor. The term flow reactor as used herein refers preferably to a continuous flow reactor for performing the synthesis in a continuous manner.

For performing the coupling reactions appropriate building blocks and activators are supplied or added to the reaction vessel. Preferably, the building blocks and activators are supplied or added to the reaction vessel already containing the solid support or solid phase resin. The coupling reactions preferably take place inside the reaction vessel followed by appropriate deprotection, capping and/or washing steps. All of these synthesis steps and treatments in the synthesis cycles are preferably performed inside of the reaction vessel of the device of the present invention. The synthesis cycles are repeated as often as necessary to achieve the desired length of the desired oligo- or polysaccharide. The synthesis cycle is preferably repeated at least three times, more preferably at least four times or more preferably more than four times for obtaining an oligo- or polysaccharide.

For supplying liquids, solutions and/or gases the reaction vessel of the inventive synthesizer may further comprise two or more inlets, for example, for supplying washing solvents or washing solutions, building blocks or building block solutions, activators or activator solutions, capping solutions, deprotection solutions and inert gas, and may further comprise one or more outlets, for example, for discharging the liquids or solutions after each chemical reaction and/or also ventilation exits for inert gas or other gases from the reaction mixture.

In preferred embodiments of the present invention the two or more inlets may also function as one or more outlets, that means one or more inlets for supplying reagents, solvents, reaction mixtures, inert gas and the like can also be used to remove a solution, inert gas, reaction components and the like from the device for automated synthesis. In such embodiments one or more technical means such as one or more valves, valve assemblies, one or more vents, one or more manifolds and/or similar technical means may be located and mounted upstream to the one or more inlets of the reaction vessel. For example, by implementing a valve assembly or one or more valves in the device of the present invention the delivery of liquids, solutions and/or gases and also the discharging of liquids, solutions and/or gases after or during each chemical reaction or treatment may be realized through one inlet of the reaction vessel only or through two, three or more inlets of the reaction vessel. By implementation of technical means such as valves, valve assemblies, vents, manifolds or similar technical means, the total number of in- and outlets of the reaction vessel may be reduced.

Therefore the present invention further relates to a synthesizer (100) for automated multistep synthesis on a solid support comprising:
- (a) a reaction vessel (400) comprising at least one inlet at the top of the reaction vessel (400) and at least one inlet at the bottom of the reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

The reaction vessel (400) may further comprise one or more openings or apertures for insertion of various other components or technical means. For example, the reaction vessel may further comprise an opening or aperture for insertion of a temperature probe or a temperature sensor for monitoring and measuring the temperature inside of the reaction vessel. Monitoring and measuring the temperature inside of the reaction vessel thereby also means monitoring and measuring the temperature of the reaction mixture during one or more or even all synthesis steps of the synthesis cycles. Thus, it is preferred that the reaction vessel further comprises at least one opening or aperture for insertion of a temperature sensor for monitoring and measuring the temperature inside of the reaction vessel.

The one or more inlets of the reaction vessel (400) may be located at various positions of the reaction vessel body. In preferred embodiments of the present invention the reaction vessel may comprise one or more inlets at the top of the reaction vessel, for example, for delivery of washing solvents or washing solutions, building blocks or building block solutions, and activators or activator solutions and may further comprise one or more outlets at the top of the reaction vessel, for example, for exits for inert gas or other gases and may further comprise one or more inlets at the bottom of the reaction vessel, for example, for delivery of capping solutions, deprotection solutions and inert gas and may further comprise one or more outlets for discharging the liquids or solutions after each chemical reaction or after each washing step. As mentioned above, by implementing further technical means such as one or more valves, valve assemblies or similar technical means, these one or more inlets may also function as outlets for the liquids, solution and/or gases.

Thus, the reaction vessel (400) of the inventive synthesizer comprises at least two inlets, wherein the at least two inlets are located at different compartments of the reaction vessel in order to avoid premature mixing of incompatible reagents. Preferably the reaction vessel comprises one or more inlets at the top of the reaction vessel and one or more inlets at the bottom of the reaction vessel to enable at least two separate delivery methods for solvents and reagents, one from the top and another from the bottom of the reaction vessel. The usage of two different ports allows for the separation of incompatible reagents such as acids and bases, which may produce salts when combined. Over time these salts may build up and block tubing that may corrode components of the device of the present invention, which may lead to costly repairs. It is therefore preferred that the solutions to remove the temporary protecting groups (for example protecting groups such as Fmoc, Lev, ClAc, and NAP) and acetyl capping solutions are delivered via the one or more bottom inlets or bottom port of the reaction vessel. These reactions are desired to be performed rapidly and solutions are provided in excess, so these solutions will be pushed into the reaction vessel for example by pressurized inert gas such as argon. The inert gas inlet may serve for a dual purpose to not only deliver the reagents, but to efficiently mix the reaction. In addition, the one or more bottom inlets may serve to remove all the reagents and solutions from the reaction vessel. Oppositely, the activators or activator solutions and the building blocks or building block solutions are preferably delivered through the one or more top inlets or top port of the reaction vessel. These reagents are more valuable and are required to be delivered in a controlled stoichiometry, so these are delivered preferably dropwise, for example, via a syringe pump system.

In preferred embodiments of the present invention the reaction vessel may comprise only one inlet at the bottom of the reaction vessel, for example, for delivery of capping solutions, deprotection solutions and inert gas and for discharging the liquids or solutions after each chemical reaction or after each washing step and one or more inlets at the top of the reaction vessel, for example, for delivery of washing solvents or washing solutions, building blocks or building block solutions, and activators or activator solutions. The reaction vessel may further comprise openings or apertures at the top of the reaction vessel for insertion of, for example, a temperature probe or a temperature sensor. The reaction may further comprise an exhaust gases exit at the top of the reaction vessel.

In preferred embodiments of the present invention the reaction vessel (400) may comprise at least three inlets/outlets, preferably four inlets/outlets (601, 602, 645, 655) at the top of the reaction vessel, for example, one inlet for delivery of washing solvents or washing solutions, one inlet for delivery of building blocks or building block solutions and one inlet for delivery of activators or activator solutions and preferably a further outlet for the exhaust of gases and/or mixing gas (655). The separate and distinct delivery of the building blocks and activators to the reaction vessel is advantageous for preventing a contacting of the building blocks and activators before supplying the building blocks and activators to the reaction mixture inside of the reaction vessel. It is particular preferred that the building blocks or building block solutions and the activators or activator solutions are not mixed or merged with each other before delivery to the reaction vessel. It is further advantageous that the washing solvents or washing solutions are separately supplied to the reaction vessel to allow rapid delivery of washing solvents or washing solution in a larger amount and to ensure well distribution of the washing solvents or washing solutions inside of the reaction vessel. For example, a channel for supplying the washing solvents or washing solution may be used to supply the washing solvents or washing solution to the reaction vessel. Such a channel may be adapted for spraying the washing solvents or washing solutions by splitting the liquid among a series of holes at the tip of the channel. The channel may also comprise a conical end to assure complete dropping of the washing solvents or washing solutions. Such a channel for delivery of washing solvents or washing solution allows to effectively wash-off other reagent solutions, reagents or adhered solid support from the inner walls of the reaction vessel. In contrary, the building blocks and activators are preferably supplied directly into the reaction mixture in a dropwise manner.

In embodiments of the present invention wherein the reaction vessel (400) comprises one or more inlets at the bottom of the reaction vessel or only one inlet at the bottom of the reaction vessel it is preferred that the effective loading space or inner chamber of the reaction vessel is fenced by the bottom inlet. The bottom compartment may prevent canalization of fluid through a frit. A frit allows for dispersion of inert gas bubbling for mixing purposes. The frit may also ensure that the solid support remains inside of the reaction vessel. Thus, in preferred embodiments of the present invention the reaction vessel may further comprise a frit. It is preferred that the frit is located in the bottom compartment of the reaction vessel. Thus, to prevent solid support from being drawn from the bottom inlet, the end in the reaction vessel may be fitted with a frit or a filter.

According to the present invention the synthesizer comprises a reagent storing component (660). The synthesizer of the present invention may comprise one or more reagent storing components. The synthesizer may comprise at least one reagent storing component. The reagent storing component or the one or more reagent storing components are preferably adapted for storing the building blocks and/or building block solutions, activators and/or activator solutions, washing solvents and/or washing solutions, deprotection solutions and/or capping solutions. The reagent storing component or the one or more reagent storing components may comprise one or more reagent containers (630, 631, 632 . . . ) or may comprise a plurality of reagent containers. The numbers (630, 631, 632 . . . ) shall indicate that not only up to three but a plurality of reagent containers could be present like numbers 630, 631, 632, . . . , 658, 659. The reagent storing component or the one or more reagent storing components may comprise one or more reagent containers for storing building blocks, one or more reagent containers for storing building block solutions, one or more reagent containers for storing activators, one or more reagent containers for storing activator solutions, one or more reagent containers for storing washing solvents and/or washing solutions, one or more reagent containers for storing deprotection solutions and one or more reagent containers for storing capping solutions. The reagent storing component or the one or more reagent storing components are preferably adapted for storing reagents and solvents in an anhydrous and inert atmosphere. In preferred embodiments of the present invention the reagents and solvents are stored under argon pressure. In preferred embodiments the reagent storing component or the one or more reagent storing components are connected to an inert gas delivery system. The gas delivery system may provide inert gas, such as argon, to the reagent storing component or the one or more reagent storing components. The inert gas delivery system (800) may provide inert gas, such as argon, to each of the containers of the reagent storing component or the one or more reagent storing components. Thus, in preferred embodiments of the present invention each of the containers of the reagent storing component or the one or more reagent storing components may be connected to an inert gas delivery system (800).

The containers may be made of any suitable chemical resistant material known in the art which is suitable for storing chemical reagents and/or solutions and furthermore suitable for storing the building blocks and/or building block solutions, activators and/or activator solutions, washing solvents or washing solutions, deprotection solutions and also capping solutions. The containers may preferably be adapted for storing the reagents in an anhydrous and inert atmosphere, for example, under argon pressure. For example, synthesis-ready building blocks may be pre-weighed and either dissolved in the appropriate anhydrous solvent or kept as solids and placed in sealed vials, for example, on a 64-position carousel, a 4-position means, or a 8 positions (e.g. test tube type containers) where a solution of building block (e.g. up to 8 mL of the appropriate concentration) is coupled to the system by multiport valves or similar technical means. Preferably a cap seals the reaction vessel (400) which has an inlet for inert gas, such as argon, providing an anhydrous atmosphere and an outlet for the building block solution extraction. The extraction tube may reach the bottom container and may be allowed to take out the required volume of building block solutions. The building blocks are preferably those that can be synthesized in large quantities, are stable upon storage for extended periods of time, and upon activation result in very high coupling yields with excellent stereo-control. Solvents and reagents may for example be placed in various sizes of glass bottles and kept under inert gas, for example, under argon pressure.

Preferably the synthesizer comprises a reagent storing component (660) for storing building blocks and/or building block solutions, activators and/or activator solutions, washing solutions and/or washing solvents and/or deprotection solutions. Preferably the synthesizer comprises a reagent storing component (660) for storing one or more reagents and/or reagent solution and/or solvents. The reagents and/or reagent solutions preferably comprise building blocks, building block solutions, activator, activators solutions, washing solutions, washing solvents and deprotection solutions. Preferably the synthesizer comprises a reagent storing component (660) for storing building blocks or building block solutions, activators or activator solutions, washing solutions or washing solvents, deprotection solutions and capping solutions.

According to the present invention the synthesizer comprises a reagent delivery system (600). The inventive synthesizer comprises at least one reagent delivery system. Preferably the synthesizer of the present invention comprises a reagent delivery system adapted for delivery of building blocks or building block solutions, activators or activator solutions, washing solvents or washing solutions, deprotection solutions, capping solutions and inert gas to the reaction vessel (400) which could be a microwave transparent reaction vessel (400). Preferably the inventive synthesizer comprises a reagent delivery system adapted for receiving building blocks or building block solutions, activators or activator solutions, washing solvents or washing solutions, deprotection solutions and capping solutions from the reagent storing component (660). The device of the present invention may also comprise one or more reagent delivery systems. The reagent delivery system may comprise one or more reagent delivery sub-systems or reagent delivery sub-components for delivery of one or more of the one or more reagents, solutions and/or reagent solution to the reaction vessel (400). The synthesizer disclosed herein are especially useful for the automated multistep synthesis of oligo- and polysaccharides on a solid support.

Therefore the present invention relates to a synthesizer (100) for automated multistep synthesis on a solid support comprising:
(a) a reaction vessel (400),
(b) a reagent storing component (660) comprising one or more reagent containers (630, 631, 632 . . . ),
(c) a reagent delivery system (600) for delivering building blocks and/or building block solutions, activators and/or activator solutions, washing solutions and/or washing solvents and deprotection solutions, the reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840),
wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

The automated multistep synthesis of oligo- and polysaccharides as disclosed herein is preferably microwave-assisted.

In one embodiment, the synthesizer (100) for automated multistep synthesis on a solid support comprises:
(a) a reaction vessel (400),
(b) a reagent storing component (660) for storing building blocks and/or building block solutions, activators and/or activator solutions, washing solutions and/or washing solvents and deprotection solutions, comprising one or more reagent containers (630, 631, 632 . . . ),
(c) a reagent delivery system (600) for delivering building block and/or building block solutions, activator solutions, washing solvents and/or washing solutions and deprotection solutions, wherein the reagent delivery system (600) is configured to establish a fluid communication between each of the one or more reagent containers (630, 631, 632 . . . ) and the reaction vessel (400), wherein at least two fluid communications are separate of each other, (d) an inert gas delivery system (800) comprising a gas container (801) and a gas valve manifold (802), wherein the gas valve manifold (802) comprises a manifold line (840) and at least three output lines (852) connected to the manifold line (840), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

The reagent delivery system (600) is connected to the reagent storing component (660) and is further connected to the reaction vessel (400). It is preferred that the reagent storing component (660) and the reaction vessel are not directly connected to each other. In other words, it is preferred that the reagent storing component (660) and the reaction vessel are not in direct fluid communication with each other. Preferably, the reagent delivery system (600) is interposed between the reaction vessel and the reagent storing component (660). Preferably, the reagent delivery system (600) is in fluid communication with the reagent storing component (660) and is further in fluid communication with the reaction vessel. It is preferred that the reagent delivery system (600) receives the reagents from the reagent storing component (660) and after receiving the reagents from the reagent storing component (660) the reagents delivery system may deliver the reagents to the reaction vessel which could be a microwave transparent reaction vessel in order supply the reagents to the reaction mixture inside the reaction vessel.

The reagent delivery system (600) may be connected to the reaction vessel (400) through one or more inlets of the reaction vessel for delivery of the reagents and/or reagents solution and/or solvents to the reaction vessel through the one or more inlets of the reaction vessel. The reagent delivery system may be connected to the reaction vessel through one or more reagent delivery lines. Thus, the reagent delivery system may be adapted to deliver reagents and/or reagent solutions and/or solutions and/or solvents to the reaction vessel and may be further adapted to supply the reagents and/or reagent solution and/or solutions or solvents through the one or more inlets of the reaction vessel. Preferably the reagent delivery system may be adapted to deliver one or more reagents and/or one or more reagent solutions and/or one or more solutions in different amounts, at different points in time and in a specific sequence or specific order, and further through specific inlets of the one or more inlets of the reaction vessel during the synthesis cycles on a solid support. It is therefore preferred that the reagent delivery system comprises suitable technical means, preferably suitable technical means electronically coupled to a computing device (200) comprising at least one processor, for delivery of one or more reagents and/or one or more reagent solutions and/or one or more solutions in different amounts, at different points in time and in a specific sequence or specific order during the synthesis cycles. The reagent delivery system may comprise a pump system or one or more pumps such as syringe pumps, peristaltic pumps or other suitable pumps and may further comprise one or more valves or one or more valve assemblies, one or more manifolds, one or more distributing components and similar suitable technical means. It is preferred that the pump system or the one or more pumps, the one or more valves or the one or more valve assemblies, the one or more manifolds and/or the one or more distributing components and similar technical means are under control of a computing device (200) comprising at least one processor.

The reagent delivery system (600) of the synthesizer of the present invention may therefore comprise one or more valves or valve assemblies for regulating, directing or controlling the flow of fluids like gases or liquids. Valves or valve assemblies may be adapted for opening, closing or partially obstructing various passageways. Valves may be operated in gradual change between two or more positions, such as in two-port, three-port, four-port or in multiport valves. The reagent delivery system may comprise one or more fluidic valves operably connected to one or more components of the synthesizer. Each fluidic valve of the synthesizer of the present invention may be a rotary valve, solenoid valve block or other multi-port valve or valve system or other suitable valves known to those skilled in the art. The reagent delivery system of the synthesizer of the present invention may further comprise one or more pumps such as syringe pumps, peristaltic pumps or other pumps known to those skilled in the art which may be operably connected to one or more fluidic valves or valve assemblies of the synthesizer of the present invention.

In preferred embodiments the reagent delivery system (600) of the synthesizer according to the present invention may comprise one or more valves, preferably one or more fluidic valves, more preferably one or more rotary valves, and even more preferably one or more rotary valves with 3, 4, 5, 6, 7, 8, 9, 10, 12, or 16 ports. Preferably the reagent delivery system may comprise one or more valves such as one or more rotary valves, one or more solenoid valve blocks or other multiport valves. The reagent delivery system may further comprise one or more pumps or a pump system. Preferably, the reagent delivery system comprises at least one syringe pump. Preferably, the reagents may be delivered via a syringe pump system. Preferably the reagents may be delivered via a syringe pump system as a component of the reagent delivery system. Preferably, the syringe pump system may be a component of the reagent delivery system.

In preferred embodiments of the present invention a syringe pump may drive the fluids within the reagent delivery system. The syringe pump and the reagent delivery system may be connected through one or more loop lines. Loop lines allow for careful delivery of sensitive and/or corrosive chemical solutions. The resting volume of the loops is defined as a function of the tubing length. A driving solvent may be taken to fill up the loops ahead the withdrawing of chemical solution from the reagent delivery system. The loops may be made from an inert material such as, for example, Teflon, poly-(tetrafluoroethylene) (PTFE) and the like. The size of the loops may be varied. The exact size will depend on the capacity of the syringe pump and the amount of reagent to be delivered to the reaction vessel. The size of each loop will also depend on the nature of the reagent to which it is associated. For example, if the reaction vessel is 20 mL, then a loop sized from about 1 to 5 mL may be used, preferably from about 2 to 4 mL. Each loop may be sized the same or different. For example, loops attached to building blocks may be smaller than those attached to basic reagents such as the deprotection or capping reagents as the quantity of the former used during any synthesis step is relatively small compared to the amount of such basic reagents.

As already described above in preferred embodiments of the present invention the reaction vessel (400) may comprise one or more inlets at the top of the reaction vessel and may comprise one or more inlets at the bottom of the reaction vessel.

In further preferred embodiments the reaction vessel may comprise one or more inlets at the top of the reaction vessel and may comprise only one inlet at the bottom of the reaction vessel. The reagent delivery system may be connected to the reaction vessel through the one or more inlets at the top of the reaction vessel and/or through the one or more inlets at the bottom of the reaction vessel. In preferred embodiments of the present invention the reagent delivery system may be adapted to deliver building blocks or building block solutions, activators or activator solutions, and washing solvents or washing solutions through the one or more inlets at the top of the reaction vessel. The reagent delivery system may be further adapted to deliver deprotection solutions and capping solutions through the one or more inlets at the bottom of the reaction vessel. The reagent delivery system may be further adapted to deliver inert gas, such as argon, to the reaction vessel.

The reagent delivery system (600) may comprise one or more reagent distribution components. The reagent delivery system may comprise one or more reagent distribution components for delivery of reagents and/or solutions and/or reagent solution to the reaction vessel. Each of the reagent distribution components may be connected to the reagent storing component (660) or one or more reagent storing components (660). In preferred embodiments of the present invention the reagent delivery system comprises a first and a second reagent distribution component for driving the flow of fluids or gases to the reaction vessel. In preferred embodiments of the present invention the synthesizer comprises a first reagent distribution component and a second reagent distribution component.

Therefore the present invention relates to a synthesizer (100) for automated multistep synthesis on a solid support comprising:
- (a) a reaction vessel (400),
- (b) a reagent storing component (660) comprising one or more reagent containers (630, 631, 632 . . . ),
- (c) a reagent delivery system (600) comprising a first reagent distribution component and a second reagent distribution component, wherein the reagent delivery system (600) is configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840),
- wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

The first reagent distribution component may be connected to the reaction vessel (400) through the one or more inlets on the top of the reaction vessel. Thus, the first distribution component or the top distribution component may be in fluid communication with the reaction vessel through the one or more inlets at the top of the reaction vessel. The second distribution component may be connected to the one or more inlets at the bottom of the reaction vessel. Thus, the second distribution component or bottom distribution component may be in fluid communication with the reaction vessel through the one or more inlets at the bottom of the reaction vessel.

Preferably, the first distribution component or the top distribution component supplies the washing solvents, building blocks or building block solutions and activators or activator solutions to the reaction vessel. The top distribution component may be also adapted to provide a ventilation exit for gases.

Preferably, the second distribution component or the bottom distribution component supplies the deprotection solutions, capping solutions and supplies inert gas (bubbling gas) to the reaction vessel. The inert gas may be provided as bubbling gas which may be used for mixing and creating an inert and anhydrous atmosphere inside the reaction vessel. In preferred embodiments the bottom distribution component is also adapted for discharging the liquids or solution after one or more synthesis or washing steps.

Therefore the present invention relates to a synthesizer (100) for automated multistep synthesis on a solid support comprising:
- (a) a reaction vessel (400),
- (b) a reagent storing component (660) comprising one or more reagent containers (630, 631, 632 . . . ),
- (c) a reagent delivery system (600) comprising a first reagent distribution component for delivery of washing solvents, building blocks and/or building block solutions and activators and/or activator solutions and a second reagent distribution component for delivery of deprotection solutions, wherein the reagent delivery system (600) is configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840),
- wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

In preferred embodiments of the present invention the reagent delivery system (600) or the one or more reagent distribution components may further comprise one or more reagent distribution sub-components. In preferred embodiments of the present invention the reagent delivery system (600) may comprise a building block distribution component for delivery of the building blocks and/or building block solutions, an activator distribution component for delivery of the activators and/or the activator solutions and/or a washing solvent distribution component for delivery of washing solvents or washing solution, a deprotection distribution component for delivery of deprotection solution and may further comprise a capping distribution component for delivery of capping solutions to the reaction vessel.

In preferred embodiments of the present invention the top distribution component may comprise a building block distribution component, an activator distribution component and a washing solvents or washing solutions distribution component. The top distribution component may further comprise a syringe pump for driving the fluids within the top distribution component. The lines between the syringe pump and the top distribution component may be provided in form of loop lines to allow for careful delivery of sensitive and/or corrosive chemical solutions. The resting volume of the loops is defined as a function of the tubing length. The top distribution component may further comprise a washing solvents component, wherein a driving solvent may be taken to fill up the loops ahead the withdrawing of chemical solutions from the building blocks distribution component and the activator distribution component. This avoids the direct contact of the reagents with the syringe pump, which prevents the pump deterioration and cross-contamination.

The building block distribution component may comprise one or more valves or a valve assembly or similar technical means, for example, a rotary valve that distributes the fluids within the building block distribution component. The building block distribution component is connected to the reagent storing component (660), preferably to a building blocks storing component which may comprise one or more building block containers or building block solution containers. Each of the building block containers or building block solution containers may be connected to the one or more valves or valve assembly or similar technical means. The building block containers of the building block storing component may be connected to a gas delivery system to provide inert gas to each of the building block containers. Thus, each of the building block containers may be stored under anhydrous and inert atmosphere. Each of the building block containers or building block solutions containers may be in fluid communication with the building block distribution component through the one or more valves or valve assembly or similar technical means. The one or more valves or the valve assembly may be further connected to the reaction vessel (400). Thus, the reaction vessel may be in fluid communication with the building block distribution component through the one or more valves or valve assembly or similar technical means. The reaction vessel may be in fluid communication with the building block distribution component through, for example, one or more valves or valve assembly and may be further connected through a building blocks delivery line. The building block distribution component may be also connected to a waste container (704) and/or gas delivery system for receiving inert gas through one or more further delivery lines. The one or more valves or valve assembly or other suitable technical means for distribution of the building blocks within the building block distribution component may be under control of a processor of a computing device (200) configured to control the distribution of the building blocks and preferably configured to control the one or more valves or valve assembly such as a rotary valve distributor. The building block distribution component may be connected to a syringe pump system, for example, through one or more valves or valve assembly and may be further connected to the syringe pump via a loop line.

The activator distribution component may comprise one or more valves or a valve assembly or similar technical means for example a rotary valve that distributes the fluids within the activator distribution component. The activator distribution component is connected to a reagent storing component (660), preferably an activator or activator solution storing component which may comprise one or more activator containers or activator solution containers. The activator containers of the activator storing component may be connected to a gas delivery system to provide inert gas to each of the activator containers. Thus, each of the activator containers may be stored under anhydrous and inert atmosphere. Each of the activator containers or activator solution containers may be connected to the one or more valves or valve assembly or similar technical means of the activator distribution component. Thus, each of the activator containers or activator solutions container may be in fluid communication with the one or more valves or valve assembly of the activator distribution component. The activator distribution component may be connected to the reaction vessel through the one or more valves or valve assembly or similar technical means. Thus, the reaction vessel may be in fluid communication with the activator distribution component through the one or more valves or valve assembly or similar technical means. The reaction vessel may be in fluid communication with the activator distribution component through one or more valves or valve assembly or similar technical means and may be further connected through an activator delivery line. The activator distribution component may be also connected to a waste container (704) and/or to a gas delivery system for receiving inert gas through one or more delivery lines. The one or more valves or valve assembly or similar technical means may be under control of a processor of a computing device (200) configured to control the distribution of the activators within the activator distribution component and preferably configured to control the one or more valves or valve assembly and similar technical means such as a rotary valve distributor. The activator distribution component may be connected to a syringe pump system, for example, through one or more valves or valve assembly and may be further connected to the syringe pump via a loop line.

The washing solvent distribution component may provide the reaction vessel (400) with one or more washing solvents or washing solutions. Exemplary washing solvents suitable for automated synthesis of oligo-, polysaccharides and peptides on a solid support include, but are not limited to dichloromethane (DCM), tetrahydrofuran (THF) and dimethylformamide (DMF). The washing solvent distribution component is connected to a reagent storing component (660), preferably a washing solvent storing component. Each of the washing solvents may be stored in a respective solvent container of the washing solvent storing component. Thus, the washing solvent distribution component may be connected to a washing solvent storing component comprising one or more solvent containers. The washing solvent distribution component may be further connected to a syringe pump. One or more of the solvent containers may be connected to the syringe pump through the washing solvent distribution component. The washing solvent distribution component may comprise one or more valves or valve assembly or similar technical means which may be connected to each of the solvent containers of the washing solvents storing component. As an example, the washing solvent distribution component may comprise a multi-port valve, such as a four way magnetic valve. The washing solvents may be delivered to the reaction vessel by the washing solvent distribution component. The washing solvents may be delivered to the reaction vessel through a washing solvent delivery line. The washing solvent containers of the washing solvent storing component may be connected to a gas delivery system to provide inert gas to the each washing solvent container. Thus, each of the washing solvent containers may be stored under anhydrous and inert atmosphere, such as under argon atmosphere. The magnetic valve may be further connected to the gas delivery system to receive inert gas and to provide and deliver inert gas to the reaction vessel. The one or more valves or valve assembly or similar technical means suitable for distribution of the washing solvents within the washing solvent distribution component may be under control of a processor of a computing device (200) configured to control the distribution of the washing solvents and washing solution and preferably configured to control the one or more valves or valve assembly and similar technical means such as a magnetic valve distributor.

The bottom distribution component may comprise one or more valves such as one or more multi-port valves, or valve assemblies, or similar technical means. The bottom distribution component may comprise a deprotection distribution component for delivery of deprotection solutions to the reaction vessel (400) and may further comprise a capping distribution component for delivery of capping solution to the reaction vessel. The bottom distribution component may be further connected to a waste container (704). The bottom distribution component may be further connected with a gas delivery component for delivery of inert gas, such as argon, to the reaction vessel. One or more of the components of the bottom distribution component may be connected to the reaction vessel through a loop line which allows for delivery of chemical solutions from the deprotection distribution component, the capping distribution component and delivery of inert gas from the gas delivery component. The loop lines may be also adapted for discharge of waste liquids from the reaction vessel. The bottom distribution component may comprise for example a multiple ways magnetic valve which may be electronically coupled to a computing device (200) comprising at least one processor configured to control the delivery of deprotection solutions, capping solutions and inert gas to the reaction vessel and further configured to control the discharging of liquids and solutions of the reaction vessel after each reaction or washing step. The deprotection distribution component is connected to a reagent storing component (660), preferably a deprotection solution storing component. The deprotection storing component may comprise one or more containers for storing deprotection reagents. The deprotection storing component may be connected to a gas delivery system to provide inert gas to the each deprotection reagent container. Thus, each of the deprotection reagent containers (630, 631, 632 . . . ) may be stored under anhydrous and inert atmosphere, such as under argon atmosphere. The capping distribution component is connected to a reagent storing component (660), preferably a capping solution storing component. The capping storing component may comprise one or more containers for storing capping reagents. The capping storing component may be connected to a gas delivery system to provide inert gas to the each capping reagent container. Thus, each of the capping reagent containers (630, 631, 632 . . . ) may be stored under anhydrous and inert atmosphere, such as under argon pressure.

In one embodiment the synthesizer according to the present invention further comprises a cooling device (350) for cooling the reaction vessel (400). The cooling device therefore provides active cooling to the reaction vessel and thus provides active cooling of the reaction mixture inside of the reaction vessel. The cooling device is therefore preferably in thermal communication with the reaction vessel. The cooling device is preferably adapted for cooling the reaction vessel to temperatures of −80° C. to +60° C., preferably −40° C. to +40° C., more preferably −40° C. to +25° C., and more preferably −40° C. to +20° C. Thus, the synthesizer of the present invention may comprise a cooling device (350) for regulating the temperature of the reaction vessel. The cooling device may be under control of a thermal controller (900) as a part of a computing device (200) comprising at least one processor. The cooling device may be further adapted to maintain the temperature within the reaction vessel. The cooling device may be adapted to adjust the temperature within +1° C. and −1° C. of the reaction temperature. The cooling device may be equipped with a temperature sensor or thermometer, wherein the cooling device temperature may be adjusted either manually or preferably by a computing device (200), more preferably by a thermal controller (900). For example, the cooling device could be an external refrigerated circulator or a cooling block, or a chiller. The cooling block may be made of any heat transfer material. The block may have channels running through to pass coolant fluid through. The reaction vessel may be placed in a cavity of the cooling block. In a preferred embodiment of the present invention the coolant fluid may be circulated around the reaction vessel via a sleeve surrounding the reaction vessel. In preferred embodiments of the present invention the cooling device may comprise a cooling jacket. The cooling jacket may be in form of a cooling coil surrounding the reaction vessel. Preferably, the cooling jacket is in thermal communication with the reaction vessel. The cooling coil or cooling jacket may be further provided with a thermal isolation cover to increase the heat exchange efficiency of the cooling jacket or cooling coil.

Therefore the present invention relates to a synthesizer (100) for automated multistep synthesis on a solid support comprising:
  (a) a reaction vessel (400),
  (b) a reagent storing component (660) comprising one or more reagent containers (630, 631, 632 . . . ),
  (c) a reagent delivery system (600) configured to establish a fluid communication between each of the one or more reagent containers (630, 631, 632 . . . ) and the reaction vessel (400), wherein at least two fluid communications are separate of each other,
  (d) an inert gas delivery system (800) comprising a gas container (801) and a gas valve manifold (802), wherein the gas valve manifold (802) comprises a manifold line (840) and at least three output lines (852) connected to the manifold line (840),
  (e) a cooling device (350) for cooling the reaction vessel (400),
  wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

Preferably, the means for preventing flow of reagents into the manifold line is a check valve. Preferably, each output line of the gas valve manifold comprises a check valve, a pressure regulator valve for regulating the pressure of each output line individually, and a pressure sensor. Preferably, the gas valve manifold is constructed of three layers: (i) a first layer (861) holding the manifold line (840); (ii) a second layer (862) comprising the at least three output lines (852), wherein the at least three output lines (852) are connected to the manifold line (840); and (iii) a third layer (863) comprising the means for preventing flow of reagents into the manifold line.

Preferably, the synthesizer (100) for automated multistep synthesis on a solid support comprises:
- (a) a reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840),
- (e) a cooling device (350) for cooling the reaction vessel (400), wherein the cooling device comprises a cooling jacket in thermal communication with the reaction vessel (400), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

Preferably, the means for preventing flow of reagents into the manifold line is a check valve as disclosed herein.

In one embodiment, the synthesizer (100) for automated multistep synthesis on a solid support comprises:
- (a) a reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840),
- (e) a cooling device (350) for cooling the reaction vessel (400), comprising a cooling coil in thermal communication with the reaction vessel (400), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

Preferably, the means for preventing flow of reagents into the manifold line is a check valve as disclosed herein.

The reaction vessel (400) may be constructed as a double-wall structure which forms two cavities, wherein the first cavity accommodates the multi-step synthesis of oligo-, polysaccharides or peptides and wherein the second cavity accommodates a coolant fluid. The double-wall structure of the reaction vessel may be made of glass. Thus, the reaction vessel may be provided with a cooling jacket for cooling the reaction vessel. Preferably, the cooling jacket may be made of a material such as glass, quartz, PTFE (Teflon), polypropylene or fluoropolymers. In preferred embodiments of the present invention the reaction vessel may be provided as an interchangeable reaction vessel. In such embodiments it is preferred that the reaction vessel may be removed from a cooling means such as a cooling jacket without interrupting the flow of a circulating coolant fluid. In such embodiments the reaction vessel may be removed for example for loading with solid support or for discharging the solid support. Furthermore such an interchangeable reaction vessel allows use of various reaction vessels with different sizes for different batch sizes.

The cooling device may be connected to a coolant fluid reservoir. The cooling device may be connected to a cooling circuit pump. In preferred embodiments of the invention the cooling jacket surrounding the reaction vessel may be connected to a coolant fluid reservoir and a coolant circuit pump. The coolant fluid reservoir, the coolant circuit pump and the cooling jacket surrounding the reaction vessel may form a closed cooling circuit. The cooling jacket may be provided in form of a cooling coil surrounding the reaction vessel. The coolant circuit pump may be under control of a computer comprising at least one processor. The cooling device may comprise a cooling unit configured to control the temperature of the cooling device. The cooling unit may be electronically coupled to a computing device (200) comprising at least one processor. The cooling circuit pump may be electronically coupled to a computing device (200) comprising at least one processor to control the flow of the coolant fluid through the cooling circuit.

In one embodiment of the present invention the synthesizer comprises at least one cooling device (350) for cooling the reaction vessel (400) or more precisely for cooling the content of the reaction vessel and at least one pre-cooling device (300) for pre-cooling the reagents to be supplied to the reaction vessel. The cooling device provides at least active cooling of the reaction vessel. The pre-cooling device (300) provides at least active cooling of one or more of the reagents and/or washing solutions to be supplied to the reaction vessel.

Therefore the present invention relates to a synthesizer (100) for automated multistep synthesis on a solid support comprising:
- (a) a reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840),
- (e) a cooling device (350) for cooling the reaction vessel (400),
- (f) a pre-cooling device (300) for pre-cooling the reagents to be supplied, wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

Preferably, the means for preventing flow of reagents into the manifold line is a check valve. Preferably, each output line of the gas valve manifold comprises a check valve, a pressure regulator valve for regulating the pressure of each output line individually, and a pressure sensor. Preferably, the gas valve manifold is constructed of three layers: (i) a first layer (861) holding the manifold line (840); (ii) a second layer (862) comprising the at least three output lines (852), wherein the at least three output lines (852) are connected to the manifold line (840); and (iii) a third layer (863) comprising the means for preventing flow of reagents into the manifold line.

In one embodiment the synthesizer (100) for automated multistep synthesis on a solid support comprises:
(a) a reaction vessel (400),
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840),
(e) a cooling device (350) for cooling the reaction vessel (400),
(f) a pre-cooling device (300) for pre-cooling the reagents and washing solutions to be supplied,
wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

Preferably, the means for preventing flow of reagents into the manifold line is a check valve as disclosed herein.

Current synthesizers of the prior art require expensive and large cooling systems, thereby allowing, in principle, active cooling of the reaction vessel (400) during the coupling reactions. However, the synthesizers known in the art still suffer from low to moderate yields, decomposition of reagents and formation of side and decomposition products. These deficiencies could neither be remedied by cooling the reaction vessel to even lower temperatures or by a very slow addition and careful delivery of reagents to the reaction mixture. The first attempt did not result in the desired improvement of yield and reduction of decomposition and decrease of formation of side and decomposition products, and the latter approach led to an impractical increase of the total reaction time, while simultaneously also the side and decomposition products increased without the desired enhancement of the yield. In addition, up-scaling of this way running the reaction was almost impossible. Thus, the inventors have found that pre-cooling of the reagents prevents and avoids decomposition of the reagents during the synthesis cycles which otherwise could result in undesired side-products and decomposition products.

Figure 5:
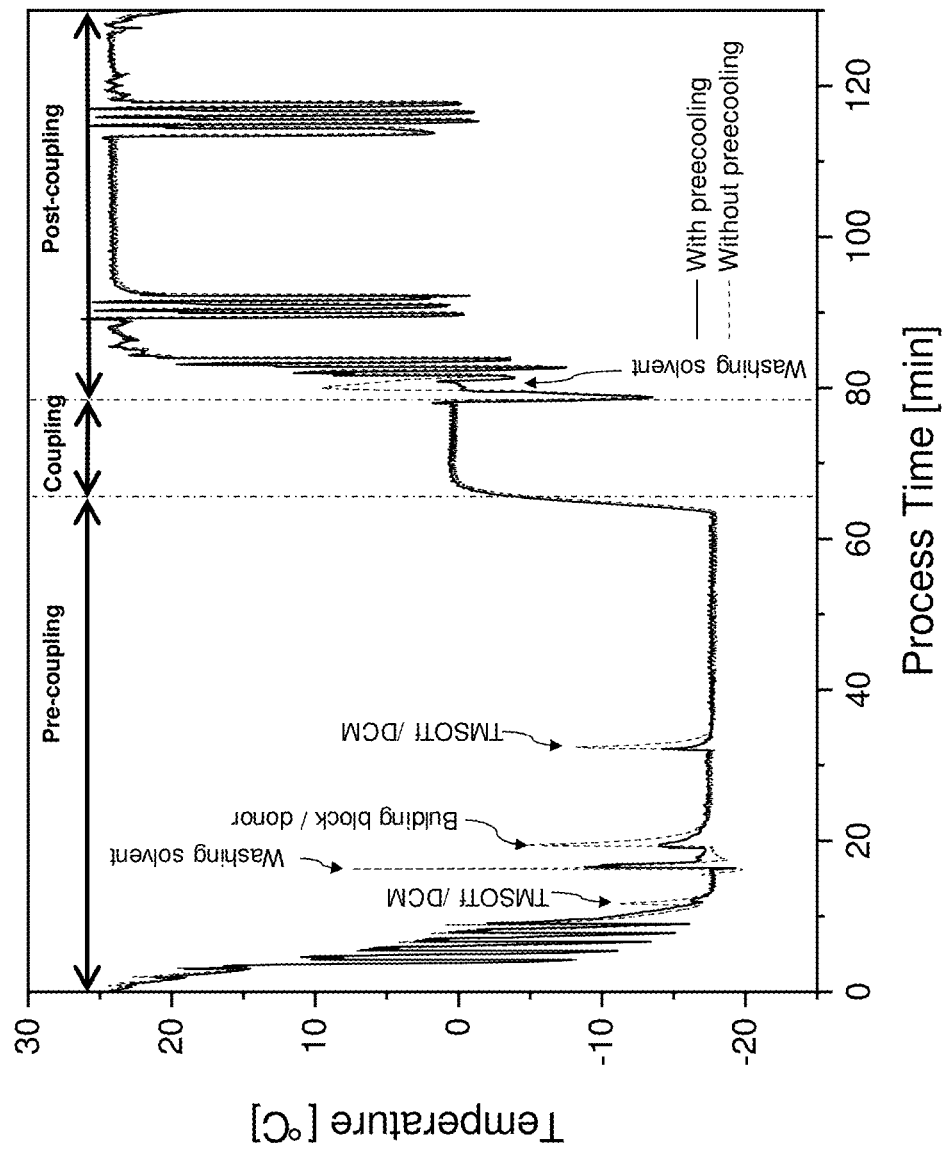
FIG. 5 shows the temperature readings inside the reaction vessel (400), taken during a synthesis cycle, in the presence and absence of the pre-cooling device (300) and without microwave irradiation/heating.

As an example, FIG. 5 shows a chart comparing temperature readings inside the reaction vessel (400), taken during a synthesis cycle, in the presence and absence of the pre-cooling device (300). The three thermal stages are identified. It can be clearly recognized that temperature spikes appear when a liquid is dispensed in the reaction vessel. The dashed curve shows the temperature profile for the device without pre-cooling of the reagents to be supplied. The thermal spikes are remarkable at the pre-coupling regime (subzero temperatures). The solid line depicts the temperature profile with active pre-cooling. The incoming solutions of reagents are effectively pre-cooled and this suppresses the undesired temperature spikes.

The inventive synthesizer comprising an improved cooling system comprising a cooling device and a pre-cooling device (300) allows the prevention of fluctuations in temperature of a reaction mixture which may otherwise result in loss of sensitive intermediates and reagents, in particular in the coupling steps of the synthesis cycles. Thus, with the cooling system of the synthesizer comprising a cooling device and a pre-cooling device (300) unfavorable temperature spikes may be effectively prevented during the transfer of building blocks and activators to the reaction vessel. Furthermore, the cooling system of the present invention allows for advantageous temperature adjustments of the reaction vessel in the pre-coupling regime and further of the reaction mixture to prevent decomposition of the reactants, sensitive intermediates and desired products at different thermal stages of the synthesis cycles. Thus, the improved cooling system of the inventive synthesizer consists of a cooling device and a pre-cooling device (300). Therefore the inventive synthesizer comprises a cooling device (350) for cooling the reaction vessel and a pre-cooling device (300) for pre-cooling the reagents to be supplied for control of the temperature of one or more reagents and/or the reaction mixture during one or more synthesis steps of the synthesis cycles to prevent decomposition of the sensitive intermediates and reagents. Of course, the cooling device (350) for cooling the reaction vessel and the pre-cooling device (300) for pre-cooling the reagents can be combined to a single cooling device (350) for cooling both, the reaction vessel and the reagents to be supplied. Most preferably the one cooling device (350) for both is a Peltier cooling element.

As used herein, the term »pre-cooling the reagents« refers to the cooling of the reagent storing component (660) and/or the cooling of the reagent delivery system (600) to the reaction vessel (400) and preferably to the cooling of the reagent delivery system and more preferably to the cooling of the reagent storing component (660) and the cooling of the reagent delivery system.

Preferably the pre-cooling device (300) is in thermal communication with the reagent delivery system (600). The pre-cooling device (300) is preferably interposed between the reaction vessel and the reagent delivery device. The pre-cooling device (300) is preferable positioned in close proximity to the one or more inlets of the reaction vessel. Thus, the pre-cooling device (300) may be adapted to function as a pre-cooling inlet for pre-cooling the reagents to be supplied. The pre-cooling device (300) may be adapted for active cooling of the reagents to be supplied. In other words the incoming solutions at room temperature from the reagent delivery system (600) are actively cooled by the pre-cooling device (300) to a temperature around the preset temperature of the reaction mixture in the reaction vessel. By pre-cooling the at room temperature incoming solutions to around the temperature of the reaction vessel the reagents to be supplied are added to the reaction mixture at a temperature that preferably corresponds to the temperature of the reaction mixture in the reaction vessel.

In one embodiment, all reagents and solvents, including, building blocks, activators and washing solvents, are pre-cooled before addition to the reaction mixture in the reaction vessel (400). In one embodiment, only the activators or activator solutions are pre-cooled before addition to the reaction mixture in the reaction vessel. Preferably at least the building blocks and activators (or a solution thereof) are pre-cooled before addition to the reaction mixture in the reaction vessel and preferably all reagents and solutions added to perform the coupling reaction are pre-cooled close to the temperature of the reaction mixture in the reaction vessel. Furthermore, the resulting intermediates are often temperature sensitive and may decompose at higher temperatures then the desired temperature of the reaction mixture. It should be clear that already formed temperature sensitive intermediates in the reaction mixture may decompose in case further warmer reagents or solvents are added to the reaction mixture, such as reagents or solvents at room temperature. In such a case it may be suitable to supply these reagents or solvents in a slow and careful manner, for example dropwise manner, by monitoring the temperature of the reaction mixture at the same time. However, in larger batch sizes a larger amount of the reagents to be supplied are added to the reaction mixture. The delayed addition, for example dropwise addition, and the period of time until the reaction mixture is adjusted to the desired and preset temperature may also result in decomposition of the reagents and in particular the sensitive intermediates. The inventors of the present invention have found that on the one hand the rapid addition of the reagents to the reaction mixture in the pre-coupling stage and impregnating of the resin to allow these reagents to diffuse through the porous solid for a period of time of 1 minute to 20 minutes, preferably 5 minutes has an advantageous effect on the overall yield of the desired oligo- and polysaccharide.

On the other hand the inventors have found that the monitoring of the reaction mixture temperature during the addition of reagents and solvents and the careful and slow addition of these reagents such that the reaction mixtures maintains the desired reaction mixture has also an advantageous effect on the overall yield of the desired oligo-, polysaccharide or peptide. The inventive synthesizer comprising a pre-cooling device (300) for pre-cooling the reagents to be supplied has the advantage that the pre-cooled reagents to be supplied may be added in a faster and rapid manner to the reaction mixture without unfavorable temperature fluctuations in the reaction mixture in the pre-coupling stage at preferably −40° C. to −10° C. and has the advantages that the added pre-cooled reagents may be allowed to impregnate the resin to diffuse through the porous solid for a period of time of 1 minute to 20 minutes, preferably 5 minutes such that the overall time of the pre-coupling stage including the adding and impregnating of the reagents may be reduced such that decompositions of the reagents and the resulting intermediates may be effectively prevented in comparison to a slow and careful addition of the reagents to be supplied which may result in an overall time of the pre-coupling stage of over 25 minutes or 30 minutes or more.

The rapid addition of the pre-cooled reagents in the pre-coupling stage to allow effective impregnation of the resin and the prevention of the temperature fluctuation during the addition of the pre-cooled reagents has been shown to be particularly advantageous with regard to the glycosylation reactions in the synthesis of oligo- and polysaccharides.

The pre-cooling device (300) is preferably adapted for pre-cooling of the reagents to be supplied to the corresponding temperature of the reaction mixture in the reaction vessel (400). For example, if the reaction vessel is actively cooled to a temperature of −30° in the pre-coupling stage of a synthesis cycle the reagents to be supplied may preferably be pre-cooled also to a temperature of −30° C. by the pre-cooling device (300) or preferably to −31° C. or −32° C. or −33° C. or to a lower temperature. In such a case the pre-cooled reagents at a temperature of −30° C. are added to the reaction mixture having a temperature of −30° C., wherein temperature fluctuations in the reaction mixture are prevented during addition of the reagents. However, the reagents to be supplied to the reaction vessel may be also added at a slightly higher temperature then the temperature of the reaction mixture in the reaction vessel.

Preferably the reagents are pre-cooled by the pre-cooling device (300) to a temperature in the temperature range corresponding to the temperature range of −40° C. to −8° C., preferably of −30° C. to −9° C., and more preferably to the temperature range of −20° C. to −10° C. of the pre-coupling stage. In preferred embodiments of the present invention the pre-cooling device (300) may be adapted for pre-cooling the reagents to be supplied at least to a temperature which is not higher than −3° C., preferably −6° C., more preferably −8° C. or −10° C. of the temperature of the reaction mixture in the transparent reaction vessel so that the temperature of the supplied reagents is not higher than 3° C., preferably 6° C., more preferably 8° C. or 10° C. below the temperature of the reaction mixture in the reaction vessel. Preferably the pre-cooling device (300) may be adapted to cool the reagents to be supplied to a temperature in the range of 3° C. to 6° C. below the temperature of the reaction mixture in the reaction vessel. Thus, it is preferred that the reagents to be supplied are pre-cooled to the corresponding temperature of the reaction vessel with a maximum variance of 0° C. to 10° C. below the temperature of the reaction mixture in the reaction vessel. Most preferably the temperature of the reaction mixture in the reaction vessel does not exceed a temperature of −10° C. in the pre-coupling stage of the synthesis cycle.

Thus, it is preferred that the reagents to be supplied are pre-cooled to the corresponding temperature of the reaction vessel (400) with a maximum variance of 10° C. or maximum deviation of 10° C., preferably with a maximum variance of 5° C. or maximum deviation of 5° C., more preferably with a maximum variance of 3° C. or maximum deviation of 3° C. In preferred embodiments it is preferred that the temperature of the reaction mixture in the reaction vessel does not exceed a temperature of −10° C. in the pre-coupling stage of the synthesis cycle.

Most preferably, the temperature of the reagents to be supplied to the reaction vessel (400) is in the range of −18° C. to −8° C., preferably in the range of −16° C. to −9° C., more preferably in the range of −14° C. to −10° C. and still more preferably in the range of −12° C. to −10° C.

In preferred embodiments of the present invention various liquid lines such as washing solvents lines, building block lines, and activator solution lines may be pre-cooled before feeding the reaction vessel. In other words the pre-cooling device (300) may be located upstream to the reaction vessel. The pre-cooling device (300) may be interposed between the reaction vessel and the reagent delivery system (600).

Thus, the reaction vessel (400) may be connected to a pre-cooling device (300) which allows active pre-cooling of various liquid lines such as washing solvents, building blocks, activator solution before said washing solvents, building blocks, activator solution are delivered and supplied to the reaction vessel. In such embodiments the flow of liquid to the reaction vessel from the reagent delivery system (600) is not interrupted as the reagents to be supplied to the reaction vessel are pre-cooled during the delivery to the reaction vessel. Preferably the flow speed of the liquids through the various liquid lines are taken into account as by lower flow speeds the reagents may be pre-cooled for a longer period of time to enable effective cooling to the desired temperatures. In one embodiment, all liquid lines between the reagent delivery system and the reaction vessel are pre-cooled by the pre-cooling device (300) located between the reagent delivery system and the reaction vessel. In one embodiment, only one liquid line between the reagent delivery system and the reaction vessel is pre-cooled by the pre-cooling device (300) located between the reagent delivery system (600) and the reaction vessel. In a further embodiment, at least one liquid line between the reagent delivery system and the reaction vessel is pre-cooled by the pre-cooling device (300) located between the reagent delivery system and the reaction vessel.

In preferred embodiments the pre-cooling device (300) may comprise a metal cooling surface made of a metal heat exchange material. In such embodiment the building block delivery line and activator line may contact the metal cooling surface at a preset temperature. Thus, the metal cooling surface may be cooled to a predefined temperature. Preferably the predefined temperature corresponds to the temperature of the reaction mixture in the reaction vessel, thus preferably corresponds to the desired reaction temperature. The metal cooling surface may be made of any known metal heat exchange material. In further preferred embodiments the washing solvent delivery line may also contact the metal cooling surface at a preset temperature.

In preferred embodiments the pre-cooling device (300) may comprise a thermoelectric contact-cooling device such as a Peltier cooler. The cooling effect provided by a Peltier cooler is based on the well-known Peltier effect. The Peltier cooler is adapted to provide the means to reach the preset temperature. Thus, the Peltier cooler may be in thermal communication with the metal cooling surface.

In preferred embodiments the thermoelectric contact-cooling device is assisted by a line of coolant fluid, such as for example cooling water, preferably at a temperature of 15° C. to cool down the warm side of the thermoelectric contact-cooling device. The cooling water line could be provided by a central cooling system or a compact commercial cooling unit.

In preferred embodiments the pre-cooling device (300) may also provide active cooling to the reaction vessel (400). In other words the pre-cooling device (300) may be a part or component of the cooling device. In such embodiments the pre-cooling device (300) may provide active cooling to the cooling jacket surrounding the reaction vessel. Thus, the pre-cooling device (300) may be adapted to provide active cooling to the cooling circuit comprising the cooling jacket, cooling circuit pump and the coolant fluid reservoir. In such embodiments the cooling device (350) for cooling the reaction vessel and the pre-cooling device (300) for pre-cooling the reagents to be supplied are adjusted simultaneously to the same preset temperature. Thus, based on the preset temperature for cooling of the reaction vessel the reagents to be supplied will be pre-cooled to the temperature of the reaction vessel.

In embodiments of the inventive synthesizer comprising a pre-cooling device (300), the reagent delivery system (600) may be connected to the pre-cooling device (300). With other words, the reagent delivery system may be connected to a pre-cooling device (300) for pre-cooling the reagents to be supplied. The reagent delivery system device may be adapted for receiving reagents from the reagent storing device and may be further adapted for delivery of the received reagents to a pre-cooling device (300) for pre-cooling the reagents to be supplied and may be further adapted for delivery of the pre-cooled reagents to the reaction vessel (400). Thus, in preferred embodiments the reagent delivery system may be adapted for receiving one or more reagents such as building blocks and activators and/or one or more reagent solutions such as building block solutions and activator solutions and/or one or more washing solutions and/or one or more deprotection solutions from a reagent storing component (660) or one or more reagent storing components (660) and may be further adapted for delivery of the received one or more reagents and/or one or more reagent solutions and/or one or more washing solution and/or one or more deprotection solutions to a pre-cooling device (300) for pre-cooling the reagents to be supplied and may be further adapted to deliver the pre-cooled one or more reagents and/or one or more reagent solutions and/or one or more washing solutions and/or one or more deprotection solutions to the reaction vessel (400).

In embodiments of the inventive synthesizer comprising a pre-cooling device (300), reagent delivery system (600) may be adapted for delivery of one or more of the reagents and/or reagents solutions and/or washing solutions and/or deprotection solution to the pre-cooling device (300) for pre-cooling the reagents to be supplied. In such embodiments it is particularly preferred that at least the building blocks and the activators are delivered to the pre-cooling device (300) for pre-cooling the reagents to be supplied. In further preferred embodiments the reagent delivery system may also be adapted for delivery of the washing solutions or washing solvents to the pre-cooling device (300) for pre-cooling the reagents to be supplied.

In embodiments of the inventive synthesizer comprising a pre-cooling device (300), the reagent delivery system may be in thermal communication with a pre-cooling device (300) for pre-cooling the reagents to be supplied. In further preferred embodiments of the present invention one or more delivery lines connecting the reagent delivery system (600) and the reaction vessel (400) may be in thermal communication with a pre-cooling device (300) for pre-cooling the reagents to be supplied. Thus, in such embodiments the reagent delivery system may be adapted for delivery of one or more reagents to the reaction vessel (400), the reagent delivery system in thermal communication with a pre-cooling device (300) for pre-cooling the reagents to be supplied, wherein the one or more reagents are pre-cooled by the pre-cooling device (300) before entering the reaction vessel (400), and preferably wherein the one or more reagents are pre-cooled through contact cooling by the pre-cooling device (300) for pre-cooling the reagents to be supplied.

In some embodiments of the inventive synthesizer comprising a pre-cooling device (300), the reagent delivery system (600) may be interposed between a pre-cooling device (300) and the reagent storing component (660). In such embodiments the reagent delivery system (600) is connected to the reagent storing component (660) and is further connected to a pre-cooling device (300). It is particularly preferred that the reagent storing component (660) and the pre-cooling device (300) are not directly connected to each other. In other words it is preferred that the reagent storing component (660) and the pre-cooling device (300) are connected through the reagent delivery system (600). It is further preferred that the pre-cooling device (300) for pre-cooling the reagents to be supplied connects the reagent delivery system (600) with the reaction vessel (400). Thus, in some embodiments the reaction vessel (400), the pre-cooling device (300), the reagent delivery system (600) and the reagent storing device are successively connected in the following sequence: reaction vessel (400)-pre-cooling device (300)-reagent delivery system-reagent storing device.

In some embodiments of the inventive synthesizer comprising a pre-cooling device (300) and a reagent delivery system (600) comprising a first reagent distribution component and a second reagent distribution component, it is particularly preferred that the first distribution component or the top distribution component is connected to the pre-cooling device (300) for pre-cooling the reagents to be supplied for delivery of pre-cooled building blocks or building block solutions and activators or activator solutions to the reaction vessel (400). In such embodiments the first distribution component or the top distribution component may also deliver the washing solvents or washing solution to the pre-cooling device (300) and thereafter may supply pre-cooled washing solvents or washing solution to the reaction vessel (400). The top distribution component may be also adapted to provide a ventilation exit for gases.

In some embodiments of the inventive synthesizer comprising a pre-cooling device (300), the components of the reagent delivery system (600), particularly, building block distribution component, activator distribution component and the washing solvent distribution component are adapted to deliver the respective building blocks, activators and washing solvents to the pre-cooling device (300) for pre-cooling the reagents to be supplied and are further adapted to deliver the respective pre-cooled building blocks, pre-cooled activators and pre-cooled washing solvents to the reaction vessel (400).

The inventive synthesizer may further comprise a microwave generator (500). Microwave-assisted organic chemical synthesis refers to the use of electromagnetic radiation within the microwave frequencies to provide the energy required to initiate, drive or accelerate certain chemical reactions. Several multimode or mono-mode/single-mode microwave generators (500) for microwave-assisted organic synthesis are known in the art, for example, in multimode instruments microwaves are reflected by the walls of a relatively large cavity, which may generate pockets of high and low energy as the moving waves either reinforce (hot spots) or cancel out each other (cold spots) leading to a non-homogeneous microwave field in the cavity. In order to provide a homogeneous field, multimode instruments may be equipped with a mechanical mode stirrer inside the cavity. In mono-mode cavities a standing wave may be created when the electromagnetic irradiation is passed by a waveguide that directs the microwaves directly through a reaction vessel (400) that is positioned in a fixed distance from the radiation source or by generating travelling waves where the microwaves make a single pass through the reaction vessel, are reflected off the cavity wall and pass through the reaction vessel a second time. Multimode microwave components enable performance of parallel synthesis, whereas mono-mode microwave components provide a high degree of reproducibility due to a very precise heating. The microwave generator (500) may be one of a magnetron, klystron and solid state devices. A solid-state microwave generator (500) uses a semiconductor transistor which generates single, defined microwave frequencies in a controlled manner.

Thus, in preferred embodiments of the present invention the synthesizer may further comprise a microwave generator (500), preferably a mono-mode/single-mode microwave generator (500). The microwave generator (500) may further comprise a waveguide. The microwave generator (500) preferably comprises a chamber for insertion and fixing of the reaction vessel to provide microwave radiation to the reaction vessel.

Therefore, the present invention further relates to a synthesizer (100) for microwave-assisted automated multistep synthesis on a solid support comprising:
- (a) a microwave transparent reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840),
- (g) a microwave generator (500), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

Preferably, the means for preventing flow of reagents into the manifold line is a check valve as disclosed herein.

Also, the present invention further relates to a synthesizer (100) for microwave-assisted automated multistep synthesis on a solid support comprising:
- (a) a microwave transparent reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840),
- (e) a cooling device (350) for cooling the microwave transparent reaction vessel (400),
- (g) a microwave generator (500), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line. Preferably, the means for preventing flow of reagents into the manifold line is a check valve as disclosed herein.

Also, the present invention further relates to a synthesizer for microwave-assisted automated multistep synthesis on a solid support comprising:
- (a) a microwave transparent reaction vessel (400),
- (b) a reagent storing component (660) comprising one or more reagent containers (630, 631, 632 . . . ),
- (c) a reagent delivery system (600) configured to establish a fluid communication between each of the one or more reagent containers (630, 631, 632 . . . ) and the reaction vessel (400), wherein at least two fluid communications are separate of each other,
- (d) an inert gas delivery system (800) comprising a gas container (801) and a gas valve manifold (802), wherein the gas valve manifold (802) comprises a manifold line (840) and at least three output lines (852) connected to the manifold line (840),
- (e) a cooling device (350) for cooling the microwave transparent reaction vessel (400),
- (f) a pre-cooling device (300) for pre-cooling the reagents and washing solutions to be supplied
- (g) a microwave generator (500), wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

Preferably, the means for preventing flow of reagents into the manifold line is a check valve. Preferably, each output line of the gas valve manifold comprises a check valve, a pressure regulator valve for regulating the pressure of each output line individually, and a pressure sensor. Preferably, the gas valve manifold is constructed of three layers: (i) a first layer (861) holding the manifold line (840); (ii) a second layer (862) comprising the at least three output lines (852), wherein the at least three output lines (852) are connected to the manifold line (840); and (iii) a third layer (863) comprising the means for preventing flow of reagents into the manifold line. Preferably, the microwave transparent reaction vessel (400) is equipped with a temperature sensor.

The microwave transparent reaction vessel (400) may be constructed as a double-wall structure which forms two cavities, wherein the first cavity accommodates the multistep synthesis of oligo-, polysaccharides or peptides and wherein the second cavity accommodates a microwave transparent coolant fluid. The double-wall structure of the microwave transparent reaction vessel may be made of glass. Thus, the microwave transparent reaction vessel may be provided with a cooling jacket for cooling the reaction vessel. Preferably, the cooling jacket may be made of a microwave transparent material such as glass, quartz, PTFE (Teflon), polypropylene or fluoropolymers. In preferred embodiments of the present invention the reaction vessel may be provided as an interchangeable microwave transparent reaction vessel. In such embodiments it is preferred that the microwave transparent reaction vessel may be removed from a cooling means such as a cooling jacket without interrupting the flow of a circulating microwave transparent coolant fluid. In such embodiments the reaction vessel may be removed for example for loading with solid support or for discharging the solid support. Furthermore such an interchangeable reaction vessel allows use of various reaction vessels with different sizes for different batch sizes.

In comparison to conductive heating microwave heating (dielectric heating at 2.45 GHz) occurs by disposing the energy directly to the solvent and some reagents, due to interactions of the solvents and reagents with the alternating electric field. Material interacts with the electromagnetic field differently, i.e. materials store and convert the energy to heat to different extents, which have huge impact on their ability to be heated by microwaves. Besides the solvent, several other factors influence the dielectric properties, such as sample volume, vessel material, and the mode of stirring. The application of heat energy (thermal transfer) is one of the most significant factors in increasing the rate of a wide variety of chemical reactions. Microwave-assisted reactions, however, transfer energy to chemical reactions in a different, much faster manner than the conductive devices. Microwave energy directly interacts with polar or ionic molecules. This, effect, known as dipole rotation, is a result of the polar or ionic molecules trying to align themselves with the rapidly changing electric field of the microwaves. The rotational movement of molecules as they try to orient themselves with the electric field creates localized superheating and generates thermal energy as a by-product.

Thermal energy may be raised beyond a critical point for a given reaction, resulting in excess thermal energy. Excess thermal energy increases the temperature of a reaction mixture. This excess thermal energy may have detrimental effects on heat-sensitive reactions or compositions. Excess thermal energy can drive side reactions that degrade the reactants, catalysts and desired product of the desired reaction. Furthermore, some products may be unstable at room temperature. Therefore it is advantageous to maintain a low bulk reaction mixture temperature. The beneficial effects of simultaneous cooling during microwave irradiation have been described in the art to be useful for chemical synthesis with solid phase supports.

The inventors of the present invention have found that the utilization of a microwave generator (500) is not only instrumental for hastening the cooling to heating process, microwave-assisted synthesis has also been shown to drastically reduce chemical reaction time. During a typical AGA cycle there is the glycosylation coupling step as well as several auxiliary steps (acetyl capping and temporary group deprotection). These auxiliary steps increase the overall yield of the final glycan by terminating unglycosylated nucleophiles as well as they remove temporary protecting groups that allows the next coupling to occur. These auxiliary steps have been a bottleneck in the overall time required for one AGA cycle and the use of microwave radiation drastically reduces the reaction time. Under these rapid microwave-assisted conditions, the steps remained orthogonal and few side reactions were observed. With shortened reaction times for these auxiliary steps, the overall duration of a standard AGA cycle could be successfully reduced from 100-130 minutes to below 70 minutes and even to 45 minutes. Thus, the auxiliary steps carried out in the automated saccharide synthesis benefit from the use of microwave radiation.

FIG. 7A shows the temperature profiles (for detail see Example 3) of the reaction vessel (400) (in solid line) and the chiller (in segmented line; measured at the tubing side) for a complete cycle (Pre-coupling, coupling and post-coupling) during the synthesis of mannose tetramer via phosphate donor. In addition, the post-coupling step from the previous cycle is shown, too. The experiment was performed without precooling. In this implementation the chiller provides the active cooling to the reaction vessel by fluid communication with a jacket. The chiller adjusts T1

(pre-coupling temperature) and T2 (coupling temperature). During the post coupling the microwave irradiation heats up the reagent and washing solvents during the capping a deprotection modules. Simultaneously the chiller adjusts the temperature for the next coupling.

Figure 7B:
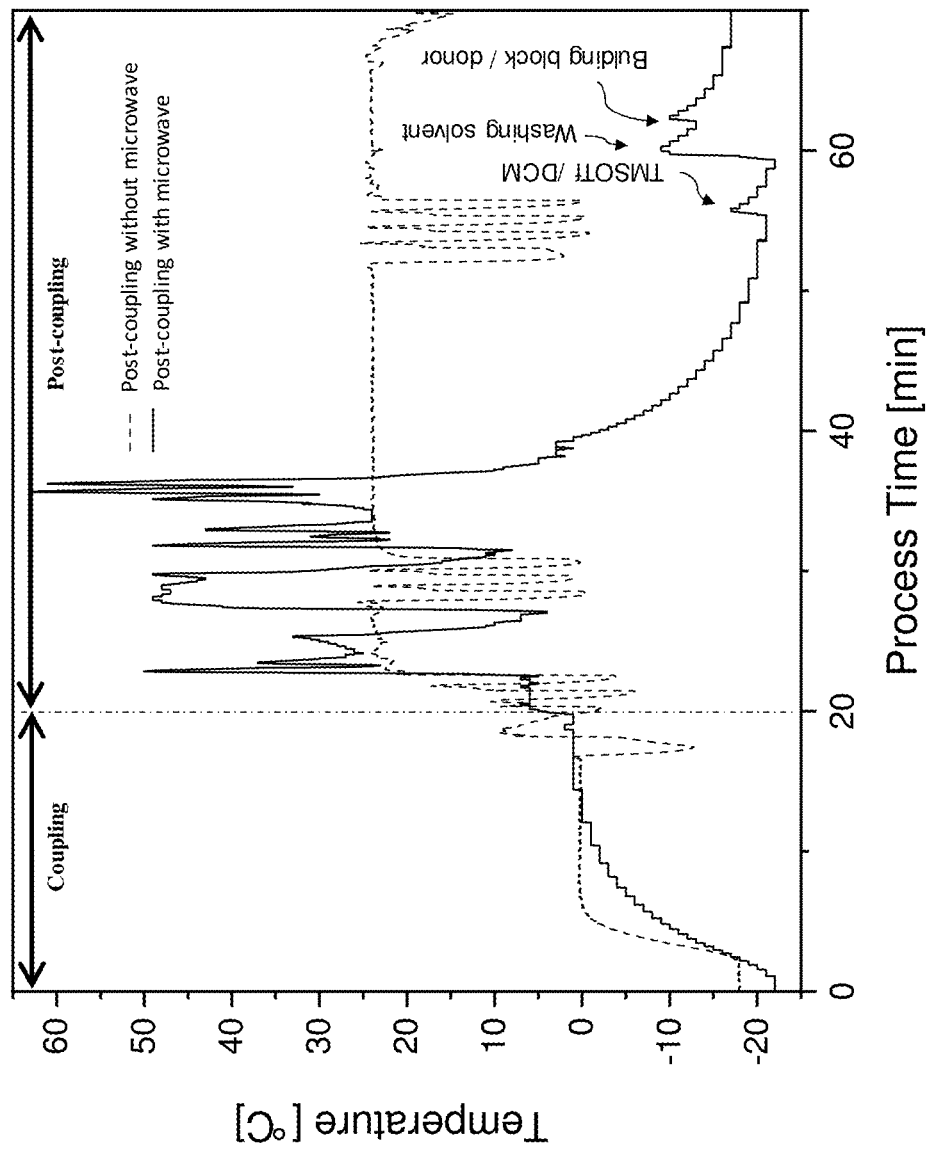
FIG. 7B shows charts comparing temperature readings inside the glass reaction vessel (400), taken during a synthesis cycle via phosphate-glycosylation, with and without the microwave irradiation during the post coupling reactions.

FIG. 7B compares the temperature profiles during post-coupling reactions assisted by microwave radiation (in solid line, Example 3, FIG. 7A). In segmented line the temperature profiles during post-coupling with conventional temperature regulation by heat exchanger with the jacket/coil surrounding the reaction vessel (400) (FIG. 5). A dramatic time reduction is shown, the conventional post-coupling reaction (capping and deprotection) takes from 50 min, while the microwave assisted post coupling reaction modules is completed in 15.

Figure 7C:
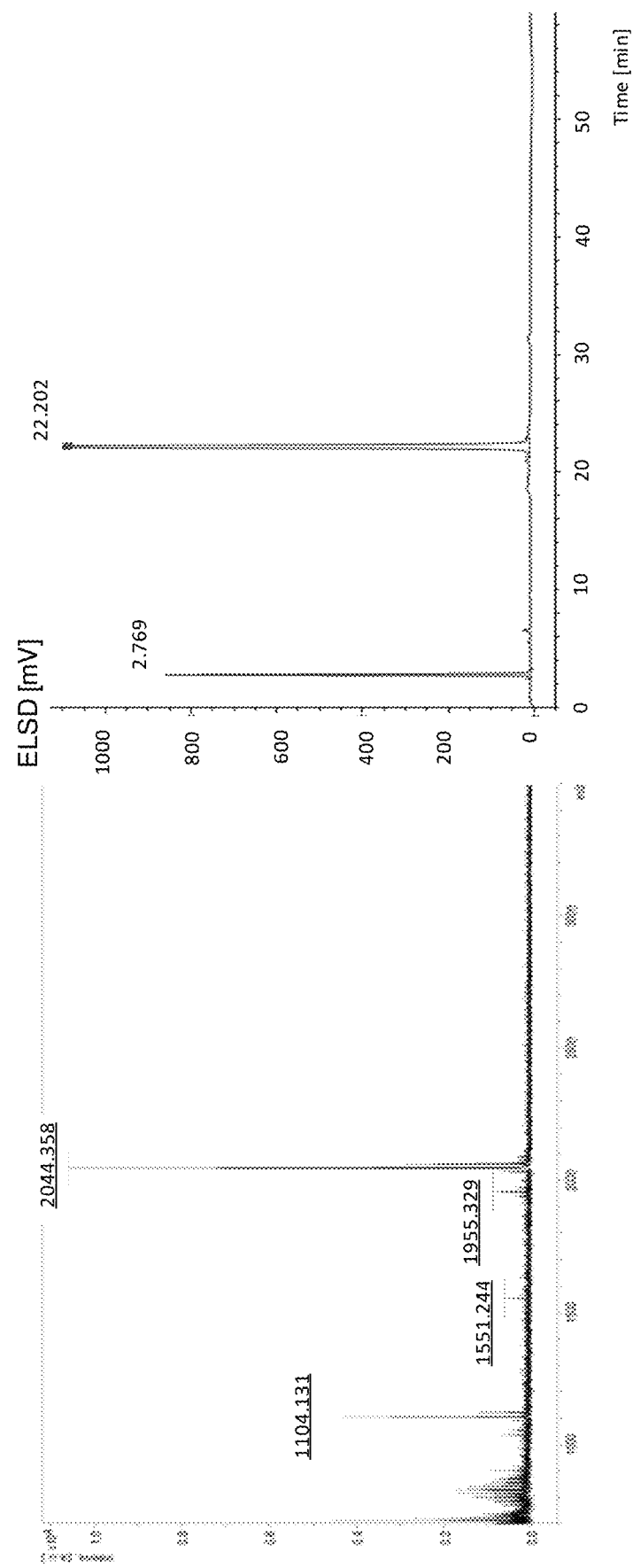
FIG. 7C shows analytical results by MALDI and HPLC of experiments from FIG. 7A.

FIG. 7C shows the analytical results of the experiments described in FIG. 7A. Mass spectra (MALDI) and HPLC chromatogram are provided. The experiment performed under simultaneous microwave heating and active cooling during the post-coupling step shows mainly the desired product by HPLC. Barely traces of deletion sequences have been observed.

FIG. 8A shows the temperature profiles (Example 4) of the reaction vessel (400) (in solid line) and the chiller (in segmented line; measured at the tubing side) for a complete cycle (pre-coupling, coupling and post-coupling) during the synthesis of mannose tetramer via phosphate donor. The experiment was performed without precooling. In this implementation the chiller provides the active cooling to the reaction vessel (400) temperature in fluid communication with a jacket. The chiller provides constant cooling action, working at constant temperature T1 (pre-coupling temperature). The coupling temperature T2 is adjusted by microwave irradiation. Later, the post coupling temperature T3 is reached by microwave irradiation too. The microwave radiation heats up the reagent and washing solvents during the capping a deprotection modules. The microwave irradiation occurs while the chiller provides constant cooling (T1). The inventor shows the improvement within cycle duration by combining constant cooling simultaneously with microwave radiation to adjust the temperature in the reaction vessel (400) (T2 and T3). The conventional cycle (FIG. 5) takes 130 min, while the cycle with temperature control assisted by microwave takes less than 80 min.

By combining active cooling and microwave heating the temperature adjustment rate is improved in both direction of the thermal gradient (from lower to higher temperatures and vice versa).

With simultaneous active cooling and microwave heating the temperature the energy consumption of the chiller is highly optimized. As a consequence; a less powerful chiller is required in this setup since the chiller needs to absorb less heat to adjust and/or maintain the temperature.

Figure 8B:
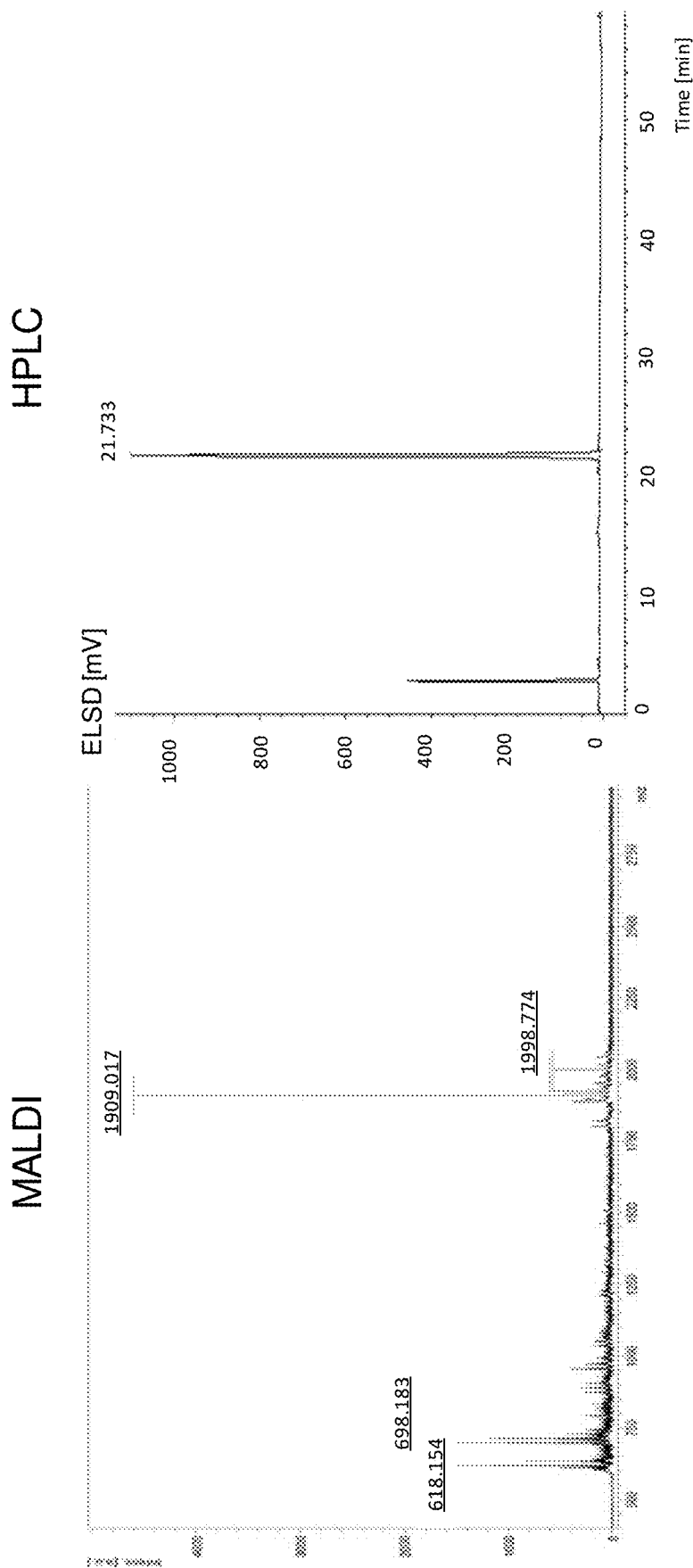
FIG. 8B shows analytical results by MALDI and HPLC of experiments from FIG. 8A.
Figure 9B:
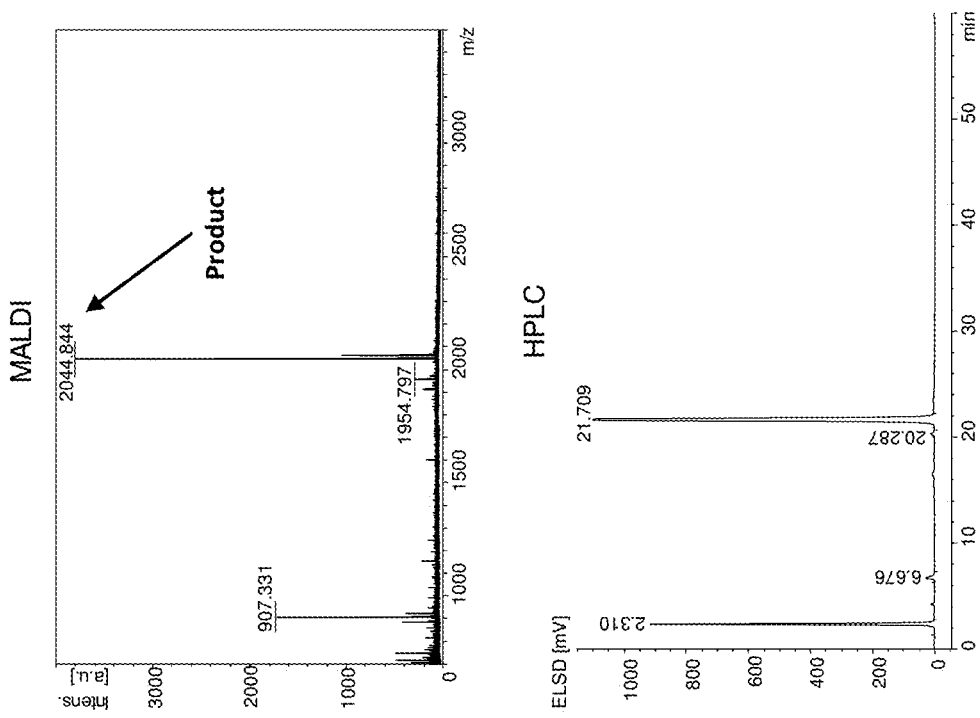
FIG. 9B shows analytical results by MALDI and HPLC of experiments from fast coupling synthesis of example 5.
Figure 9A:
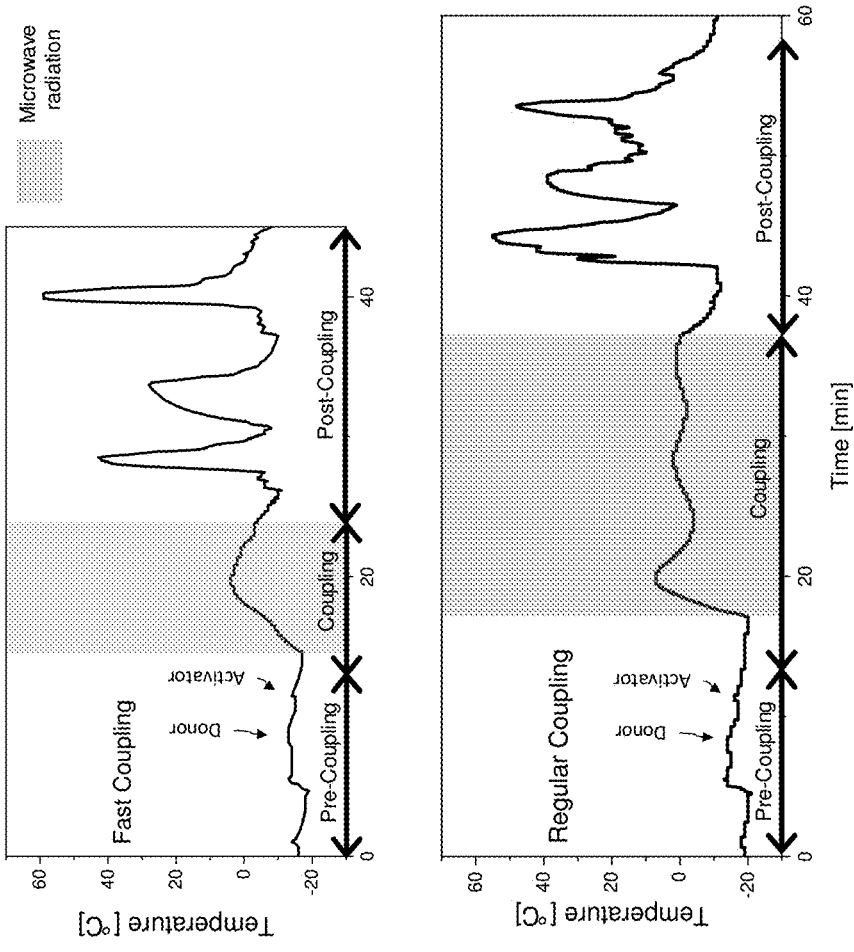
FIG. 9A shows temperature charts comparing fast coupling (10 min, example 5) and regular coupling (25 min, example 4). The temperature inside the reaction was taken during a synthesis cycle via phosphate glycosylation; with constant cooling and temperature adjustment during the coupling and post coupling reactions via microwave irradiation. Each chart shows the sequence of four chemical steps: Acidic washing, coupling/glycosylation, capping, and deprotection. The fast coupling allows a complete cycle in less than 45 min, while regular coupling take above 1 h.
Figures 11A, 11B:
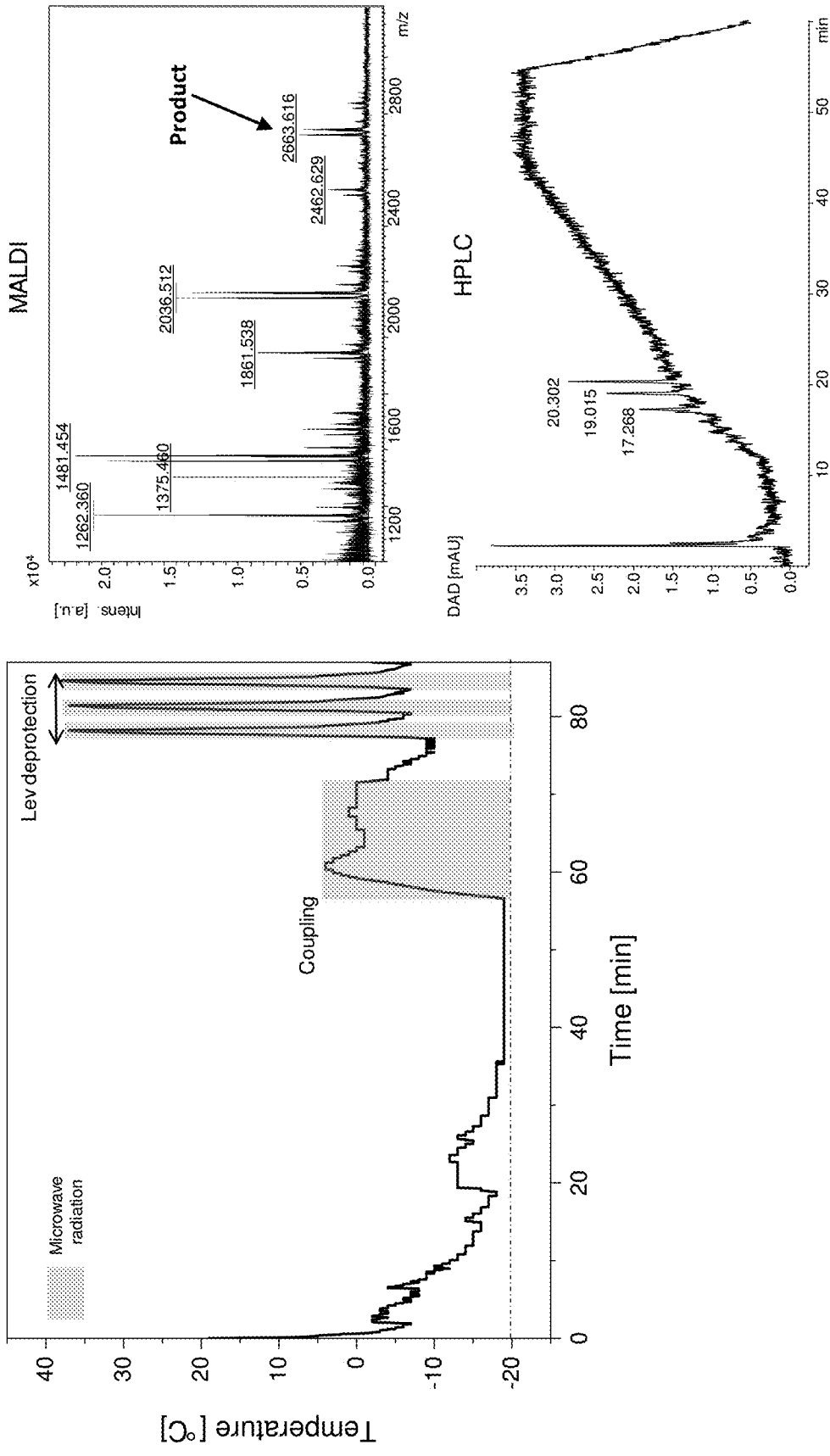
FIG. 11A shows temperature charts of the first cycle during the synthesis of 5-amino-pentyl α-(1→3)-D-tetra-mannopyranoside (Example 7). The solid line follows the temperature inside the reaction. The dash line shows the temperature at the cooling jacket side. The grey areas highlight the microwave irradiation periods allowing the adjustment of the temperature inside the reaction vessel (400). The Lev deprotection period is indicated.
FIG. 11B shows analytical results by MALDI (the mass of the product is mark plus sodium ion) and HPLC of experiments from synthesis Example 7.
Figure 12B:
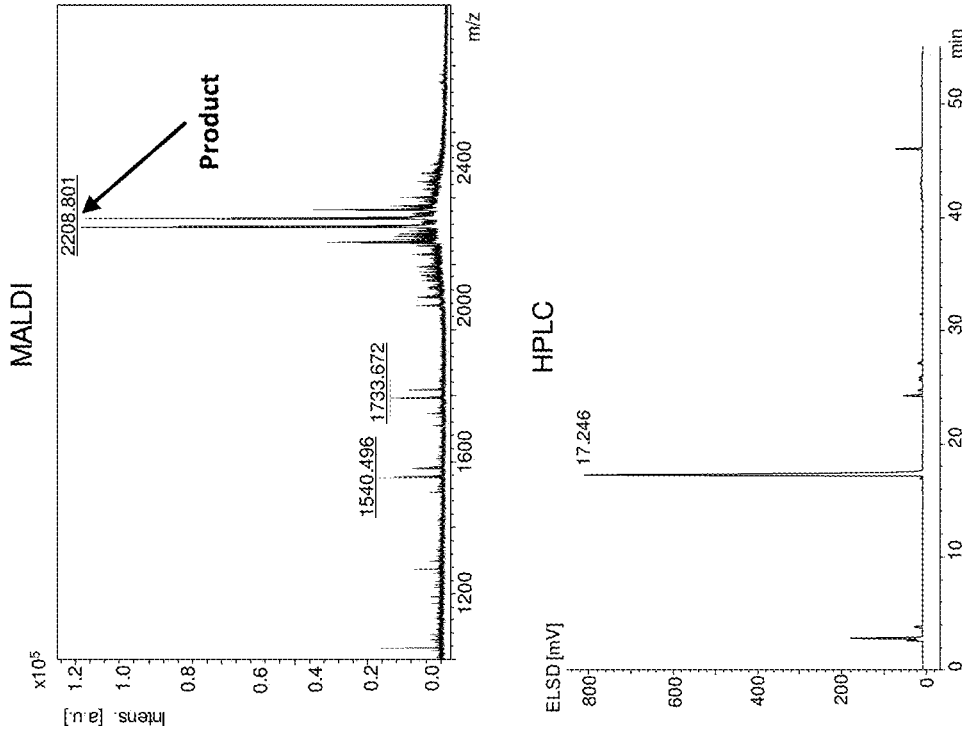
FIG. 12B shows analytical results by MALDI (the mass of the product is mark plus sodium ion) and HPLC of experiments from synthesis Example 8.
Figure 12A:
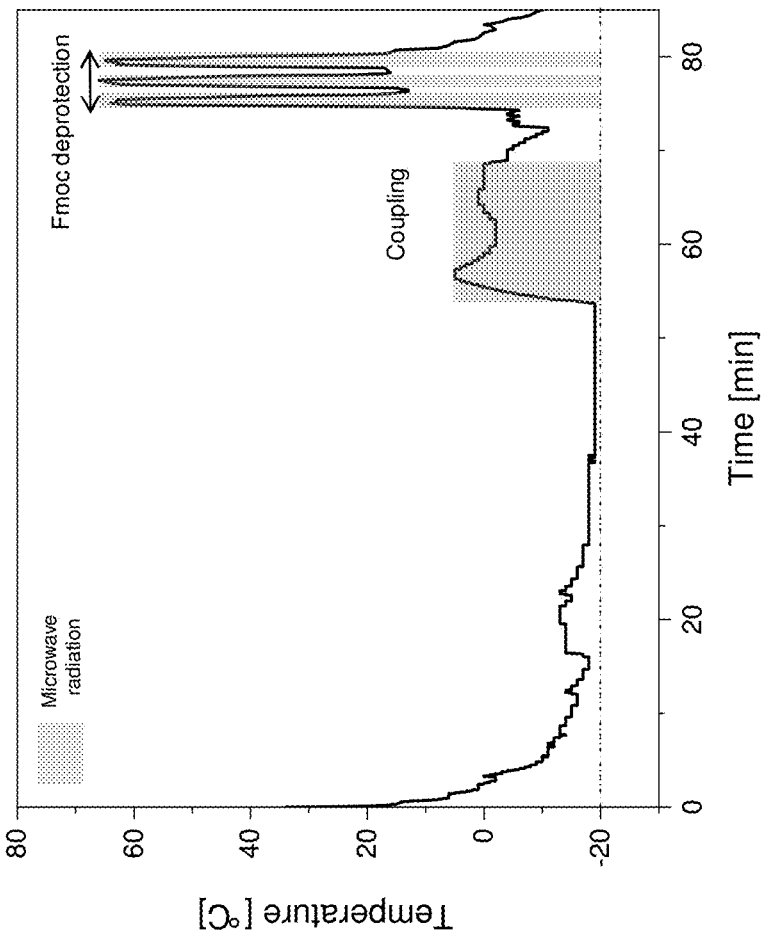
FIG. 12A shows temperature charts of the first cycle during the synthesis of 5-Amino-pentyl α-(1→4)-D-tetra-mannopyranoside (Example 8). The solid line follows the temperature inside the reaction. The dash line shows the temperature at the cooling jacket side. The grey areas highlight the microwave irradiation periods allowing the adjustment of the temperature inside the reaction vessel (400). The Fmoc deprotection period is indicated.
Figure 13B:
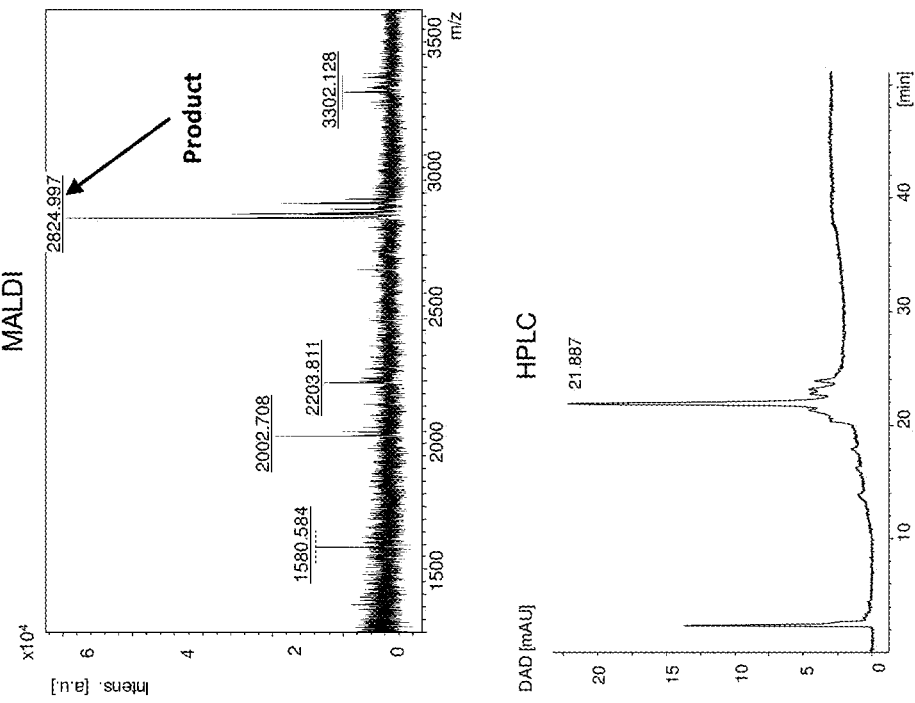
FIG. 13B shows analytical results by MALDI (the mass of the product is mark plus sodium ion) and HPLC of experiments from synthesis Example 9.
Figure 13A:
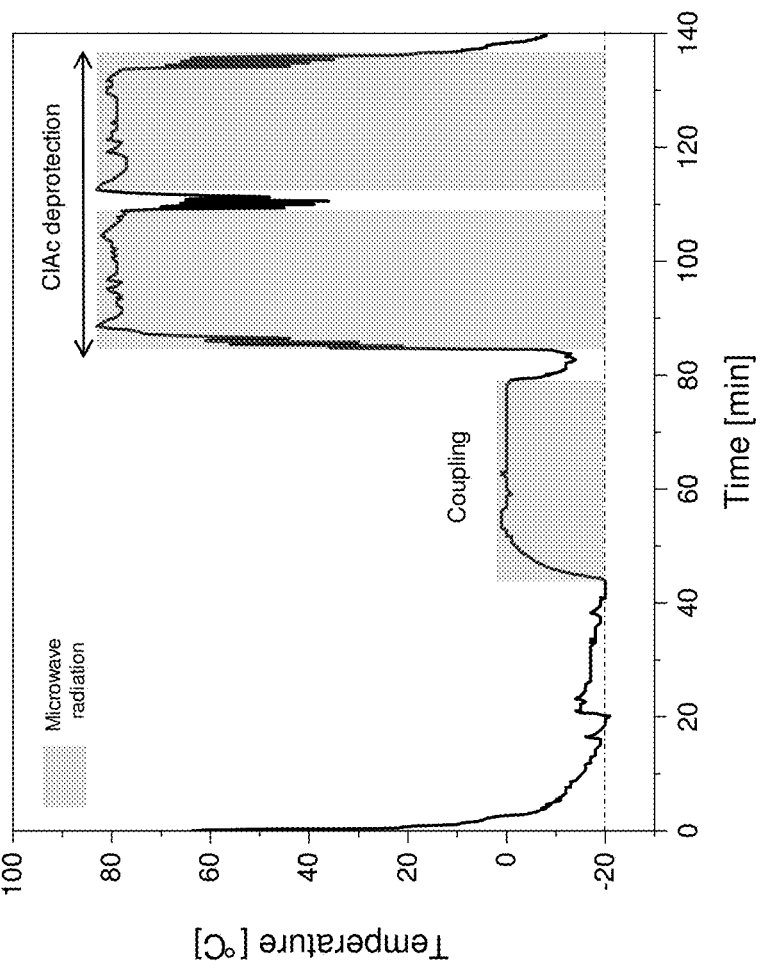
FIG. 13A shows temperature charts of the first cycle during the synthesis of 5-Amino-pentyl α-(1→6)-D-tetra-mannopyranoside (Example 9). The solid line follows the temperature inside the reaction. The dash line shows the temperature at the cooling jacket side. The grey areas highlight the microwave irradiation periods allowing the adjustment of the temperature inside the reaction vessel (400). The chloroacetyl deprotection period is indicated.
Figure 14B:
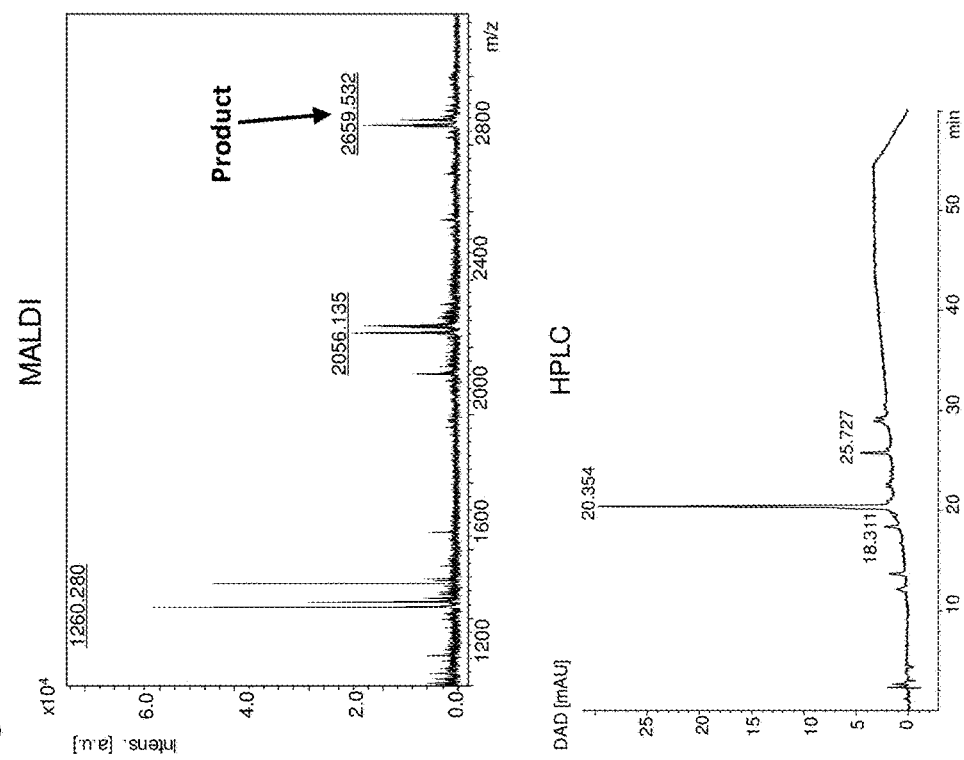
FIG. 14B shows analytical results by MALDI (the mass of the product is mark plus sodium ion) and HPLC of experiments from synthesis Example 10.
Figure 14A:
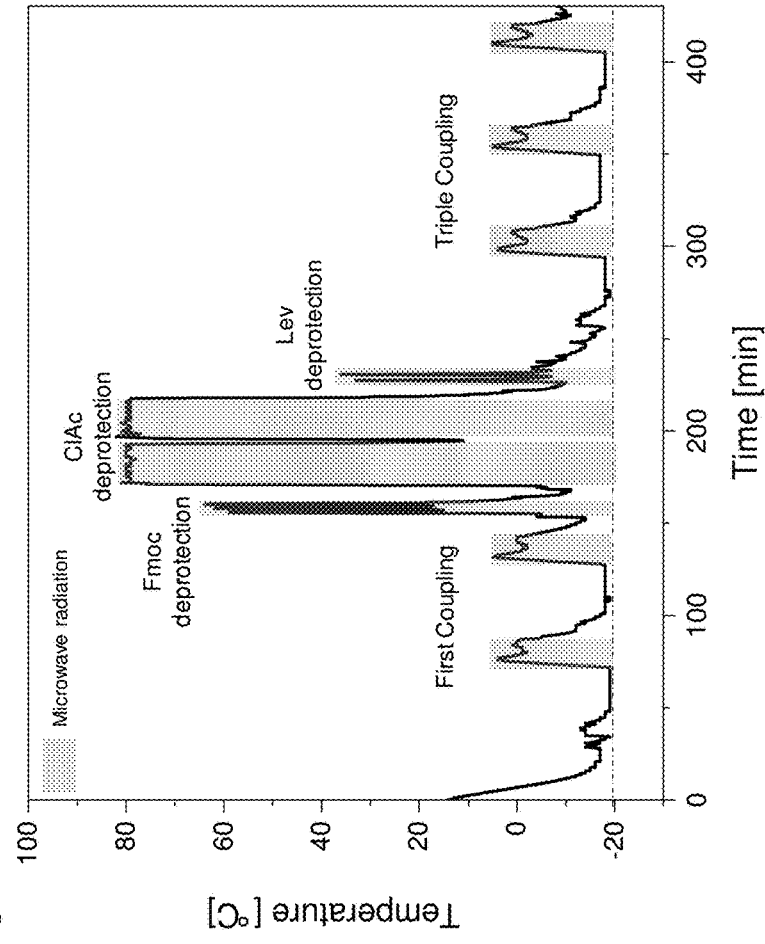
FIG. 14A shows temperature charts of the first cycle during the synthesis of protected 5-(benzyl(benzyloxycarbonyl)amino)-pentyl 3-(α-D-mannopyranosyl)-4-(α-D-mannopyranosyl)-6-(α-D-mannopyranosyl)-α-D-mannopyranoside (Example 10). The solid line follows the temperature inside the reaction. The dash line shows the temperature at the cooling jacket side. The grey areas highlight the microwave irradiation periods allowing the adjustment of the temperature inside the reaction vessel (400). The coupling and deprotection periods are indicated.
Figure 15B:
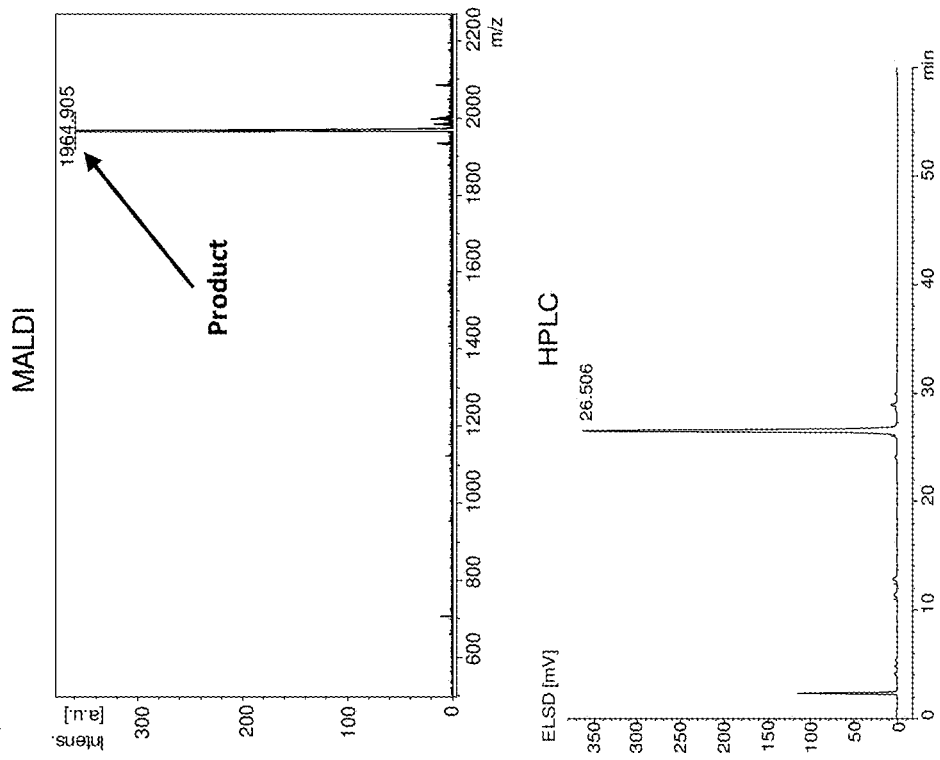
FIG. 15B shows analytical results by MALDI (the mass of the product is mark plus sodium ion) and HPLC of experiments from synthesis Example 12.
Figure 15A:
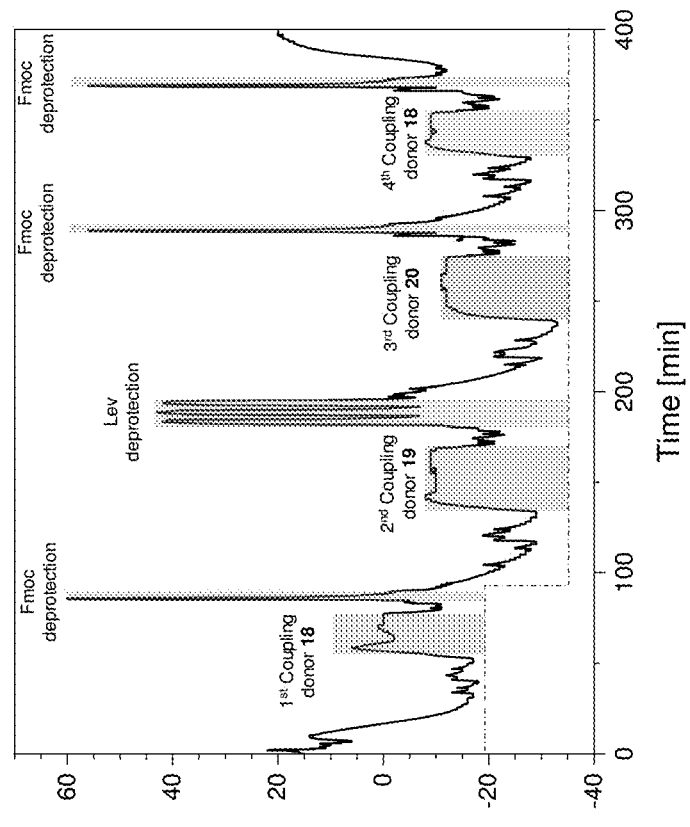
FIG. 15A shows temperature chart during the synthesis of protected Lewis antigen tetramer (Example 12). The solid line follows the temperature inside the reaction. The dash line shows the temperature at the cooling jacket side. The grey areas highlight the microwave irradiation periods allowing the adjustment of the temperature inside the reaction vessel (400). The coupling and deprotection steps are indicated. The reaction was completed in 6 h and 30 min

FIG. 8B shows the analytical results of the experiments described in FIG. 8A.

Mass spectrometry (MALDI) and HPLC chromatogram are provided. The experiment performed under simultaneous microwave heating and active cooling during the coupling and post-coupling steps show as result: mainly the desired product was obtained.

In one embodiment of the inventive synthesizer having a microwave generator (500), the synthesizer further comprises a thermal controller (900) for controlling the temperature inside the reaction vessel (400). Thus, the present invention is also directed to a synthesizer (100) for microwave-assisted automated multistep synthesis on a solid support comprising:

(a) a microwave transparent reaction vessel (400) equipped with a temperature sensor,
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840),
(e) a cooling device (350) for cooling the microwave transparent reaction vessel (400),
(g) a microwave generator (500),
(h) a thermal controller (900) for controlling the temperature inside the microwave transparent reaction vessel (400), the controller being connected to the cooling device, the temperature sensor and the microwave generator (500), the controller being configured to control the temperature by adjusting the power output of the microwave generator (500) and by setting a fixed cooling temperature of the cooling device,
wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

Preferably, the means for preventing flow of reagents into the manifold line is a check valve as disclosed herein.

In a preferred embodiment, the present invention is also directed to a synthesizer (100) for microwave-assisted automated multistep synthesis on a solid support comprising:

(a) a microwave transparent reaction vessel (400) equipped with a temperature sensor,
(b) a reagent storing component (660) comprising one or more reagent containers (630, 631, 632 . . . ),
(c) a reagent delivery system (600) configured to establish a fluid communication between each of the one or more reagent containers (630, 631, 632 . . . ) and the reaction vessel (400), wherein at least two fluid communications are separate of each other,
(d) an inert gas delivery system (800) comprising a gas container (801) and a gas valve manifold (802), wherein the gas valve manifold (802) comprises a manifold line (840) and at least three output lines (852) connected to the manifold line (840),
(e1) a cooling device (350) for cooling the microwave transparent reaction vessel (400),
(e2) a pre-cooling device (300) for pre-cooling the reagents and washing solutions to be supplied,
(g) a microwave generator (500),
(h) a thermal controller (900) for controlling the temperature inside the microwave transparent reaction vessel (400), the controller being connected to the cooling device, the temperature sensor and the microwave generator (500), the controller being configured to control the temperature by adjusting the power output of the microwave generator (500) and by setting a fixed cooling temperature of the cooling device,
wherein the gas container (801) is in fluid communication with the manifold line (840), the one or more reagent containers (630, 631, 632 . . . ) and the reaction vessel (400) are in separate fluid communications with the output lines (852) of the gas valve manifold (802), and wherein the at least three output lines (852) are equipped with a means for preventing flow of reagents into the manifold line.

Preferably, the means for preventing flow of reagents into the manifold line is a check valve. Preferably, each output line of the gas valve manifold comprises a check valve, a pressure regulator valve for regulating the pressure of each output line individually, and a pressure sensor. Preferably, the gas valve manifold is constructed of three layers: (i) a first layer (861) holding the manifold line (840); (ii) a second layer (862) comprising the at least three output lines (852), wherein the at least three output lines (852) are connected to the manifold line (840); and (iii) a third layer (863) comprising the means for preventing flow of reagents into the manifold line.

A typical coupling cycle in a glycan synthesis comprises a glycosylation step and several protecting group manipulations ("auxiliary steps") including a capping reaction in order to terminate unreacted saccharides, deprotection of a temporary protecting group and washing of the solid support. These steps of each coupling cycle are conducted in three different three temperature regimes or stages (as described above).

The first stage relates to the pre-coupling regime in the temperature range $T_1$ of preferably $-40°$ C. to $-10°$ C. In this pre-coupling regime a further saccharide bearing at least one protecting group and a glycosylation reagent are allowed to impregnate the solid support (e.g. a resin) and to diffuse through the porous solid. The low temperature in the range of preferably $-40°$ C. to $-10°$ C. prevents the early decomposition of the intermediate before the actual coupling reaction.

The second stage relates to the coupling regime at a temperature $T_2$ around $0°$ C., i.e. $-10°$ C. and $+5°$ C. The increase in the temperature to preferably around $0°$ C. allows the initiation of the coupling reaction by promoting the formation of the intermediates. Thus, during the coupling regime, the glycosylation reaction takes place.

The third stage relates to the post-coupling regime at a temperature $T_3$ around $25°$ C. (room temperature or standard temperature) or above, up to $65°$ C. The high reaction temperature $T_3$ is achieved by microwave irradiation. Thus, the capping and deprotection reactions take place under microwave irradiation and at higher temperatures than the coupling reaction. These reactions complete the coupling cycle. Then, the next coupling cycle or termination of the process may take place.

Figure 6:
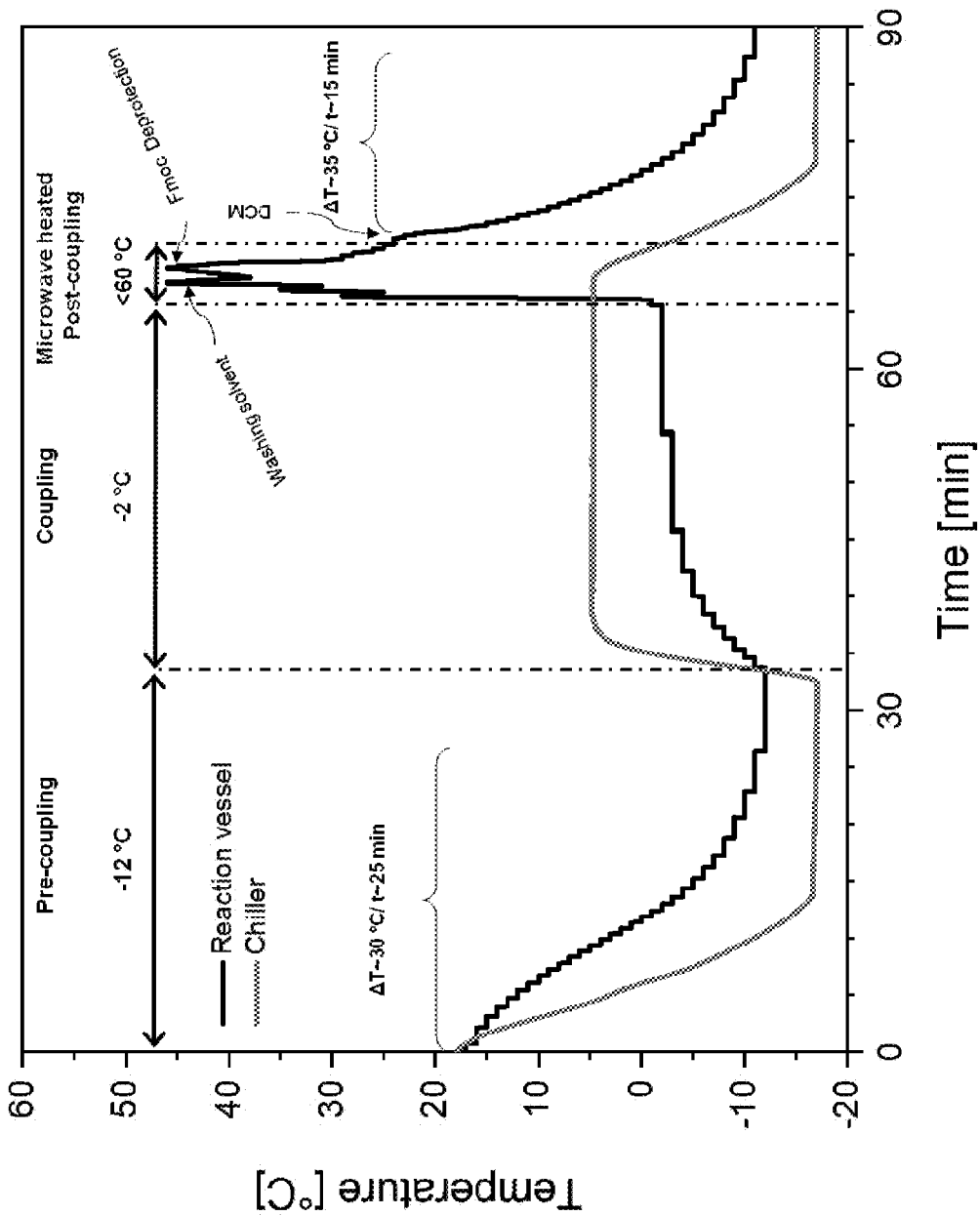
FIG. 6 shows the thermal profile during a blank experiment. The reaction vessel (400) is made of PFA. The solid black line shows the temperature inside the reaction vessel (400); the solid gray line is the temperature at the wall of the jacket adjusted by the active cooling device. At the beginning, 3 mL of DCM were delivered in the reactor vessel. The temperature is adjusted by the active cooling device from room temperature to −12° C. The increased to −2° C. by the active cooling device. The reaction vessel (400) was discharged and the temperature of the jacket was adjusted again to cool down to −12° C.; while Fmoc deprotection module is performed using microwave heating against the cooling effect of the cooling device. The microwave radiation was set with a maximum power of 50 W and regulated to maintain a temperature around 45° C. or at least below 60° C.

As can be seen in FIG. 6, the temperature must be adjusted between each coupling cycle from high temperature $T_3$ to the lowest temperature $T_1$, which requires usually more than 20 minutes (see left part of FIG. 6). By using a thermal controller (900), which is connected to the cooling device, the temperature sensor and the microwave generator (500), the reaction temperature can be adjusted more rapidly, so that less time is required between each coupling cycle (see right part of FIG. 6), thereby allowing a more rapid automated multistep synthesis.

Particularly, the thermal controller (900) is connected to the temperature sensor in the microwave transparent reaction vessel (400) and the microwave generator (500) thereby allowing the reaction mixture to reach the reaction temperature of $T_3$ in the post-coupling regime. The thermal controller (900) adjusts the power output of the microwave generator (500) based on the measured temperature inside the reaction vessel in order to maintain the temperature $T_3$. Also, the thermal controller (900) is connected to the temperature sensor in the microwave transparent reaction vessel and the microwave generator (500) thereby allowing the reaction mixture to warm up more rapidly from a reaction temperature of $T_1$ to $T_2$ during the coupling regime.

The thermal controller (900) is also connected to the cooling device thereby allowing setting a fixed cooling temperature $T_1$ during pre-coupling regime and/or $T_2$ during the coupling and post-coupling regime. The microwave generator (500) is usually turned off by the thermal controller (900) during pre-coupling and coupling regime and only turned on during the post-coupling regime. However, in one embodiment the microwave generator (500) is already turned on by the thermal controller (900) during coupling regime in order to speed up the warming from $T_1$ to $T_2$.

Thus, the thermal controller (900) connected to a cooling device and a microwave generator (500) allows the use of the microwave generator (500) as a heater, so that no additional heater is required for performing the auxiliary steps at elevated temperatures. Therefore, due to the thermal controller (900) a simpler and more compact setup of the synthesizer is achieved as no additional cooler or heater are necessary for performing the multi-step reactions at different temperature regimes as set forth above.

Furthermore, technical means such as valves, valve assemblies, vents and manifolds and similar technical means may be electronically coupled to a computing device (200) comprising at least one processor and a computer-readable storage medium comprising computer readable instructions thereon that may be executed by the processor, therefore the technical means may be under control of such a computing device (200). The processor may be configured to control the temperature setting of the pre-cooling device (300), may be configured to control the temperature setting of the cooling device, may be configured to set the time and power output of the microwave generator (500), may be configured to control the amount and speed of delivering fluid from the reagent delivery component. The synthesizer preferably comprises one or more or a plurality of technical means electronically coupled to the computing device (200) comprising at least one processor to allow the processor to control the one or more or plurality of technical means based on computer readable instructions stored on a computer readable medium which may be executed by the processor to enable the automation of the method for synthesizing oligo-, polysaccharides or peptides with the inventive synthesizer. The one or more technical means or plurality of technical means may be wired or wirelessly connected to the computing device (200). The one or more technical means or plurality of technical means may comprise one or more valves, valve assemblies, one or more vents and similar technical means of the one or more components and systems of the synthesizer of the present invention. Thus, the delivery of the liquids, solutions and/or gases and also the discharging of liquids and solutions may be under control of the computing device (200) comprising the at least one processor and a computer-readable storage medium comprising computer readable instructions thereon. The computing device (200) comprising the at least one processor and a computer-readable storage medium comprising computer readable instructions thereon may be configured to control said technical means in order to deliver liquids, solutions and/or gases to the reaction vessel (400) and further to discharge liquids and solutions from the reaction vessel in a controlled and automated manner to allow automation of the synthesis on a solid support with the synthesizer of the present invention.

LIST OF REFERENCE SIGNS 100 synthesizer
200 computing device, processor
300 pre-cooling device
350 cooling device for reaction vessel
400 reaction vessel
450 temperature sensor
500 microwave generator component
600 reagent delivery system, top delivery system
630-632 reagent containers
660, 760 reagent storing component
700 reagent delivery system, bottom delivery system
704 waste container
800 inert gas delivery system
801 gas container
802 manifold
803-809, 848 pressure (regulator) valves
810 flow control valve
820, 820a-820h tubing connectors
823-829 pressure sensors
833-839 check valves
840 manifold line
841a-841n mounting feet
842a-f, 843 substrate channels
844a-844o substrates (elements)
845a-845g end substrate connectors
846a-846g substrate-to-manifold connectors
847a-847n lockdown bars
849a-849g pressure indicators
850a-850g two-port check valves
851 two ports metering valve with knurled handle
852 manifold output lines
861 first (mounting) layer
862 second (substrate) layer
863 third (side) layer
900 thermal controller

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

Example 1: Investigation of Microwave-Assisted Capping and Deprotection Steps

The improvement in conditions and reaction time for the capping and deprotection steps with microwave radiation was investigated.

During a typical AGA cycle there is the glycosylation coupling step as well as several auxiliary steps (acetyl capping and temporary group deprotection). These auxiliary steps increase the overall yield of the final oligo- or polysaccharide (glycan) by terminating unglycosylated nucleophiles as well as they remove temporary protecting groups that allows the next coupling to occur. These auxiliary steps have been a bottleneck in the overall time required for one AGA cycle. The investigation of the overall time required for one AGA cycle by using microwave radiation during these auxiliary steps has shown that microwave assisted deprotection and capping steps drastically reduce the reaction time. The results shown in Table 1 demonstrate that the utilization of a microwave generator (500) is not only instrumental for hastening the cooling to heating process, microwave-assisted synthesis also drastically reduces chemical reaction time. Under these rapid microwave-assisted conditions, the steps remained orthogonal and few side reactions were observed. With shortened reaction times for these auxiliary steps the overall duration of a standard AGA cycle was successfully reduced from 100 minutes to below 60 minutes and even to 45 minutes.

TABLE 1

| Module | Without Microwave | | With Microwave Radiation | |
| --- | --- | --- | --- | --- |
| | Conditions | Time | Conditions | Time |
| Capping | 2% MsOH in CH$_2$Cl$_2$/Ac$_2$O (5:1), 25° C. | 25 min | 2% MsOH in CH$_2$Cl$_2$/Ac$_2$O (5:1), 25° C. | 5 min |
| Deprotection: Lev | 7% N$_2$H$_4$•HOAc in CH$_2$Cl$_2$/Pyr/HOAc/H$_2$O (20:16:4:1), 25° C. | 90 min | 7% N$_2$H$_4$•HOAc in CH$_2$Cl$_2$/Pyr/HOAc/H$_2$O (20:16:4:1), 35° C. | 9 min |
| Deprotection: NAP | 2% DDQ in DCE/MeOH/H$_2$O (64:16:1), 40° C. | 240 min | 2% DDQ in DCE/MeOH (4:1), 45° C. | 60 min |

TABLE 1-continued

| | Without Microwave | | With Microwave Radiation | |
|---|---|---|---|---|
| Module | Conditions | Time | Conditions | Time |
| Deprotection: Fmoc | 20% Piperidine in DMF, 25° C. | 5 min | 20% Piperidine in DMF, 60° C. | 1 min |
| Deprotection: ClAc | Thiourea in EGME, 80° C. | 360 min | Thiourea in EGME, 80° C. | 45 min |

Example 2: Investigation of Temperature Fluctuations of the Reaction Mixture by Addition of Pre-Cooled Building Block and Activator Solutions The temperature development inside of the reaction vessel (400) during a synthesis cycle in the presence and absence of pre-cooling device was investigated. FIG. 6 shows the results charts comparing temperature readings inside the reaction vessel, taken during a synthesis cycle, in the presence and absence of a pre-cooling device.

The three thermal stages are shown. Temperature spikes appear when a liquid is dispensed in the reaction vessel (400). The dashed curve shows the temperature profile for the device without pre-cooling of the reagents. The thermal spikes are remarkable at the pre-coupling regime (subzero temperatures). The solid line depicts the temperature profile with active pre-cooling. The incoming solution of reagents is pre-cooled and this suppresses the temperature spikes. Since there are three thermal stages during a glycosylation cycle: (1) The pre-coupling regime (−40° C. to −10° C.). The building block and activator are allowed to impregnate the resin and for diffusion through the porous solid. The low temperature prevents the early decomposition of the intermediate before the actual coupling; (2) the coupling regime (around 0° C.). The increase in the temperature allows for initiating the coupling reaction by promoting the formation of the intermediates; and (3) the post-coupling regime (room temperate or above). The capping and deprotection reactions take place at higher temperature. These reactions close out the glycosylation cycle. Then, the next coupling or process termination takes place.

Example 3: Synthesis of Mannose Tetramer Via Phosphate Donor with Auxiliary Reactions (Post-Coupling) Accelerated by Microwave Heating Scheme 1: Automated synthesis of tetramannose.

Building Block:

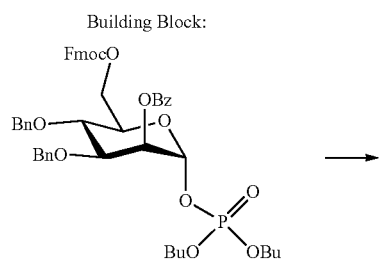

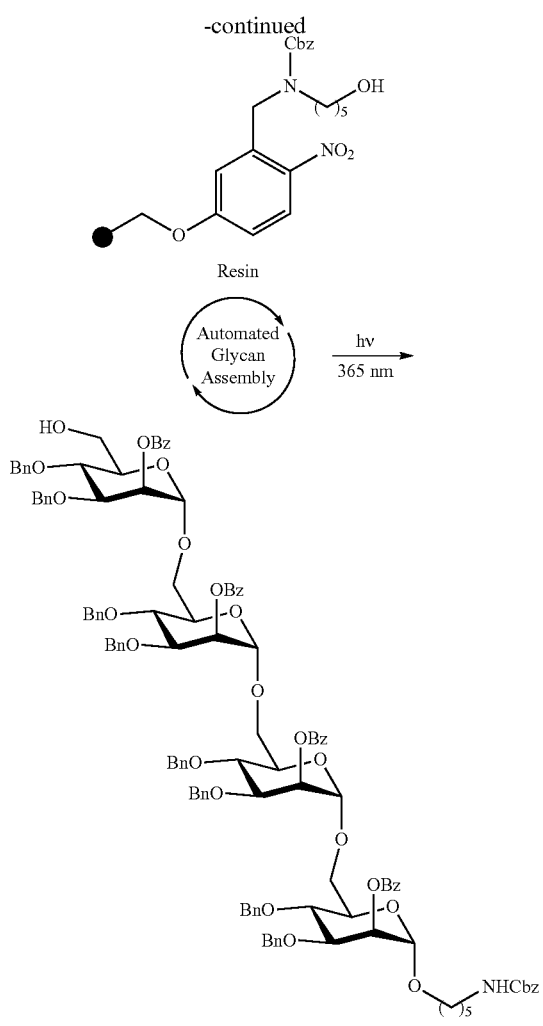

Automated Synthesis Working Modules

The timing and quantity of solvents/reagents transferred to the reaction vessel (400) in each step is controlled by the software. The reagent delivery system (600) is based on valve-pressured control in which the entire platform is constantly pressurized so that the specific solvent/reagent is transferred from the respective storage components by timing the opening and closing of the appropriate valves.

Module 1: Acidic Washing: The resin loaded into the reaction vessel (400) is washed with DMF, THF, DCM (six times each with 3 mL for 15 s). The resin is swollen in 2 mL DCM, and the temperature of the reaction vessel was adjusted in the range of −22° C. to −20° C. by cooling device (when it is programmed to do so). For acidic washing 1 mL of the solution of 2% TMSOTf in DCM is delivered to the reaction vessel via the pre-cooling device (300) which cools the solution to a temperature of −15° C. (when it is programmed to do so). After three minutes, the solution is drained. Finally, 3 mL DCM is added to the reaction vessel.

Module 2: Glycosylation: Phosphate building block is dissolved in the proper solvent mixture e.g. DCM (5 mL for one initial double cycle for the first coupling and three more single glycosylation cycles to build up the tetramer) in the designated building block storing component. The reaction vessel (400) is set to reach the initial glycosylation temperature. During the adjustment of the temperature in the reactor vessel (when it is programmed to do so), the DCM in the reaction vessel is drained and 1 mL of phosphate building block (5.0 eq. in 1.0 mL DCM) is delivered from the building block storing component to the reaction vessel via the pre-cooling device (300) which cools the solution of phosphate building block (when it is programmed to do so) to a temperature of −18° C. After the set temperature in the range of −22° C. to −20° C. is reached the resin is incubated in the solution of phosphate building block for 10 min. Then 1.0 mL of the solution of 2% TMSOTf in DCM is delivered to the reaction vessel from the respective activator storing component via the pre-cooling device (300) which cools the activator solution down to a temperature of −18° C. (when it is programmed to do so). The glycosylation mixture is incubated for 30 min in the temperature range of −22° C. to −20° C., linearly ramped to 0° C. (when it is programmed to do so), and after reaching 0° C. the reaction mixture is incubated for an additional 10 min. Once incubation time is finished, the reaction mixture is drained and the resin is washed with DCE (once, 2 mL for 5 s).

Module 3: Capping: While the temperature of the active cooling element is adjusted to range of −22° C. to −20° C. preparing for the next coupling cycle. The temperature of the reactor vessel is adjusted between 7° and 20° C. by microwave irradiation of the washing solvents and reagents adjusting the irradiation power. The resin is washed twice with DMF (3 mL for 15 s). 2 mL of Pyridine solution (10% in volume in DMF) was delivered and the resin is incubated for one minute. Up to this point the microwave irradiation power is adjust at 50 W. The microwave irradiation power is then adjusted 150-180 W to proceed with the resin is washed three times with DCM (2 mL for 15). The capping of the unreacted acceptor groups is done by delivering 4 mL of methanesulfonic acid (2% in volume) and acetic anhydride (10% in volume) in DCM. The resin and the reagents are incubated for one minute; then 1 mL of DCM in added to dilute the solution and the incubation continues for another one minute. The solution is drained from the reactor vessel and the resin is washed 3 time with DCM (2 mL for 15 s).

Module 3: Fmoc Deprotection: The temperature of the reactor vessel is adjusted between 7° and 20° C. by microwave irradiation of the washing solvents and reagents adjusting the irradiation power (40 W). The resin is washed with DMF (three times with 3 mL for 15 s), swollen in 2 mL DMF and the temperature of the reaction vessel (400) is adjusted between 70-20° C. For Fmoc deprotection the DMF is drained and 2 mL of a solution of 20% piperidine in DMF was delivered to the reaction vessel. After 1 min the reaction solution is drained from the reaction vessel. Then, the resin is washed with DMF (three times with 3 mL for 15 s) and DCM (five times with 3 mL). After this module the resin is ready for the next glycosylation cycle.

Resin functionalized with a photo-cleavable linker (64 mg; loading 0.392 mmol/g; 25.1 µmol) was loaded into the reaction vessel of the synthesizer (100) and swollen in 2 mL DCM. The sequence of reaction steps for the formation of tetramannose was as follows:

1. Module 1 was performed with 1 mL TMSOTf solution at the temperature range of −22° C. to −20° C. (when it is programed to do so) for 3 min.
2. Module 2 was performed with 5 equiv Building Block and 2% TMSOTf in DCM solution.
3. Module 3 was carried out in two steps; first 2 mL of Pyridine solution (10% in volume in DMF); then in a second step with 4 mL of methanesulfonic acid (2% in volume) and acetic anhydride (10% in volume) in DCM.
4. Module 4 was carried out with 20% piperidine in DMF.
5. After Module 1 took place the Module 2 repeated twice (for the first coupling). The Modules 3 and 4 were then performed.
6. Subsequently, modules 1-4 were repeated three times in the same manner as described in steps 1-4 in order to obtain a tetramer.

After buildup of the tetramer on the resin the oligosaccharide was cleaved from solid support in a photoreactor: A mercury lamp is turned on 30 min prior to the first cleavage event. The fluorinated-ethylene-propylene (FEP) tubing was washed with 20 mL DCM at a flow rate of 5 mL/min before cleavage. The solid support was pre-swelled in the dark in DCM for 30 min at least before being taken up with a 20 mL disposable syringe. The suspension of solid support in DCM was slowly injected from the disposable syringe (20 mL) into the FEP tubing using a syringe pump. The suspension was pushed through the FEP tubing into the photoreactor with additional 18 mL DCM (flow rate: 700 µL/min). The photocleavage took place inside the reactor while solid support travelled toward the exit point of the reactor. The suspension leaving the reactor was directed into a syringe equipped with polyethylene filter frit where the resin was filtered off and the solution containing the cleaved oligosaccharide is collected in a separate glass vial. The tubing as washed with 20 mL DCM (flow rate: 2 mL/min) until any remaining resin exited the reactor and the remaining oligosaccharide solution is collected. The tubing was re-equilibrated with 20 mL DCM using a flow rate of 5 mL/min and the entire cleavage procedure was repeated. The combined solution that was collected in the photocleavage process was evaporated in vacuo and the crude material was analyzed by MALDI-TOF, and HPLC.

Example 4: Synthesis of Mannose Tetramer Via Phosphate Donor with Temperature Regulation Via Microwave Heating Building Block:

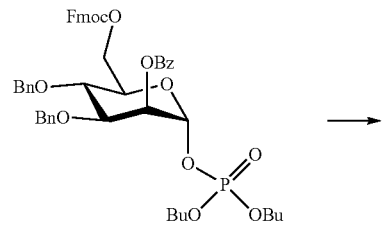

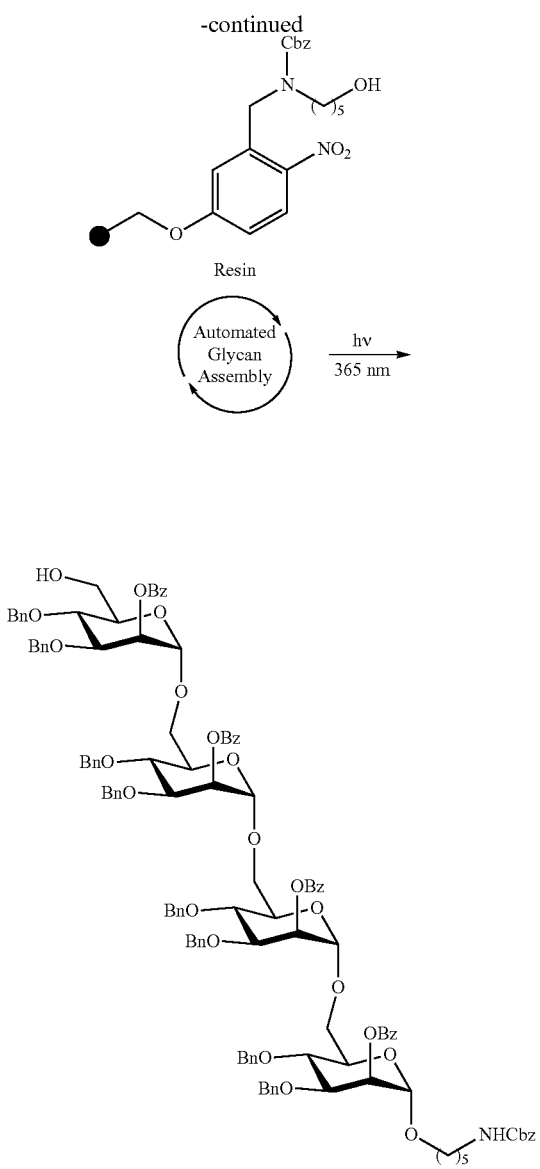

Automated Synthesis Working Modules

The timing and quantity of solvents/reagents transferred to the reaction vessel (400) in each step is controlled by the software. The reagent delivery system (600) is based on valve-pressured control in which the entire platform is constantly pressurized so that the specific solvent/reagent is transferred from the respective storage components by timing the opening and closing of the appropriate valves.

Module 1: Acidic Washing: The resin loaded into the reaction vessel is washed with DMF, THF, DCM (six times each with 3 mL for 15 s). The resin is swollen in 2 mL DCM, and the temperature of the reaction vessel was adjusted in the range of −22° C. to −20° C. by cooling device (when it is programmed to do so). For acidic washing 1 mL of the solution of 2% TMSOTf in DCM is delivered to the reaction vessel via the pre-cooling device (300) which cools the solution to a temperature of −20° C. (when it is programmed to do so). After three minutes, the solution is drained. Finally, 3 mL DCM is added to the reaction vessel (400).

Module 2: Glycosylation: Phosphate building block is dissolved in the proper solvent mixture e.g. DCM (5 mL for one initial double cycle for the first coupling and three more single glycosylation cycles to build up the tetramer) in the designated building block storing component. The reaction vessel is set to reach the initial glycosylation temperature. During the adjustment of the temperature in the reactor vessel (when it is programmed to do so), the DCM in the reaction vessel is drained and 1 mL of phosphate building block (5.0 eq. in 1.0 mL DCM) is delivered from the building block storing component to the reaction vessel via the pre-cooling device (300) which cools the solution of phosphate building block (when it is programmed to do so) to a temperature of −18° C. After the set temperature in the range of −22° C. to −20° C. is reached the resin is incubated in the solution of phosphate building block for 10 min. Then 1.0 mL of the solution of 2% TMSOTf in DCM is delivered to the reaction vessel (400) from the respective activator storing component via the pre-cooling device (300) which cools the activator solution down to a temperature of −18° C. (when it is programmed to do so). The glycosylation mixture is incubated for 10 min in the temperature range of −22° C. to −20° C. Keeping constant the active cooling action by microwave transparent coolant flowing in the jacket the linearly ramped to 0° C. (when it is programmed to do so) by the microwave radiation, adjusting the maximum radiation power to 180 W, and after reaching 0° C. the reaction mixture is incubated for an additional 10 min. Once incubation time is finished, the reaction mixture is drained and the resin is washed with DCE (once, 2 mL for 5 s).

Module 3: Capping: While the temperature of the active cooling element is kept in the range of −22° C. to −20° C. preparing for the next coupling cycle. The temperature of the reactor vessel is adjusted between 7° and 20° C. by microwave irradiation of the washing solvents and reagents adjusting the irradiation power. The resin is washed twice with DMF (3 mL for 15 s). 2 mL of Pyridine solution (10% in volume in DMF) was delivered and the resin is incubated for one minute. Up to this point the microwave irradiation power is adjust at 50 W. The microwave irradiation power is then adjusted 150-180 W to proceed with the resin is washed three times with DCM (2 mL for 15). The capping of the unreacted acceptor groups is done by delivering 4 mL of methanesulfonic acid (2% in volume) and acetic anhydride (10% in volume) in DCM. The resin and the reagents are incubated for 1 min; then 1 mL of DCM in added to dilute the solution and the incubation continues for another 1 min. The solution is drained from the reactor vessel and the resin is washed 3 times with DCM (2 mL for 15 s).

Module 3: Fmoc Deprotection: The temperature of the reactor vessel is adjusted between 7° and 20° C. by microwave irradiation of the washing solvents and reagents adjusting the irradiation power (40 W). The resin is washed with DMF (three times with 3 mL for 15 s), swollen in 2 mL DMF and the temperature of the reaction vessel (400) is adjusted between 70-20° C. For Fmoc deprotection the DMF is drained and 2 mL of a solution of 20% piperidine in DMF was delivered to the reaction vessel. After 1 min the reaction solution is drained from the reactor vessel. Then, the resin is washed with DMF (three times with 3 mL for 15 s) and DCM (five times with 3 mL). After this module the resin is ready for the next glycosylation cycle.

Resin functionalized with a photo-cleavable linker (64 mg; loading 0.392 mmol/g; 25.1 μmol) was loaded into the reaction vessel (400) of the synthesizer (100) and swollen in 2 mL DCM. The sequence of reaction steps for the formation of tetramannose was as follows:

1. Module 1 was performed with 1 mL TMSOTf solution at the temperature range of −22° C. to −20° C. (when it is programed to do so) for 3 min.
2. Module 2 was performed with 5 equiv Building Block and 2% TMSOTf in DCM solution.
3. Module 3 was carried out in two steps; first 2 mL of Pyridine solution (10% in volume in DMF); then in a second step with 4 mL of Methanesulfonic acid (2% in volume) and Acetic anhydride (10% in volume) in DCM.
4. Module 4 was carried out with 20% Piperidine in DMF.
5. After Module 1 took place the Module 2 repeated twice (for the first coupling). The Modules 3 and 4 were then performed.
6. Subsequently, modules 1-4 were repeated three times in the same manner as described in steps 1-4 in order to obtain a tetramer.

After buildup of the tetramer on the resin the oligosaccharide was cleaved from solid support in a photoreactor: A mercury lamp is turned on 30 min prior to the first cleavage event. The fluorinated-ethylene-propylene (FEP) tubing was washed with 20 mL DCM at a flow rate of 5 mL/min before cleavage. The solid support was pre-swelled in the dark in DCM for 30 min at least before being taken up with a 20 mL disposable syringe. The suspension of solid support in DCM was slowly injected from the disposable syringe (20 mL) into the FEP tubing using a syringe pump. The suspension was pushed through the FEP tubing into the photoreactor with additional 18 mL DCM (flow rate: 700 μL/min). The photocleavage took place inside the reactor while solid support travelled toward the exit point of the reactor. The suspension leaving the reactor was directed into a syringe equipped with polyethylene filter frit where the resin was filtered off and the solution containing the cleaved oligosaccharide is collected in a separate glass vial. The tubing was washed with 20 mL DCM (flow rate: 2 mL/min) until any remaining resin exited the reactor and the remaining oligosaccharide solution is collected. The tubing was re-equilibrated with 20 mL DCM using a flow rate of 5 mL/min and the entire cleavage procedure was repeated. The combined solution that was collected in the photocleavage process was evaporated in vacuo and the crude material was analyzed by MALDI-TOF, and HPLC.

Example 5: Fast Synthesis of Mannose Tetramer Via Phosphate Donor with Temperature Regulation Via Microwave Heating The automated synthesis of tetramannose as shown in Scheme 1 was conducted by combining constant cooling with microwave radiation to adjust and control the temperature of the reagents during the glycosylation cycle.

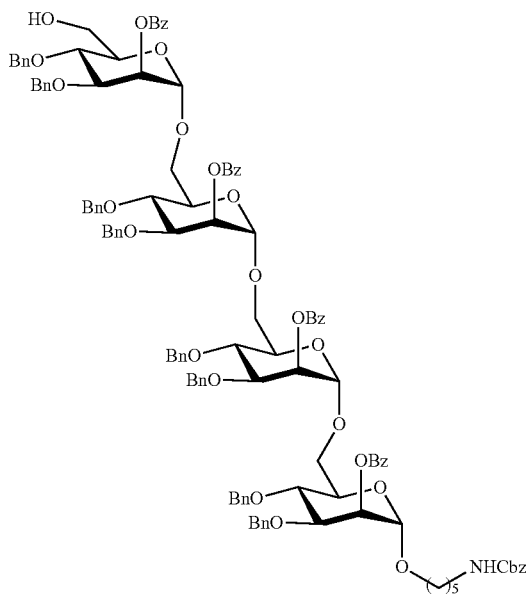

Automated Synthesis Working Modules

The timing and quantity of solvents/reagents transferred to the reaction vessel (400) in each step is controlled by software. The reagent delivery system (600) utilizes pressure control valves, which constantly pressurize the entire platform, so that the specific solvent/reagent is transferred from the respective storage components by timing the opening and closing of the appropriate valves. All the solvents are pre-cooled before they are delivered inside the reaction vessel (400).

Module 1: Acidic Washing: The resin loaded into the reaction vessel (400) is washed with DMF, THF, DCM (six times each with 3 mL for 15 s). The resin is swollen in 2 mL DCM, and the temperature of the reaction vessel was adjusted in the range of −22° C. to −20° C. by cooling device (when it is programmed to do so). For acidic washing, 1 mL of the solution of 2% TMSOTf in DCM is delivered to the reaction vessel via the pre-cooling device (300) which cools the solution to a temperature of −20° C. (when it is programmed to do so). After three minutes, the solution is drained. Finally, 3 mL DCM is added to the reaction vessel.

Module 2: Glycosylation: Phosphate building block is dissolved in the proper solvent mixture e.g. DCM (5 mL for one initial double cycle for the first coupling and three more single glycosylation cycles to build up the tetramer) in the designated building block storing component. The reaction vessel (400) is set to reach the initial glycosylation temperature. During the adjustment of the temperature in the reactor vessel (when it is programmed to do so), the DCM in the reaction vessel is drained and 1 mL of phosphate building block (5.0 eq. in 1.0 mL DCM) is delivered from the building block storing component to the reaction vessel via the pre-cooling device (300) which cools the solution of phosphate building block (when it is programmed to do so) to a temperature of −18° C. Then 1.0 mL of the solution of 2% TMSOTf in DCM is delivered to the reaction vessel from the respective activator storing component via the pre-cooling device (300) which cools the activator solution down to a temperature of −18° C. (when it is programmed to do so). The glycosylation mixture is incubated for 2 min in the temperature range of −22° C. to −20° C. Keeping constant the active cooling action by microwave transparent coolant flowing in the jacket the linearly ramped to 0° C. in 5 min (when it is programmed to do so) by the microwave radiation, adjusting the maximum radiation power to 180 W, and after reaching 0° C. the reaction mixture is incubated for an additional 3 min. Once incubation time is finished, the reaction mixture is drained and the resin is washed with DCE (once, 2 mL for 5 s).

Module 3: Capping: While the temperature of the active cooling element is kept in the range of −22° C. to −20° C. preparing for the next coupling cycle. The temperature of the reactor vessel is kept between 70° C. and 20° C. by microwave irradiation of the washing solution and reagents, adjusting the irradiation power. The resin is washed twice with DMF (3 mL for 15 s). 2 mL of pyridine solution (10% in volume in DMF) were delivered and the microwave irradiation power is then adjusted to 40-50 W. The resin is incubated for one minute between 70° C. and 20° C. The resin is washed three times with DCM (2 mL for 15). The microwave irradiation power is then set to 150-180 W to proceed the capping of the unreacted acceptor groups. The capping is done by delivering 4 mL of methanesulfonic acid (2% in volume) and acetic anhydride (10% in volume) in DCM. The resin and the reagents are incubated for 1 min. The temperature of the reactor vessel is adjusted between 70° C. and 20° C. by microwave irradiation; then 1 mL of DCM in added to dilute the solution and the incubation continues for another 1 min. The solution is drained from the reactor vessel and the resin is washed 3 times with DCM (2 mL for 15 s).

Module 4: Fmoc Deprotection: The resin is washed with DMF (three times with 3 mL for 15 s), swollen in 2 mL DMF. For Fmoc deprotection, 2 mL of a solution of 20% piperidine in DMF were delivered to the reaction vessel (400). The temperature of the reagents inside the reactor vessel is adjusted between 70° C. and 20° C. by microwave irradiation (40 W). After 1 min, the reaction solution is drained from the reactor vessel. Then, the resin is washed with DMF (three times with 3 mL for 15 s) and DCM (five times with 3 mL). After this module, the resin is ready for the next glycosylation cycle.

The resin functionalized with a photo-cleavable linker (45 mg; loading 0.30 mmol/g) (see Scheme 1) was loaded into the reaction vessel (400) of the synthesizer (100) and swollen in 2 mL DCM.

The sequence of reaction steps for the formation of tetramannose 9 was as follows:
1. Module 1 was performed with 1 mL TMSOTf solution at the temperature range of −22° C. to −20° C. (when it is programmed to do so) for 3 min.
2. Module 2 was performed with 5 equiv Building Block and 2% TMSOTf in DCM solution.
3. Module 3 was carried out in two steps; first 2 mL of pyridine solution (10% in volume in DMF); then in a second step with 4 mL of methanesulfonic acid (2% in volume) and acetic anhydride (10% in volume) in DCM.
4. Module 4 was carried out with 20% piperidine in DMF.
6. Subsequently, modules 1-4 were repeated four times in order to obtain a tetramer.

After buildup of the tetramer on the resin, the oligosaccharide was cleaved from solid support in a photoreactor: A mercury lamp is turned on 30 min prior to the first cleavage event. The fluorinated-ethylene-propylene (FEP) tubing was washed with 20 mL DCM at a flow rate of 5 mL/min before cleavage. The solid support was pre-swollen in the dark in DCM for 30 min at least before being taken up with a 20 mL disposable syringe. The suspension of solid support in DCM was slowly injected from the disposable syringe (20 mL) into the FEP tubing using a syringe pump. The suspension was pushed through the FEP tubing into the photoreactor with additional 18 mL DCM (flow rate: 700 μL/min). The photocleavage took place inside the reactor while solid support travelled toward the exit point of the reactor. The suspension leaving the reactor was directed into a syringe equipped with polyethylene filter frit where the resin was filtered off and the solution containing the cleaved oligosaccharide is collected in a separate glass vial. The tubing was washed with 20 mL DCM (flow rate: 2 mL/min) until any remaining resin exited the reactor and the remaining oligosaccharide solution is collected. The tubing was re-equilibrated with 20 mL DCM using a flow rate of 5 mL/min and the entire cleavage procedure was repeated. The combined solution that was collected in the photocleavage process was evaporated in vacuo and the crude material was analyzed by MALDI-TOF, and HPLC.

After weighing, the recovered crude was 27 mg, which correspond to a 65% yield. This experiment demonstrates that high yields were obtained by combining constant cooling with microwave radiation even with short coupling times of 30 minutes.

Example 6: Synthesis of 5-Amino-pentyl α-(1→2)-D-tetramannopyranoside Via Phosphate Glycosylation and Selective Deprotection of NAP Temporal Protecting Group in the Presence of Fmoc-, Lev-, ClAc-Temporal Protecting Groups Scheme 2: Automated synthesis of protected 5-Amino-pentyl α-(1→2)-D-tetramannopyranoside (11).

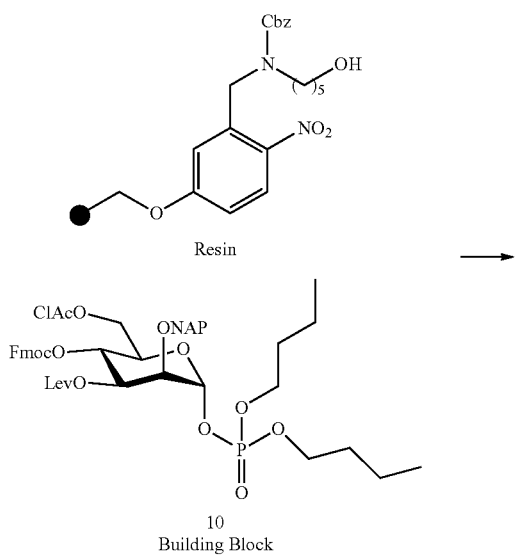

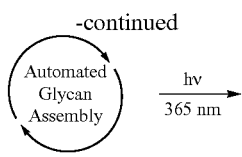

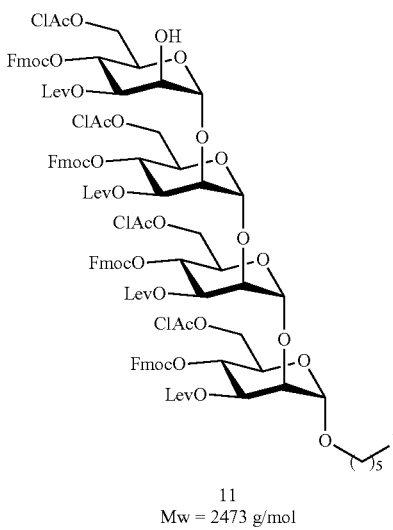

11
Mw = 2473 g/mol

Automated Synthesis Working Modules

The timing and quantity of solvents/reagents transferred to the reaction vessel (400) in each step is controlled by software. The reagent delivery system (600) utilizes a pressure control syringe pump system, which constantly pressurizes the entire platform, so that the specific solvent/reagent is transferred from the respective storage components by timing the opening and closing of the appropriate valves, or withdrawing and dispensing with the motorized syringe in connection with a rotary valve.

Module 1: Acidic Washing: The same acidic washing module was applied as in Example 5.

Module 2: Glycosylation: Phosphate building block is dissolved in the proper solvent mixture, e.g. DCM (5 mL for one initial double cycle for the first coupling and three more single glycosylation cycles to build up the tetramer) in the designated building block storing component. The reaction vessel (400) is set to reach the initial glycosylation temperature. During the adjustment of the temperature in the reactor vessel (when it is programmed to do so), DCM is drained in the reaction vessel and 1 mL of phosphate building block (5.0 eq. in 1.0 mL DCM) is delivered from the building block storing component to the reaction vessel via the pre-cooling device (300), which cools the solution of phosphate building block (when it is programmed to do so) to a temperature of −18° C. Then 1.0 mL of a solution of 2% TMSOTf in DCM is delivered to the reaction vessel from the respective activator storing component via the pre-cooling device (300), which cools the activator solution down to a temperature of −18° C. (when it is programmed to do so). The glycosylation mixture is incubated for 20 min in the temperature range of −22° C. to −20° C. Keeping constant the active cooling action by a coolant flowing in the jacket, the linearly ramped to 0° C. in 5 min. When reaching 0° C. the reaction mixture is incubated for additional 10 minutes. Once incubation time is finished, the reaction mixture is drained and the resin is washed with DCE (once, 2 mL for 5 s).

Module 3: NAP Deprotection (ca. 60 min): The resin is washed with DCM (three times with 2 mL for 15 s). For NAP deprotection, 2 mL of a solution of 2% DDQ and 13% methanol in DCE was delivered to the reaction vessel. The temperature of the reagents inside the reactor vessel is adjusted between 60° C. and 20° C. After 30 min, the reaction solution is drained from the reactor vessel. The resin is washed with DCM (three times with 2 mL for 15 s); the incubation in NAP deprotection solution between 60° C. and 20° C. and the DCM washes were repeated twice more. Then, the resin is washed (3 times) with the following solvent sequence DMF, THF and DCM (3 mL for 120 s each). After this module, the resin is ready for the next glycosylation cycle.

The resin functionalized with a photo-cleavable linker (45 mg; loading 0.30 mmol/g) (see Scheme 2) was loaded into the reaction vessel (400) of the synthesizer (100) and swollen in 2 mL DCM.

The sequence of reaction steps for the formation of tetramannose was as follows:

1. Module 1 was performed with 1 mL TMSOTf solution at the temperature range of −22° C. to −20° C. (when it is programmed to do so) for 3 min.
2. Module 2 was performed twice with 5 equiv Building Block and 2% TMSOTf in DCM solution.
3. Module 3 was carried out with 2% DDQ and 13% methanol in DCE.
4. After Module 1 took place, the Module 2 repeated twice (for the first and last coupling). Then Module 3 was performed.
5. Subsequently, modules 1-3 were repeated three times in the same manner as described in steps 1-3 in order to obtain a tetramer 11.

After buildup of the tetramer on the resin, the oligosaccharide was cleaved from solid support in a photoreactor as described in Example 5. The desired product was obtained in 10% yield estimated by HPLC (FIG. 10B)

Example 7: Synthesis of 5-amino-pentyl α-(1→3)-D-tetramannopyranoside Via Phosphate Glycosylation and Selective Deprotection of Lev Temporal Protecting Group in the Presence of Fmoc-, NAP-, ClAc-Temporal Protecting Groups

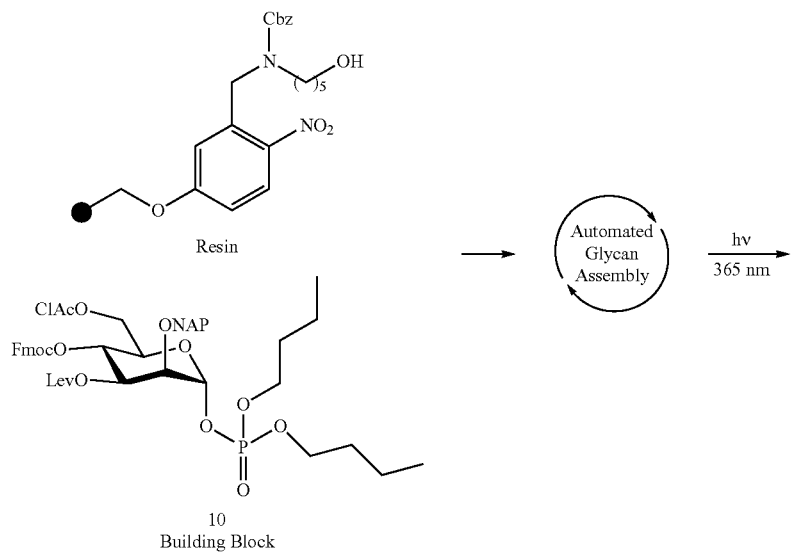

Scheme 3: Automated synthesis of 5-Amino-pentyl α-(1→3)-D-tetramannopyranoside (12).

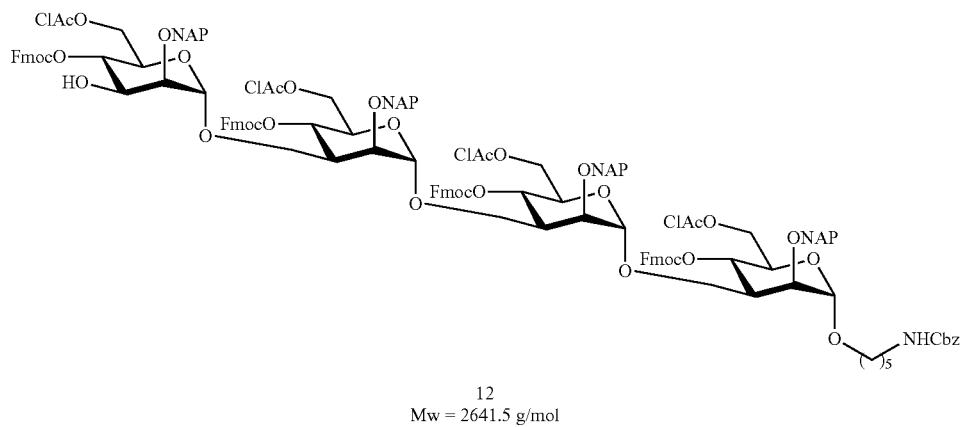

12
Mw = 2641.5 g/mol

Automated Synthesis Working Modules

The timing and quantity of solvents/reagents transferred to the reaction vessel (400) in each step is controlled by software. The reagent delivery system (600) utilizes a pressure control syringe pump system, which constantly pressurize the entire platform, so that the specific solvent/reagent is transferred from the respective storage components by timing the opening and closing of the appropriate valves, or withdrawing and dispensing with the motorized syringe in connection with a rotary valve.

Module 1: Acidic Washing: The same acidic washing module was applied as in Example 5.

Module 2: Glycosylation: Phosphate building block is dissolved in the proper solvent mixture e.g. DCM (5 mL for one initial double cycle for the first coupling and three more single glycosylation cycles to build up the tetramer) in the designated building block storing component. The reaction vessel (400) is set to reach the initial glycosylation temperature. During the adjustment of the temperature in the reactor vessel (when it is programmed to do so), the DCM in the reaction vessel is drained and 1 mL of phosphate building block (5.0 eq. in 1.0 mL DCM) is delivered from the building block storing component to the reaction vessel via the pre-cooling device (300) which cools the solution of phosphate building block (when it is programmed to do so) to a temperature of −18° C. Then 1.0 mL of the solution of 2% TMSOTf in DCM is delivered to the reaction vessel from the respective activator storing component via the pre-cooling device (300) which cools the activator solution down to a temperature of −18° C. (when it is programmed to do so). The glycosylation mixture is incubated for 30 min in the temperature range of −22° C. to −20° C. Keeping constant the active cooling action by a coolant flowing in the jacket, the linearly ramped to 0° C. in 5 min. Upon reaching 0° C. the reaction mixture is incubated for additional 10 min. Once incubation time is finished, the reaction mixture is drained and the resin is washed with DCE (once, 2 mL for 5 s).

Module 3: Lev Deprotection (ca. 5 min): The resin is washed with DCM (three times with 2 mL for 15 s). For Lev deprotection, 2 mL of a solution of 1% hydrazine acetate and 21% acetic acid in pyridine was delivered to the reaction vessel. The temperature of the reagents inside the reactor vessel is adjusted between 40° C. and 20° C. After 1 min, the reaction solution is drained from the reactor vessel. The resin is washed with DCM (three times with 2 mL for 15 s); the incubation in Lev deprotection solution between 40° C. and 20° C. and the DCM washes were repeated twice more. Then, the resin is washed (3 times) with the following solvent sequence DMF, THF and DCM (3 mL for 15 s each). After this module the resin is ready for the next glycosylation cycle.

The resin functionalized with a photo-cleavable linker (45 mg; loading 0.30 mmol/g) (see Scheme 3) was loaded into the reaction vessel (400) of the synthesizer (100) and swollen in 2 mL DCM.

The sequence of reaction steps for the formation of 5-Amino-pentyl α-(1→3)-D-tetramannopyranoside was as follows:

1. Module 1 was performed with 1 mL TMSOTf solution at the temperature range of −22° C. to −20° C. (when it is programed to do so) for 3 min.
2. Module 2 was performed twice with 5 equiv Building Block and 2% TMSOTf in DCM solution.
3. Module 3 was carried out with 1% hydrazine acetate and 21% acetic acid in pyridine.
4. After Module 1 took place the Module 2 repeated twice (for the first coupling). Then Module 3 was performed.
5. Subsequently, modules 1-3 were repeated three times in the same manner as described in steps 1-3 in order to obtain a tetramer 12.

After buildup of the tetramer on the resin the oligosaccharide was cleaved from solid support in a photoreactor as described in Example 5. 13 mg of the crude product were obtained, which correspond to a yield of 36%.

Example 8: Synthesis of 5-amino-pentyl α-(1→4)-D-tetramannopyranoside Via Phosphate Glycosylation and Selective Deprotection of Fmoc Temporal Protecting Group in the Presence of NAP-, Lev-, ClAc-Temporal Protecting Groups

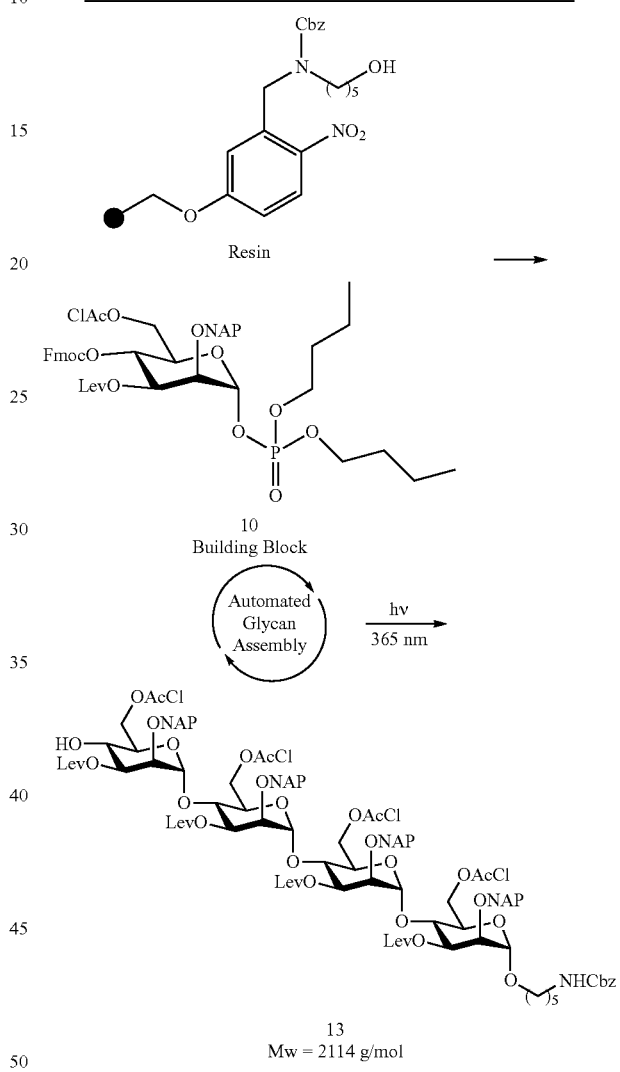

Scheme 4: Automated synthesis of 5-Amino-pentyl α-(1→4)-D-tetramannopyranoside (13).

Automated Synthesis Working Modules

The timing and quantity of solvents/reagents transferred to the reaction vessel (400) in each step is controlled by software. The reagent delivery system (600) is utilizes a pressure control syringe pump system, which constantly pressurize the entire platform, so that the specific solvent/reagent is transferred from the respective storage components by timing the opening and closing of the appropriate valves, or withdrawing and dispensing with the motorized syringe in connection with a rotary valve.

Module 1: Acidic Washing: The same acidic washing module was applied as in Example 5.

Module 2: Glycosylation: The same glycosylation module was used as in Example 6.

Module 3: Fmoc Deprotection (ca. 5 min): The resin is washed with DMF (three times with 2 mL for 15 s). For Fmoc deprotection 2 mL of a solution of 20% triethylamine in DMF was delivered to the reaction vessel (400). The temperature of the reagents inside the reactor vessel is adjusted between 7° and 20° C. After 1 min the reaction solution is drained from the reactor vessel. The resin is washed with DMF (three times with 2 mL for 15 s); the incubation in Fmoc deprotection solution between 7° and 20° C. and the DMF washes were repeated twice more. Then, the resin is washed with the following solvent sequence DMF (3 times) and DCM (3 times) 3 mL for 15 s each time. After this module the resin is ready for the next glycosylation cycle.

The resin functionalized with a photo-cleavable linker (45 mg; loading 0.30 mmol/g) (see Scheme 4) was loaded into the reaction vessel (400) of the synthesizer (100) and swollen in 2 mL DCM. The sequence of reaction steps for the formation 5-Amino-pentyl α-(1→4)-D-tetramannopyranoside was as follows:

1. Module 1 was performed with 1 mL TMSOTf solution at the temperature range of −22° C. to −20° C. (when it is programmed to do so) for 3 min.
2. Module 2 was performed twice with 5 equiv Building Block and 2% TMSOTf in DCM solution.
3. Module 3 was carried out with 20% triethylamine in DMF.
4. After Module 1 took place the Module 2 repeated twice (for the first coupling). Then Module 3 was performed.
5. Subsequently, modules 1-3 were repeated three times in the same manner as described in steps 1-4 in order to obtain a tetramer 13.

After buildup of the tetramer on the resin, the oligosaccharide was cleaved from solid support in a photoreactor: A mercury lamp is turned on 30 min prior to the first cleavage event. The fluorinated-ethylene-propylene (FEP) tubing was washed with 20 mL DCM at a flow rate of 5 mL/min before cleavage. The solid support was pre-swelled in the dark in DCM for 30 min at least before being taken up with a 20 mL disposable syringe. The suspension of solid support in DCM was slowly injected from the disposable syringe (20 mL) into the FEP tubing using a syringe pump. The suspension was pushed through the FEP tubing into the photoreactor with additional 18 mL DCM (flow rate: 800 μL/min). The photocleavage took place inside the reactor while solid support travelled toward the exit point of the reactor. The suspension leaving the reactor was directed into a syringe equipped with polyethylene filter frit where the resin was filtered off and the solution containing the cleaved oligosaccharide is collected in a separate glass vial. The tubing as washed with 20 mL DCM (flow rate: 2 mL/min) until any remaining resin exited the reactor and the remaining oligosaccharide solution is collected. The tubing was re-equilibrated with 20 mL DCM using a flow rate of 5 mL/min and the entire cleavage procedure was repeated. The combined solution that was collected in the photocleavage process was evaporated in vacuo and the crude material was analyzed by MALDI-TOF, and HPLC. 15 mg of the crude product were recovered, which correspond to a yield of 51%.

Example 9: Synthesis of 5-amino-pentyl α-(1→6)-D-tetramannopyranoside Via Thioglycosylation and Selective Deprotection of ClAc Temporal Protecting Group in the Presence of Fmoc-, Lev-, NAP-Temporal Protecting Group

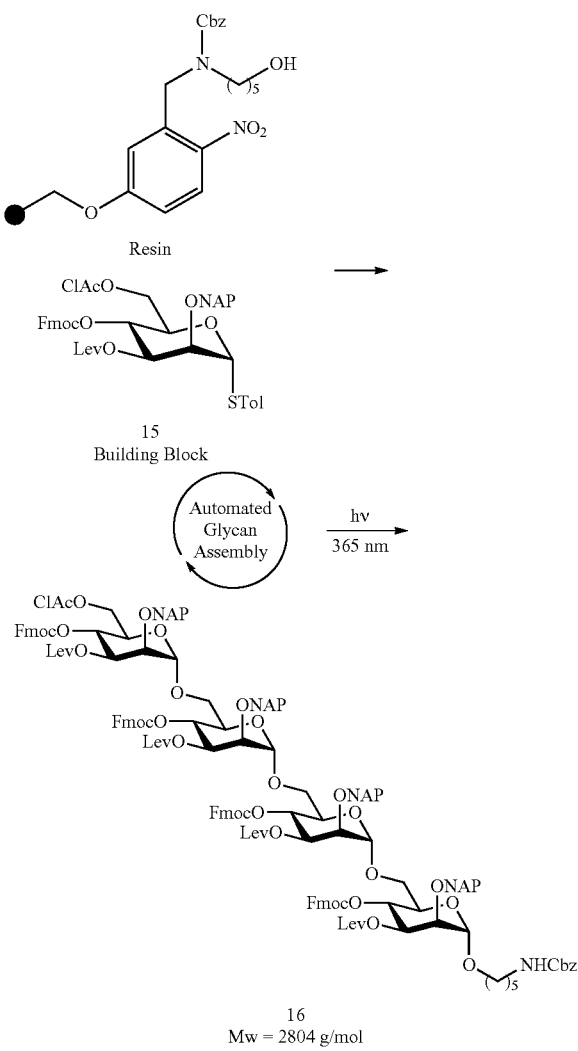

Scheme 5: Automated synthesis of 5-Amino-pentyl α-(1→6)-D-tetramannopyranoside (14).

Automated Synthesis Working Modules

The timing and quantity of solvents/reagents transferred to the reaction vessel (400) in each step is controlled by software. The reagent delivery system (600) utilizes a pressure control syringe pump system, which constantly pressurizes the entire platform, so that the specific solvent/reagent is transferred from the respective storage components by timing the opening and closing of the appropriate valves, or withdrawing and dispensing with the motorized syringe in connection with a rotary valve.

Module 1: Acidic Washing: The resin loaded into the reaction vessel (400) is washed with DMF, THF, DCM (six times each with 3 mL for 15 s). The resin is swollen in 2 mL DCM, and the temperature of the reaction vessel was adjusted in the range of −22° C. to −20° C. by cooling device (when it is programmed to do so). For acidic washing, 1 mL of the solution of 1% TMSOTf in DCM is delivered to the reaction vessel via the pre-cooling device (300) which, cools the solution to a temperature of −20° C. (when it is programmed to do so). After three minutes, the solution is drained. Finally, 3 mL DCM is added to the reaction vessel.

Module 2: Glycosylation: Thioglycoside building block is dissolved in the proper solvent mixture e.g. DCM (6 mL for two double cycles for the first and last coupling and two more single glycosylation cycles couplings between to build up the tetramer) in the designated building block storing component. The reaction vessel (400) is set to reach the initial glycosylation temperature. During the adjustment of the temperature in the reactor vessel (when it is programmed to do so), the DCM in the reaction vessel is drained and 1 mL of thioglycoside building block (6.5 eq. in 1.0 mL DCM) is delivered from the building block storing component to the reaction vessel via the pre-cooling device (300) which cools the solution of phosphate building block (when it is programmed to do so) to a temperature of −15° C. to −18° C. Then 1.0 mL NIS and TfOH solution in DCM and dioxane (v/v, 2:1) are delivered to the reaction vessel from the respective activator storing component via the pre-cooling device (300), which cools the activator solution down to a temperature of −15° C. to −18° C. (when it is programmed to do so). The glycosylation mixture is incubated for 5 min in the temperature range of −15° C. to −22° C. Keeping constant the active cooling action by a coolant flowing in the jacket, the temperature linearly ramped to 0° C. in 5 min. Upon reaching 0° C. the reaction mixture is incubated for additional 20 min. Once incubation time is finished, the reaction mixture is drained and the resin is washed with mixture of DCM and dioxane (v/v, 2:1) (once, 2 mL for 5 s).

Module 3: ClAc (ca. 5 min): The resin is washed with DMF (three times with 2 mL for 15 s). For ClAc deprotection 2 mL of a solution of 4% thiourea and 9% of pyridine in 2-methoxyethanol was delivered to the reaction vessel. The temperature of the reagents inside the reactor vessel is adjusted between 90° C. and 20° C. After 22 min the reaction solution is drained from the reactor vessel. The resin is washed with DMF (three times with 2 mL for 15 s); the incubation in ClAc deprotection solution between 9° and 20° C. and the DMF washes were repeated once more. Then, the resin is washed with the following solvent sequence DMF (3 times) and DCM (5 times) 3 mL for 15 s each time. After this module the resin is ready for the next glycosylation cycle.

The resin functionalized with a photo-cleavable linker (45 mg; loading 0.30 mmol/g) (see Scheme 5) was loaded into the reaction vessel (400) of the synthesizer (100) and swollen in 2 mL DCM.

The sequence of reaction steps for the formation of 5-Amino-pentyl α-(1→6)-D-tetramannopyranoside was as follows:

1. Module 1 was performed with 1 mL TMSOTf solution at the temperature range of −22° C. to −20° C. (when it is programmed to do so) for 3 min.
2. Module 2 was performed twice with 6.5 equiv Building Block and NIS and TfOH solution in DCM and dioxane (v/v, 2:1) solution.
3. Module 3 was carried out with 4% thiourea and 9% of pyridine in 2-methoxyethanol.
4. After Module 1 took place the Module 2 repeated twice (for the first coupling). Then Module 3 was performed.
5. Subsequently, modules 1-3 were repeated three times in the same manner as described in steps 1-4 in order to obtain a tetramer 13.

After buildup of the tetramer on the resin, the oligosaccharide was cleaved from solid support in a photoreactor as described in Example 8. 22 mg of crude product were obtained, which correspond to a yield of 58%.

Example 10: Synthesis of a protected 5-(benzyl (benzyloxycarbonyl)amino)-pentyl 3-(α-D-mannopyranosyl)-4-(α-D-mannopyranosyl)-6-(α-D-mannopyranosyl)-α-D-mannopyranoside Via Phosphate Glycosylation and Selective Deprotection of a Donor Bearing Four Temporal Protecting Groups Scheme 6: Automated synthesis of 5-(benzyl(benzyloxycarbonyl)amino)-pentyl tetramannopyranoside (17).

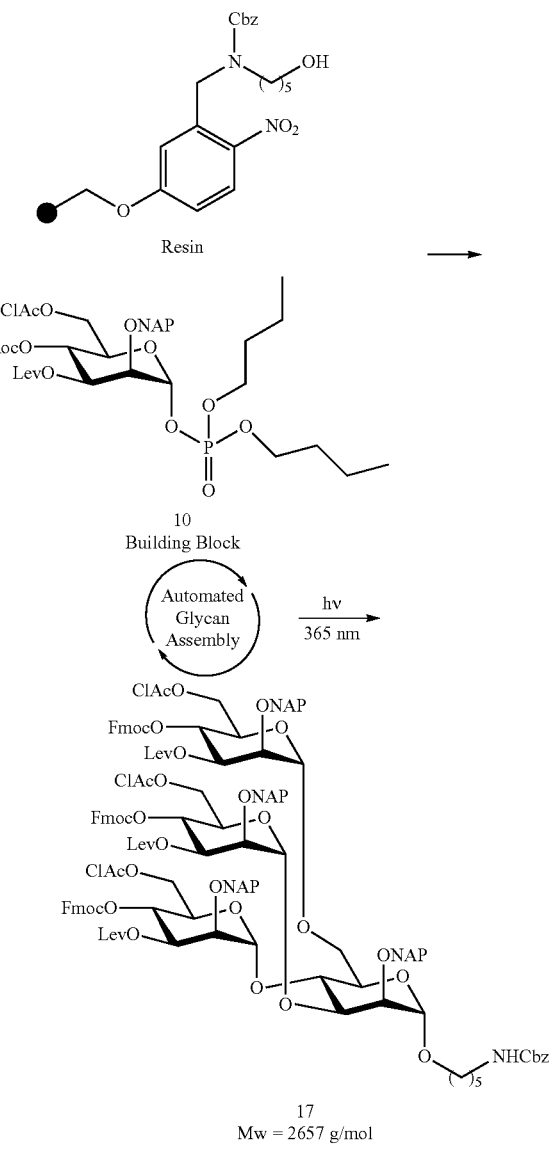

Automated Synthesis Working Modules

The timing and quantity of solvents/reagents transferred to the reaction vessel (400) in each step is controlled by software. The reagent delivery system (600) is utilizes a pressure control syringe pump system, which constantly pressurize the entire platform, so that the specific solvent/ reagent is transferred from the respective storage components by timing the opening and closing of the appropriate valves, or withdrawing and dispensing with the motorized syringe in connection with a rotary valve.

Module 1: Acidic Washing: The same acidic washing module was applied as in Example 5.

Module 2: Glycosylation: The same glycosylation module was used as in Example 7.

Module 3: ClAc (ca. 5 min): The same chloroacetyl deprotection module was used as in Example 9.

Module 4: Fmoc Deprotection (ca. 5 min): The same Fmoc deprotection module was used as in Example 8.

Module 5: Lev Deprotection (ca. 5 min): The same Lev deprotection modules was used as in Example 7.

The resin functionalized with a photo-cleavable linker (45 mg; loading 0.30 mmol/g) (see Scheme 6) was loaded into the reaction vessel (400) of the synthesizer (100) and swollen in 2 mL DCM.

The sequence of reaction steps for the formation α-(1→3)-α-(1→4)-α-(1→6)-D-mannopyranoside was as follows:

1. Module 1 was performed with 1 mL TMSOTf solution at the temperature range of −22° C. to −20° C. (when it is programmed to do so) for 3 min.
2. Module 2 was performed twice with 5 equiv Building Block and 2% TMSOTf in DCM solution.
3. Module 3 was carried out with 4% thiourea and 9% of pyridine in 2-methoxyethanol.
4. Module 4 was carried out with 20% triethylamine in DMF.
5. Module 5 was carried out with 1% hydrazine acetate and 21% acetic acid in pyridine.
6. After Module 1 took place, Module 2 was repeated twice (for the first coupling). Then Modules 3-5 were performed. Then Module 1 was performed.
7. Subsequently, Module 2 repeated three times in order to obtain a tetramer 17.

After buildup of the tetramer on the resin the oligosaccharide was cleaved from solid support in a photoreactor as described in the previous Example: 15 mg of the crude product were obtained, which correspond to yield of 51%.

Example 11: Total Synthesis of a Lewis Antigen Tetramer with Temperature Regulation Via Microwave Heating

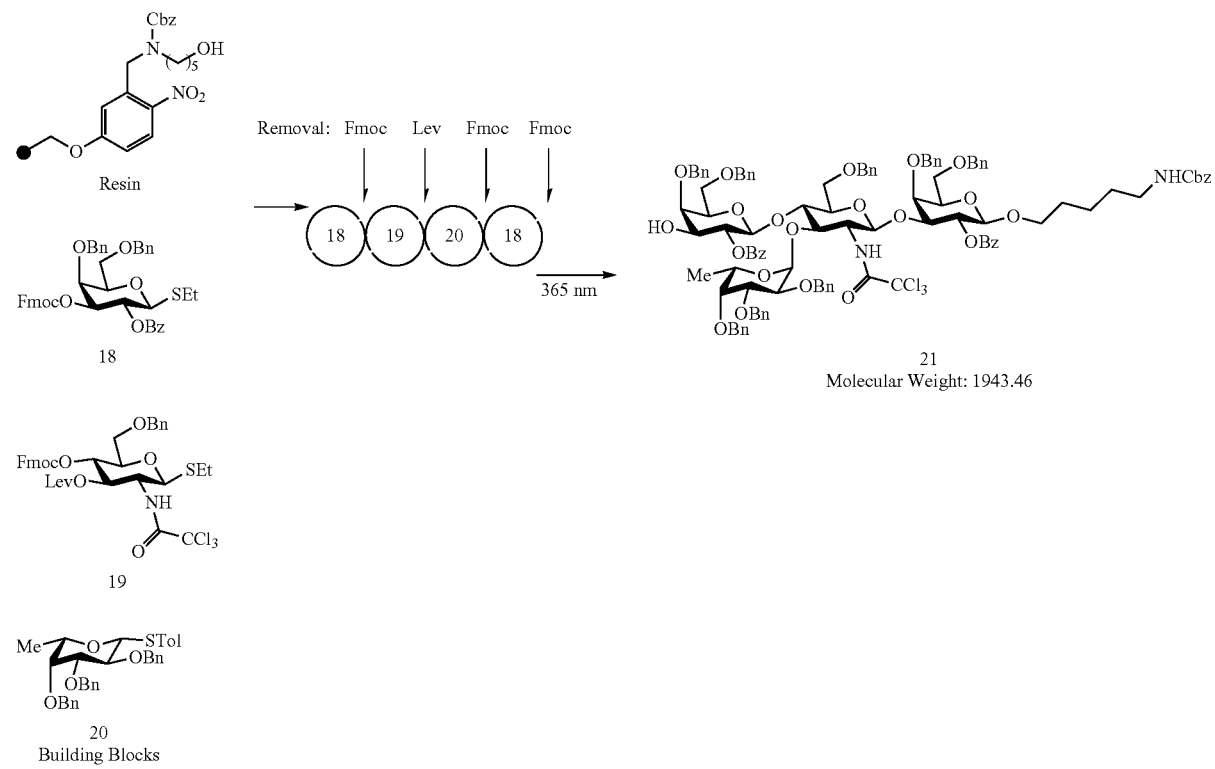

Automated Synthesis Working Modules

The timing and quantity of solvents/reagents transferred to the reaction vessel (400) in each step is controlled by software. The reagent delivery system (600) utilizes pressure control valves, which constantly pressurize the entire platform, so that the specific solvent/reagent is transferred from the respective storage components by timing the opening and closing of the appropriate valves. All the solvents are pre-cooled before they are delivered inside the reaction vessel.

Module 1: Acidic Washing: The resin loaded into the reaction vessel is washed with DMF, THF, DCM (six times each with 3 mL for 15 s). The resin is swollen in 2 mL DCM, and the temperature of the reaction vessel was adjusted in the range of −20° C. to −16° C. by cooling device (when it is programmed to do so). For acidic washing, 1 mL of the solution of 2% TMSOTf in DCM is delivered to the reaction vessel via the pre-cooling device (300), which cools the solution to a temperature of −15° C. (when it is programmed to do so). After three minutes, the solution is drained. Finally, 3 mL DCM is added to the reaction vessel (400).

Module 2: Glycosylation: Thioglycoside building block (18) is dissolved in the proper solvent (6.5 eq. in 1.0 mL DCM) and loaded in the designated building block storing component. The reaction vessel (400) is set to reach the initial glycosylation temperature. After the temperature reached the range of −18° C. to −15° C. the DCM in the reaction vessel is drained and 1 mL of thioglycoside building block (6.5 eq. in 1.0 mL DCM) is delivered from the building block storing component to the reaction vessel via the pre-cooling device (300), which cools the solution of thioglycoside building block to a temperature of −15° C. Then, 1.0 mL NIS and TfOH solution in DCM and dioxane (v/v, 2:1) is delivered to the reaction vessel from the respective activator storing component via the pre-cooling device (300), which cools the activator solution down to a temperature of −15° C. The glycosylation mixture is incubated for 5 min at the temperature range of −18° C. to −17° C., the temperature linearly ramped during 5 min to 0° C. by microwave radiation, and after reaching 0° C., the reaction mixture is incubated for additional 20 min. Once incubation time is finished, the reaction mixture is drained and the resin is washed with DCM (once, 2 mL for 15 s). Then the resin is washed with 2 mL of DCM:dioxane 2:1 volume ratio. Finally, the resin is washed twice with DCM (2 mL for 15 s).

Module 3: Fmoc Deprotection: The resin is washed with DMF (three times with 3 mL for 15 s), swollen in 2 mL DMF. For Fmoc deprotection 2 mL of a solution of 20% piperidine in DMF was delivered to the reaction vessel. The temperature of the reagents inside the reactor vessel is adjusted between 70° C. and 20° C. by microwave irradiation (50 W). After 1 min the reaction solution is drained from the reactor vessel. Then, the resin is washed with DMF (three times with 3 mL for 15 s) and DCM (five times with 3 mL). After this module the resin is ready for the next glycosylation cycle.

Module 4: Acidic Washing: The resin loaded into the reaction vessel is washed with DMF, THF, DCM (six times each with 3 mL for 15 s). The resin is swollen in 2 mL DCM, and the temperature of the reaction vessel was adjusted in the range of −30° C. to −26° C. by cooling device (when it is programmed to do so). For acidic washing, 1 mL of the solution of 2% TMSOTf in DCM is delivered to the reaction vessel via the pre-cooling device (300), which cools the solution to a temperature of −15° C. (when it is programmed to do so). After three minutes, the solution is drained. Finally, 3 mL DCM is added to the reaction vessel (400).

Module 5: Glycosylation: Thioglycoside building block (19) is dissolved in the proper solvent (6.5 eq. in 1.0 mL DCM) and loaded in the designated building block storing component. The reaction vessel (400) is set to reach the initial glycosylation temperature. After the temperature reached the range of −30° C. to −26° C., the DCM in the reaction vessel is drained and 1 mL of thioglycoside building block 19 (6.5 eq. in 1.0 mL DCM) is delivered from the building block storing component to the reaction vessel via the pre-cooling device (300), which cools the solution of thioglycoside building block to a temperature of −15° C. Then, 1.0 mL NIS and TfOH solution in DCM and dioxane (v/v, 2:1) is delivered to the reaction vessel from the respective activator storing component via the pre-cooling device (300), which cools the activator solution down to a temperature of −15° C. The glycosylation mixture is incubated for 10 min at the temperature range of −30° C. to −26° C., the temperature linearly ramped during 5 min to 0° C. by microwave radiation, and after reaching 0° C. the reaction mixture is incubated for additional 30 min. Once incubation time is finished, the reaction mixture is drained and the resin is washed with DCM (once, 2 mL for 15 s). Then the resin is washed with 2 mL of DCM:dioxane 2:1 volume ratio. Finally, the resin is washed twice with DCM (2 mL for 15 s).

Module 6: Lev Deprotection: The resin is washed with DCM (three times with 2 mL for 15 s). For Lev deprotection 2 mL of a solution of 1% hydrazine acetate and 21% acetic acid in pyridine was delivered to the reaction vessel. The temperature of the reagents inside the reactor vessel is adjusted between 40° C. and 20° C. by microwave irradiation (180 W). After 3 min, the reaction solution is drained from the reactor vessel. The resin is washed with DCM (three times with 2 mL for 15 s); the incubation in Lev deprotection solution between 40° C. and 20° C. by microwave irradiation (180 W) and the DCM washes were repeated twice more. Then, the resin is washed (3 times) with the following solvent sequence DMF, THF and DCM (3 mL for 15 s each). After this module the resin is ready for the next glycosylation cycle.

Module 7: Glycosylation: Thioglycoside building block (20) is dissolved in the proper solvent (6.5 eq. in 1.0 mL DCM) and loaded in the designated building block storing component. The reaction vessel (400) is set to reach the initial glycosylation temperature. After the temperature reached the range of −35° C. to −26° C., the DCM in the reaction vessel is drained and 1 mL of thioglycoside building block 20 (6.5 eq. in 1.0 mL DCM) is delivered from the building block storing component to the reaction vessel via the pre-cooling device (300), which cools the solution of thioglycoside building block to a temperature of −15° C. Then, 1.0 mL NIS and TfOH solution in DCM and dioxane (v/v, 2:1) is delivered to the reaction vessel from the respective activator storing component via the pre-cooling device (300), which cools the activator solution down to a temperature of −15° C. The glycosylation mixture is incubated for 10 min at the temperature range of −35° C. to −26° C., the temperature linearly ramped during 5 min to 0° C. by microwave radiation, and after reaching 0° C. the reaction mixture is incubated for additional 30 min. Once incubation time is finished, the reaction mixture is drained and the resin is washed with DCM (once, 2 mL for 15 s). Then the resin is washed with 2 mL of DCM:dioxane 2:1 volume ratio. Finally, the resin is washed twice with DCM (2 mL for 15 s).

Module 8: Glycosylation: Thioglycoside building block (18) is dissolved in the proper solvent (6.5 eq. in 1.0 mL DCM) and loaded in the designated building block storing component. The reaction vessel is set to reach the initial glycosylation temperature. After the temperature reached the range of −30° C. to −26° C. the DCM in the reaction vessel (400) is drained and 1 mL of thioglycoside building block 18 (6.5 eq. in 1.0 mL DCM) is delivered from the building block storing component to the reaction vessel via the pre-cooling device (300) which cools the solution of thioglycoside building block to a temperature of −15° C. Then, 1.0 mL NIS and TfOH solution in DCM and dioxane (v/v, 2:1) is delivered to the reaction vessel from the respective activator storing component via the pre-cooling device (300), which cools the activator solution down to a temperature of −15° C. The glycosylation mixture is incubated for 5 min at the temperature range of −30° C. to −26° C., the temperature linearly ramped during 5 min to 0° C. by microwave radiation, and after reaching 0° C. the reaction mixture is incubated for additional 20 min. Once incubation time is finished, the reaction mixture is drained and the resin is washed with DCM (once, 2 mL for 15 s). Then the resin is washed with 2 mL of DCM:dioxane 2:1 volume ratio. Finally, the resin is washed twice with DCM (2 mL for 15 s).

The resin functionalized with a photo-cleavable linker (45 mg; loading 0.30 mmol/g) (see Scheme 7) was loaded into the reaction vessel (400) of the synthesizer (100) and swollen in 2 mL DCM. The sequence of reaction steps for the formation of protected Lewis antigen 21 was as follows:
1. Module 1 was performed with 1 mL TMSOTf solution at the temperature range of −22° C. to −16° C. (when it is programmed to do so) for 3 min.
2. Module 2 was performed with 6.5 equiv Building Block 18 and 2% TMSOTf in DCM solution. In the temperature range of −22° C. to 0° C.
3. Module 3 was carried out with 20% piperidine in DMF at the temperature range of 25° C. to 60° C. (when it is programmed to do so).
4. Module 4 was performed with 1 mL TMSOTf solution at the temperature range of −30° C. to −26° C. (when it is programmed to do so) for 3 min.
5. Module 5 was performed with 6.5 equiv Building Block 19 and 2% TMSOTf in DCM solution. In the temperature range of −35° C. to −10° C.
6. Module 6 was carried out with 1% hydrazine acetate and 21% acetic acid in pyridine at the temperature range of 25° C. to 60° C. (when it is programmed to do so).
7. Module 7 was performed with 6.5 equiv Building Block 20 and 2% TMSOTf in DCM solution in the temperature range of −35° C. to −10° C.
8. Module 3 was carried out with 20% Piperidine in DMF at the temperature range of 25° C. to 60° C. (when it is programmed to do so).
9. Module 4 was performed with 1 mL TMSOTf solution at the temperature range of −30° C. to −26° C. (when it is programmed to do so) for 3 min.
10. Module 8 was performed with 6.5 equiv Building Block 18 and 2% TMSOTf in DCM solution in the temperature range of −35° C. to −10° C.
11. Module 3 was carried out with 20% piperidine in DMF at the temperature range of 25° C. to 60° C. (when it is programmed to do so).

After buildup of the tetramer on the resin, the oligosaccharide was cleaved from solid support in a photoreactor as described in Example 5. The combined solution that was collected in the photocleavage process was evaporated in vacuo and the crude material was analyzed by MALDI-TOF, and HPLC. 14 mg of crude product were obtained, which correspond to a yield of 47%.

What is claimed is:

1. A synthesizer for automated multistep synthesis on a solid support comprising:
    (a) a reaction vessel,
    (b) a reagent storing component comprising one or more reagent container(s),
    (c) a reagent delivery system configured to establish a fluid communication between each of the one or more reagent container(s) and the reaction vessel, wherein at least two fluid communications are separate of each other,
    (d) an inert gas delivery system comprising a gas container and a gas valve manifold, wherein the gas valve manifold comprises a manifold line and at least three output lines connected to the manifold line,
        wherein the gas container is in fluid communication with the manifold line, the one or more reagent container(s) and the reaction vessel are in separate fluid communications with the output lines of the gas valve manifold, and wherein the at least three output lines are equipped with a means for preventing flow of reagents into the manifold line.

2. The synthesizer according to claim 1, wherein the means for preventing flow of reagents into the manifold line is check valve.

3. The synthesizer according to claim 1, wherein each output line of the gas valve manifold further comprises a pressure regulator valve for regulating the pressure of each output line individually, and a pressure sensor.

4. The synthesizer according to claim 1, wherein one of the at least three output lines is further equipped with a flow control valve.

5. The synthesizer according to claim 1, wherein the gas valve manifold is constructed of two layers:
    (i) a first layer holding the manifold line; and
    (ii) a second layer comprising the at least three output lines and the means for preventing flow of reagents into the manifold line, wherein the at least three output lines are connected to the manifold line.

6. The synthesizer according to claim 1, wherein the gas valve manifold is constructed of three layers:
    (i) a first layer holding the manifold line;
    (ii) a second layer comprising the at least three output lines, wherein the at least three output lines are connected to the manifold line; and
    (iii) a third layer comprising the means for preventing flow of reagents into the manifold line.

7. The synthesizer according to claim 1, wherein the gas valve manifold comprises at least five output lines.

8. The synthesizer according to claim 2, wherein the check valve(s) are spring check valve(s), ball check valve(s), diaphragm check valve(s), swing check valve(s) or tilting disc check valve(s), clapper valve(s), stop-check valve(s), lift-check valve(s), in-line check valve(s), duckbill valve(s), pneumatic non-return valve(s), double check valve(s), or double ball check valve(s).

9. The synthesizer according to claim 3, wherein the pressure regulator valves are pressure reducing regulator valves, back-pressure regulator back-pressure valves, pressure sustaining valves, pressure sustaining regulator valves or orifice valves.

10. The synthesizer according to claim 3, wherein the pressure regulator valves are configured to adjust the pressure in the output line in the range from 0 kPa and 70 kPa, or from 0 kPa and 170 kPa.

11. The synthesizer according to claim 3, wherein the check valves are disposed downstream to the pressure regulator valves.

12. The synthesizer according to claim 1, further comprising:
    (e) a cooling device for cooling the reaction vessel.

13. The synthesizer according to claim 12, further comprising:
    (e) a pre-cooling device for pre-cooling the reagents to be supplied to the reaction vessel.

14. The synthesizer according to claim 1, wherein the reaction vessel is a microwave transparent reaction vessel, further comprising:
    (g) a microwave generator.

15. The synthesizer according to claim 12, wherein the reaction vessel is a microwave transparent reaction vessel comprising a microwave generator equipped with a temperature sensor, the synthesizer further comprising
    (h) a thermal controller for controlling the temperature inside the microwave transparent reaction vessel, the controller being connected to the cooling device, the temperature sensor and the microwave generator, the controller being configured to control the temperature by adjusting the power output of the microwave generator and by setting a fixed cooling temperature of the cooling device.

* * * * *